United States Patent [19]

Parasekvakos et al.

[11] 4,455,453
[45] * Jun. 19, 1984

[54] APPARATUS AND METHOD FOR REMOTE SENSOR MONITORING, METERING AND CONTROL

[75] Inventors: Theodoros G. Parasekvakos, Palm Bay; W. Thomas Bushma, Melbourne, both of Fla.

[73] Assignee: Metretek, Incorporated, Melbourne, Fla.

[*] Notice: The portion of the term of this patent subsequent to Dec. 23, 1997 has been disclaimed.

[21] Appl. No.: 219,863

[22] Filed: Dec. 23, 1980

Related U.S. Application Data

[63] Continuation of Ser. No. 6,871, Jan. 26, 1979, Pat. No. 4,241,237.

[51] Int. Cl.³ ............................................ H04M 11/04
[52] U.S. Cl. .................... 179/2 AM; 179/5 R; 340/825.26
[58] Field of Search ............... 179/2 A, 2 AM, 5 R; 340/150, 825.26

[56] References Cited

U.S. PATENT DOCUMENTS

| | | | |
|---|---|---|---|
| 3,258,692 | 6/1966 | Jacomini et al. | 324/113 |
| 3,349,374 | 10/1967 | Gabrielson et al. | 340/163 |
| 3,357,011 | 12/1967 | Diaz | 340/347 P |
| 3,390,234 | 6/1968 | Glidden | 179/5 |
| 3,414,676 | 12/1968 | Long | 340/870.02 |
| 3,427,402 | 2/1969 | Stokes | 179/5 R |
| 3,445,814 | 5/1969 | Spalti | 340/870.02 |
| 3,478,342 | 11/1969 | Alldritt et al. | 340/870.3 |
| 3,492,426 | 1/1970 | Foreman et al. | 179/5 |
| 3,492,649 | 1/1970 | Polillo | 340/870.02 |
| 3,503,061 | 3/1970 | Bray et al. | 340/870.07 |
| 3,510,841 | 5/1970 | Lejon | 340/870.13 |
| 3,582,557 | 6/1971 | Friberg et al. | 179/5 R |
| 3,588,357 | 6/1971 | Sellarc, Jr. | 179/2 AM |
| 3,750,156 | 7/1973 | Martell | 340/203 |
| 3,820,073 | 6/1974 | Vercellotti et al. | 340/151 |
| 3,829,835 | 8/1974 | Stewart, Jr. | 340/151 |
| 3,842,206 | 10/1974 | Barsellotti et al. | 179/2 A |
| 3,842,208 | 10/1974 | Paraskevakos | 179/5 R |
| 3,883,695 | 5/1975 | Bickel et al. | 179/5 R |
| 3,899,639 | 8/1975 | Cleveley et al. | 179/2 A |
| 3,914,757 | 10/1975 | Finlay, Jr. et al. | 340/310 A |
| 3,922,492 | 11/1975 | Lumsden | 179/2 A |
| 3,925,763 | 12/1975 | Wadhwani et al. | 340/164 R |
| 3,969,584 | 7/1976 | Miller et al. | 179/2 A |
| 3,973,240 | 8/1976 | Fong | 340/151 |
| 3,987,246 | 10/1976 | Willis | 179/2 A |
| 4,006,461 | 2/1977 | Coulter et al. | 340/163 |
| 4,008,458 | 2/1977 | Wensley | 340/151 |
| 4,012,734 | 3/1977 | Jagoda et al. | 340/310 A |
| 4,056,684 | 11/1977 | Lindstrom | 179/5 R |
| 4,086,434 | 4/1978 | Bocchi | 179/2 AM |
| 4,104,486 | 8/1978 | Martin et al. | 179/2 AM |
| 4,137,429 | 1/1979 | Stockdale | 179/5 R |
| 4,180,709 | 12/1979 | Cosgrove et al. | 179/2 AM |
| 4,218,737 | 8/1980 | Buscher et al. | 364/493 |
| 4,241,237 | 12/1980 | Paraskevakos et al. | 179/2 AM |

*Primary Examiner*—Joseph A. Popek
*Attorney, Agent, or Firm*—Cushman, Darby & Cushman

[57] ABSTRACT

A remote unit for a remote meter reading system. The remote unit initiates a telephone call to a central complex at a predetermined callback time. In response to an acknowledgement signal indicative of a completed connection, the remote unit transmits indicia of its indentity and collected data. The central complex responds with an instruction word, to control the next scheduled callback time and operational mode of the remote unit. Error code, load management and demand metering provisions are disclosed.

89 Claims, 25 Drawing Figures

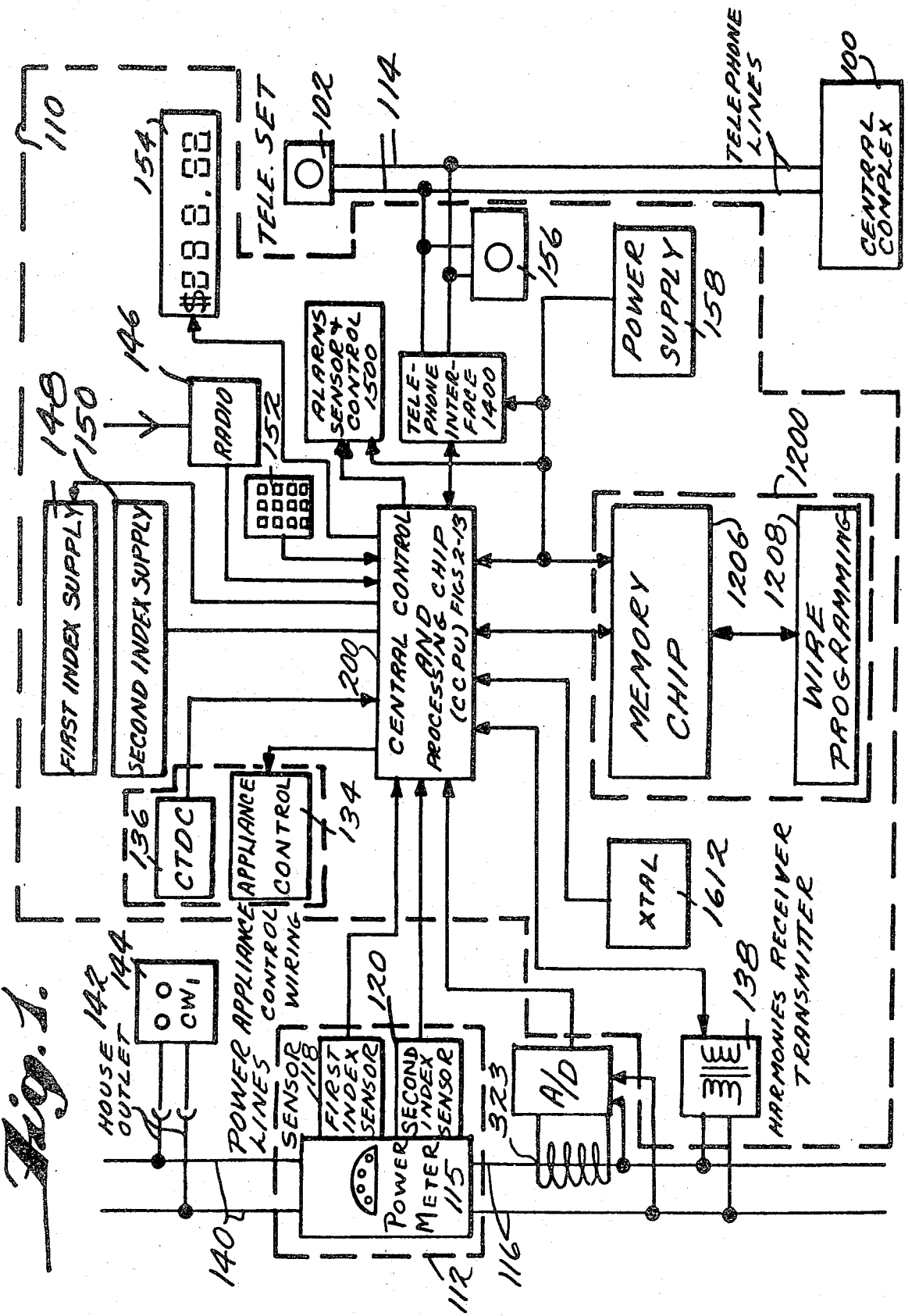

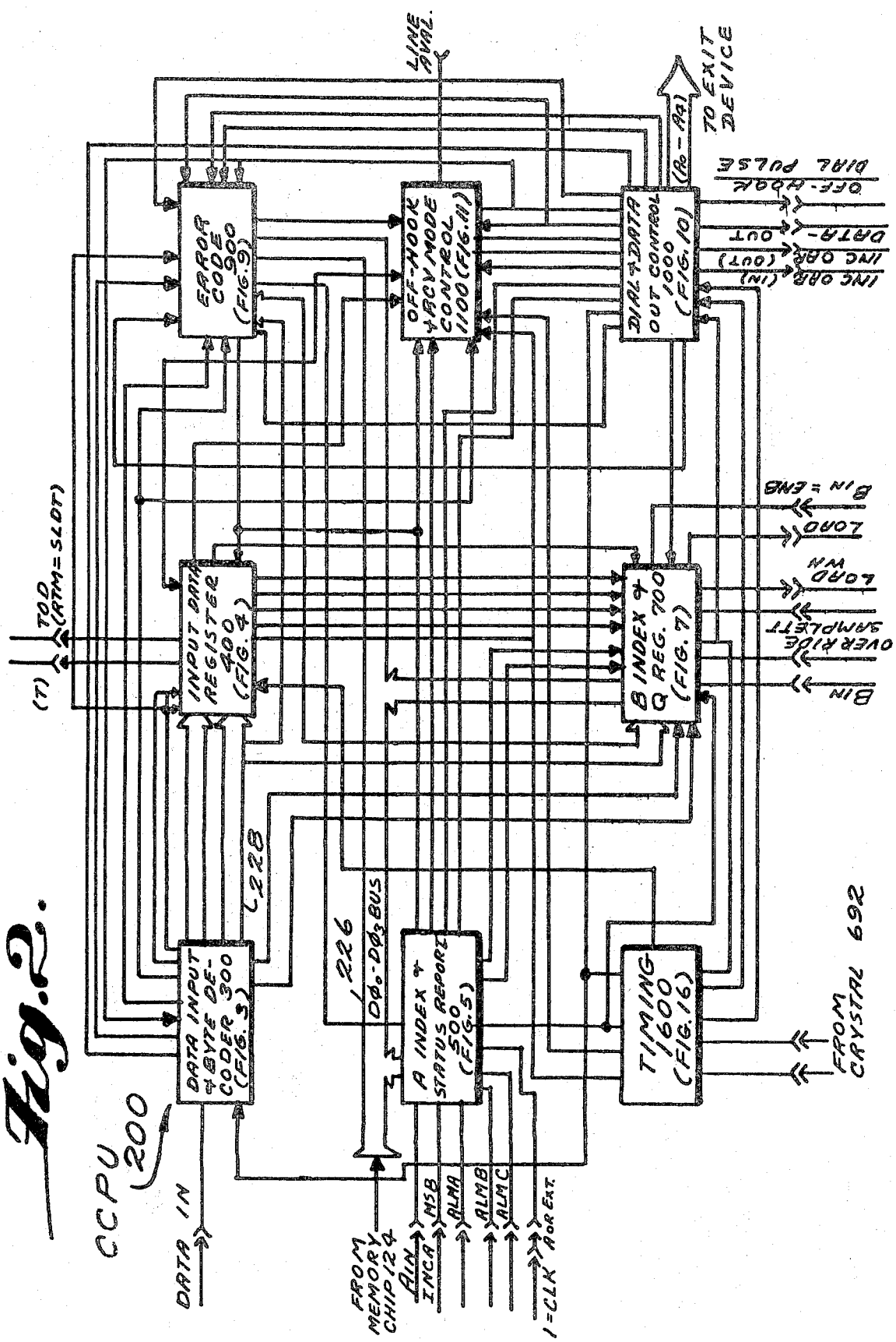

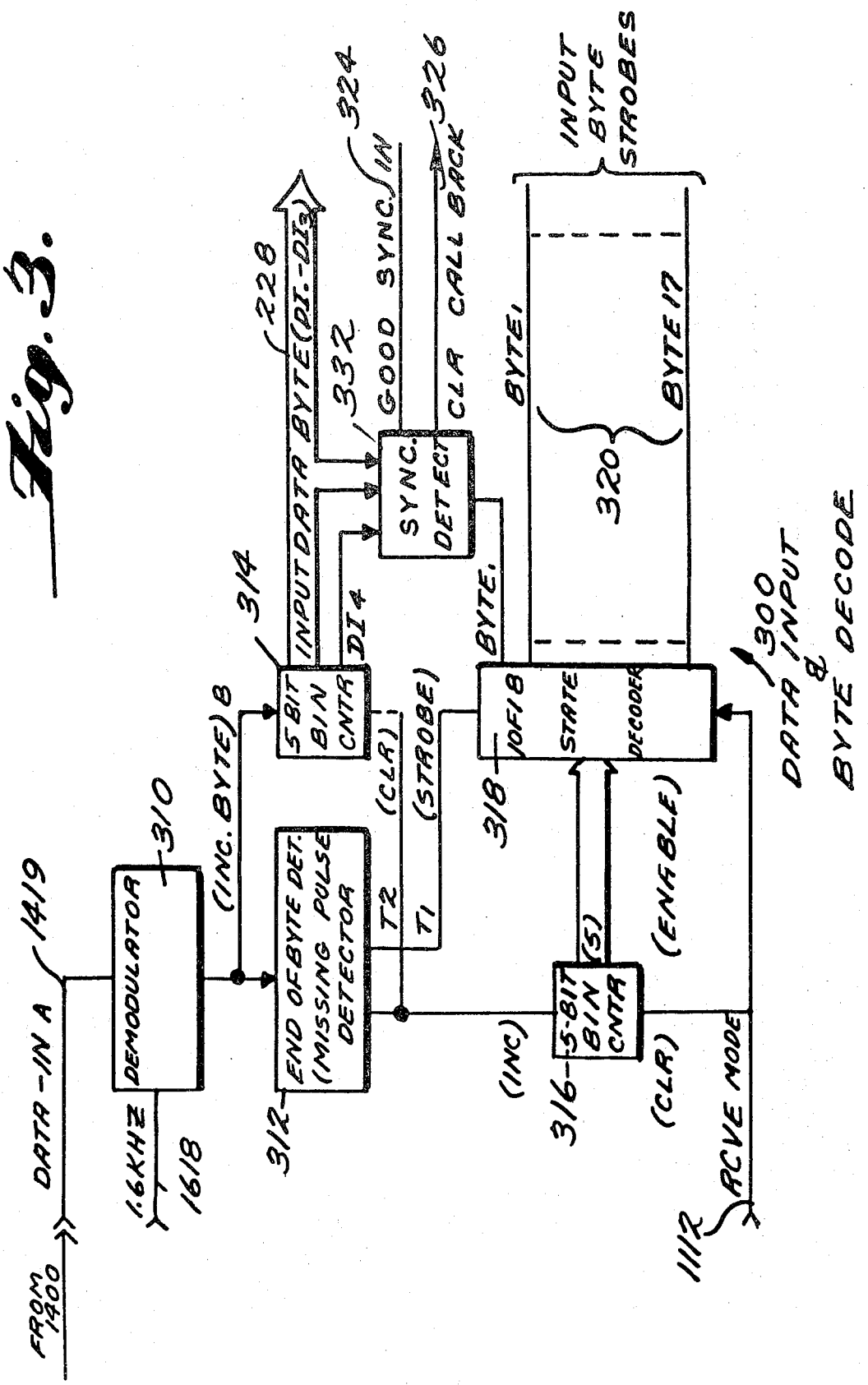

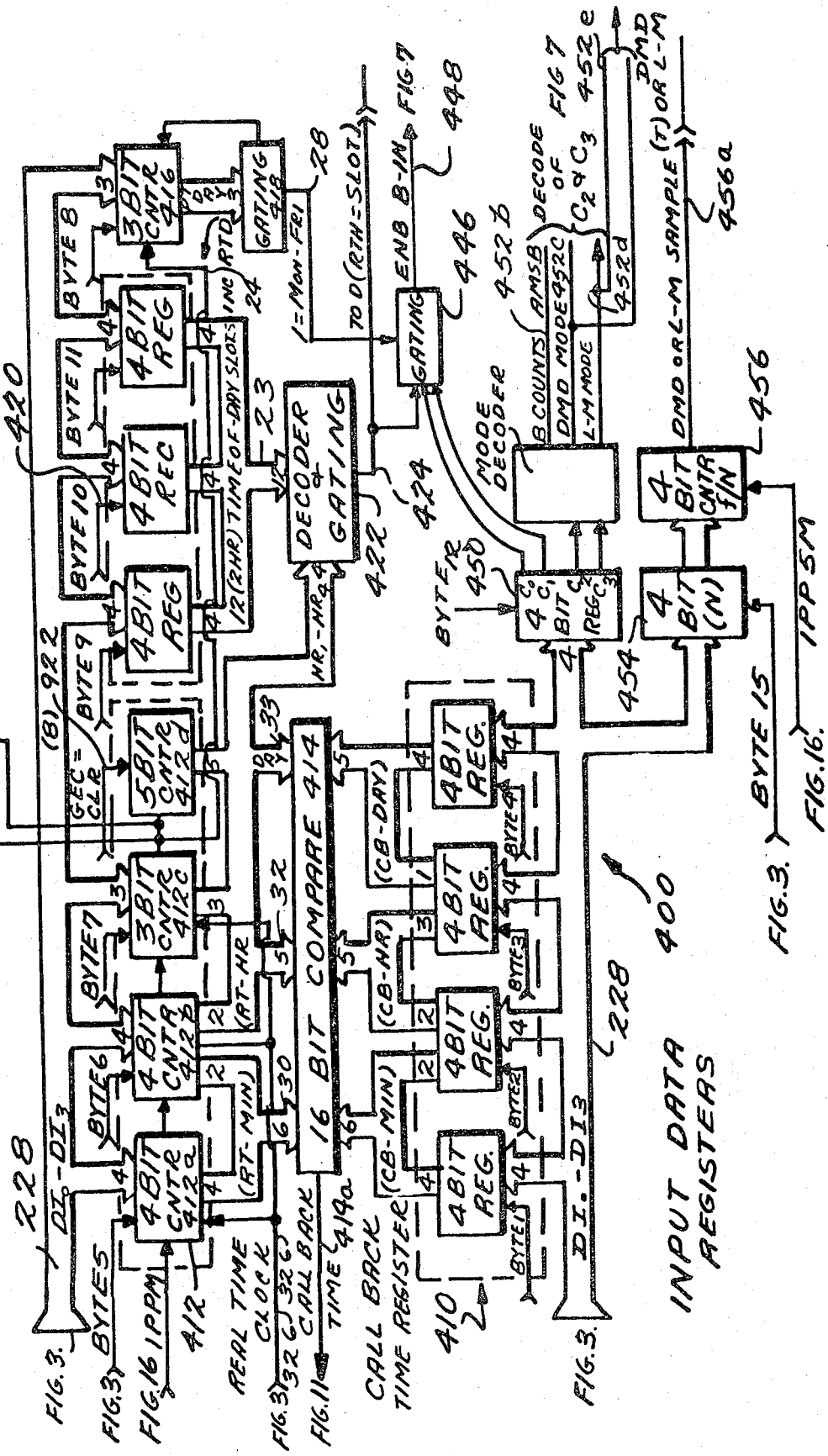

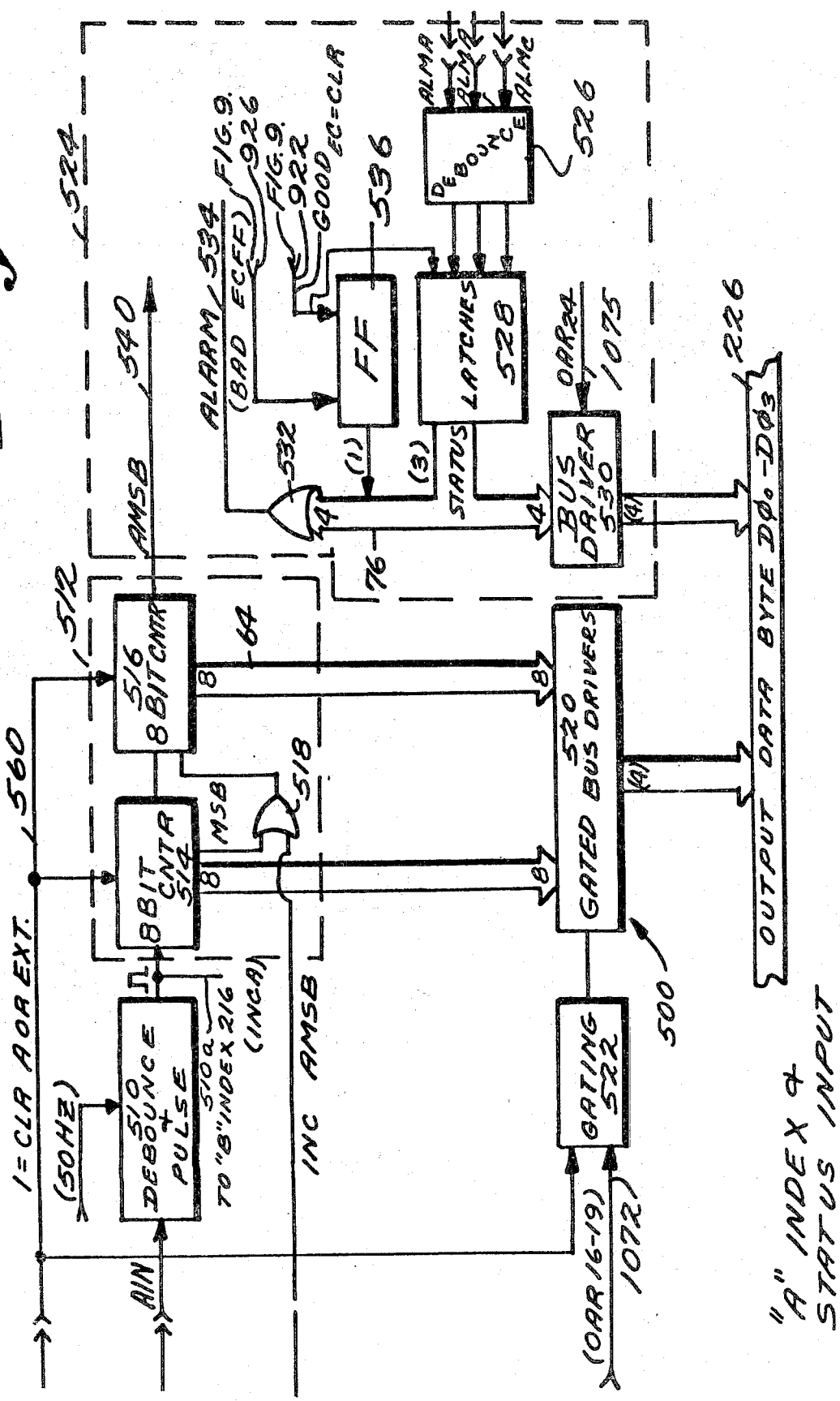

A-INDEX

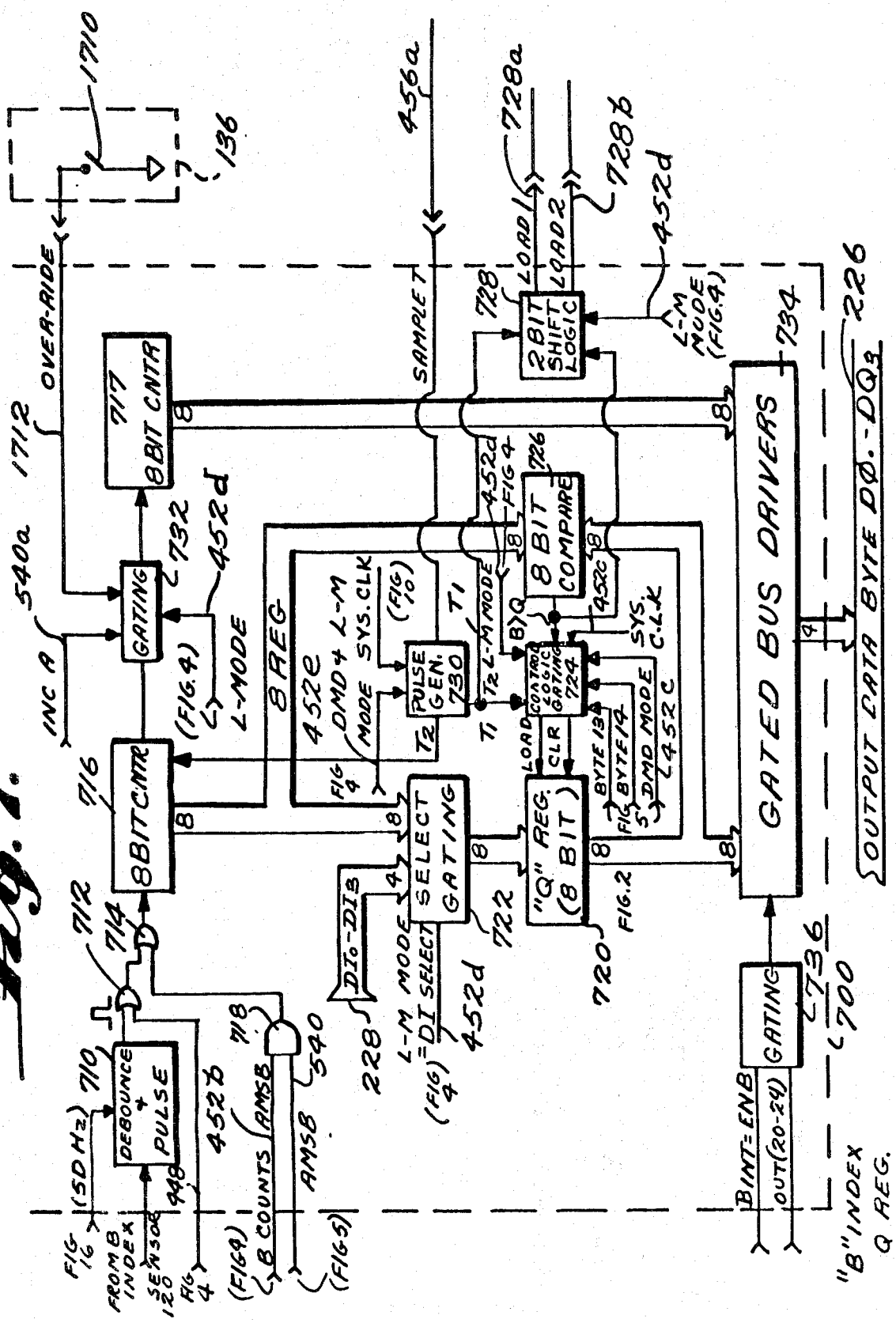

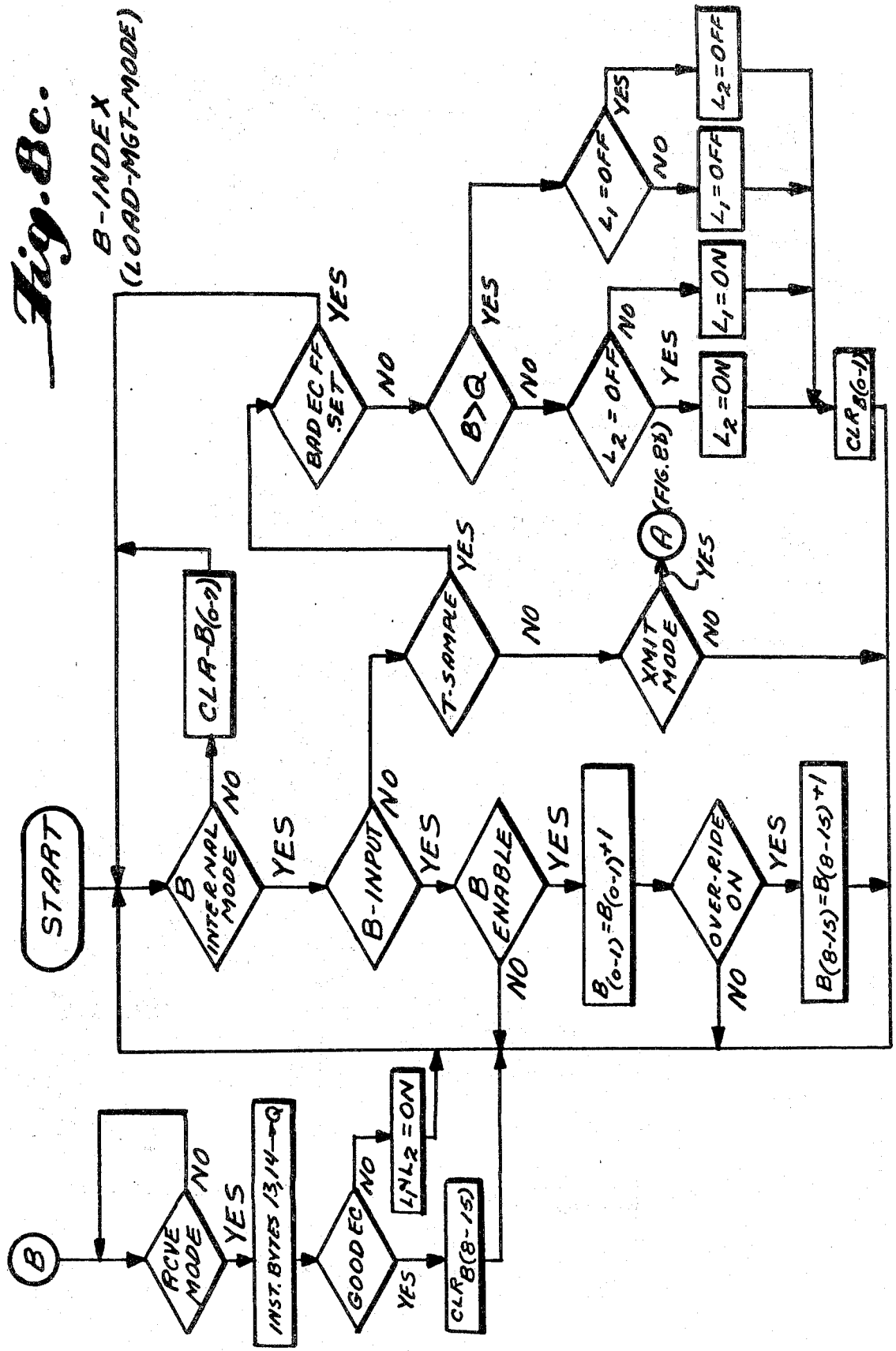

B-INDEX
(DEMAND MODE)

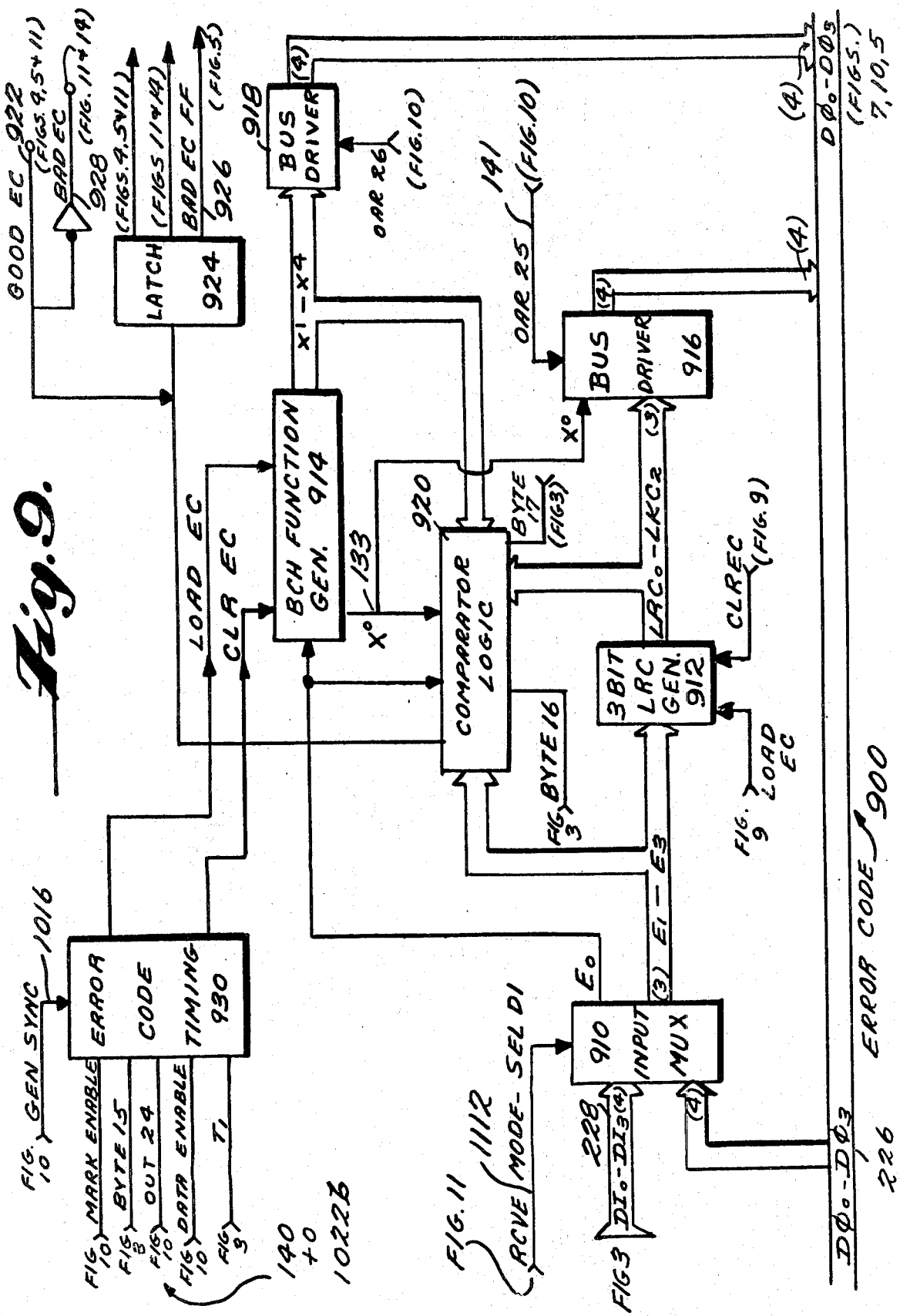

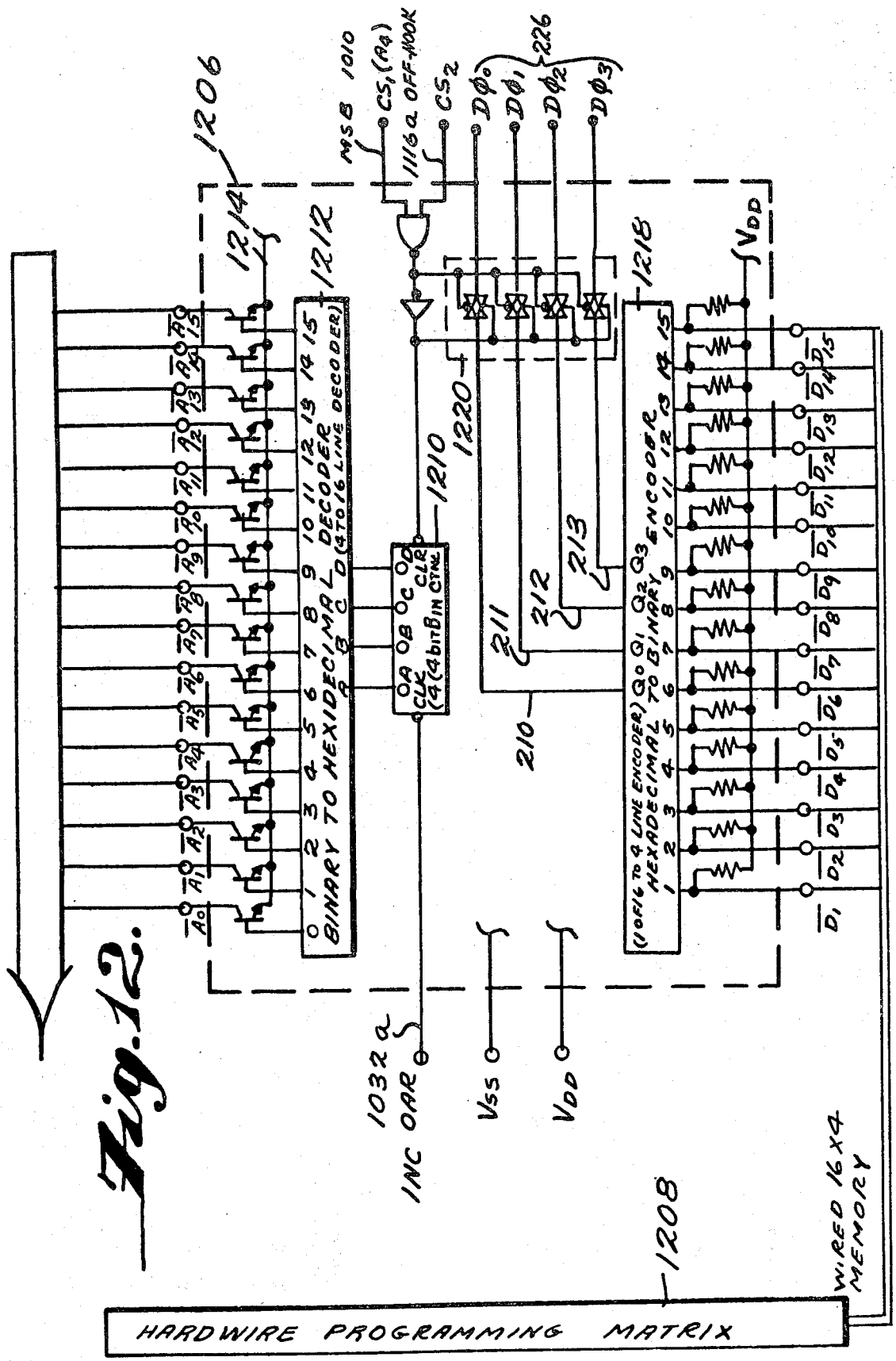
Fig. 12. HARDWIRE PROGRAMMING MATRIX

APPARATUS AND METHOD FOR REMOTE SENSOR MONITORING, METERING AND CONTROL

This is a continuation of application Ser. No. 6,871 filed Jan. 26, 1979, now U.S. Pat. No. 4,241,237.

FIELD OF THE INVENTION

The present invention relates to remote monitoring systems, and in particular, to an automatic meter reading and load management system.

BACKGROUND OF THE INVENTION

Presently existing meter reading systems typically utilize a central poling computer complex. The central complex communicates with remote meters through power lines, existing telephone systems or some other electromagnetic communications link. Examples of metering systems utilizing a power line as the communications link are described in U.S. Pat. Nos. 4,012,734 (Jagoda et al, 1977), 3,973,240 (Fong, 1976), 3,914,757 (Finlay, Jr., 1975), 3,445,814 (Spalti, 1969), and 3,258,692 (Jacomini et al, 1966). Similarly, examples of unit metering systems wherein the communications link is provided through an existing telephone system are described in U.S. Pat. Nos. 3,829,835 (Stewart, Jr., 1974), 3,820,073 (Vercellotti et al, 1974), 3,50361 (Bray et al, 1970), 3,492,649 (Polillo, 1970), 3,478,342 (Alldritt et al, 1969), 3,414,676 (Long, 1968) and 4,008,458 (Wensley, 1977).

U.S. Pat. Nos. 3,510,841 (Lejon, 1970), 3,750,156 (Martell, 1973), and 4,006,461 (Coulter, 1977) describe remote metering systems using other electromagnetic communication links.

In all cases, however, the central complex initiates the meter reading functions by interrogating a transponder at the meter location. The transponder transmits accumulated data back to the central complex in response to the interrogation.

The prior art transponder systems, however, are unduly complex and expensive. For example, where the communications link is effected through power lines, provisions for balancing the power lines must be made. Similarly, where an existing telephone system is used as the communications link, the telephone exchange must be modified to directly access the transponder. Absent modification, the interrogation of the remote meter causes other telephones located in the users home to ring. In addition, the central poling computer must store the account numbers of the respective users and relate the account numbers to the users telephone numbers.

Sensor monitoring systems which initiate a telephone call to a central complex upon sensing of predetermined alarm conditions are also known. An example of such a system is described in U.S. Pat. No. 3,842,208 issued Oct. 15, 1974 to Theodoros G. Paraskevakos. This system may be applied to metering applications, initiating a report, or upon sensing consumption of a predetermined metered quantity. This type of reporting lacks predictability and thus is not readily suitable for a practicable billing system.

SUMMARY OF THE INVENTION

The present invention provides a remote meter reading system which avoids the expense of a central poling computer. The remote unit, rather than the central complex, initiates communications at predetermined intervals. Each remote unit is operatively connected into an existing telephone system. At a preselected time, or in the event of an alarm condition, the remote unit will seize the telephone line. If the line is not busy, the remote unit, in effect, dials the telephone number of the central complex. Upon completion of a connection to the central complex, the central complex, in effect, answers the telephone call by transmitting to the remote unit an acknowledgement (synchronization) signal. In response to the acknowledgement signal, the remote unit then transmits over the telephone line the account number of the user, or other indicia of the identity of the sensor followed by data representing the meter reading. If desired, a status code of one or more hexadecimal digits and an error code, may also be transmitted in sequence. The central complex, upon reception of the data train, (and decoding and deciphering the error and status codes, if included) stores the information from the remote unit and transmits new information from the remote unit and transmits new information or instructions to the remote unit.

If the telephone line to the central complex is busy, out of order or otherwise not attainable, the remote unit releases the telephone line. After a preprogrammed length of time, the callback sequence is repeated. After a number of unsuccessful attempts to communicate with the receiver, the remote unit will increase the callback time by twenty-four hours and the entire procedure is repeated the next day. If full communication is not effected, the procedure will be repeated for a predetermined number of successive days. If full communication with the central complex has still not been effected, the remote unit will continue operating with its previous instructions without resetting the indicia of the meter readings.

The remote unit interfaces the monitored system to existing telephone lines. An external time keeping circuit (RC network or crystal oscillator) provides timing for the remote unit. A central control and processing unit receives and stores instructions from the central complex, and controls execution of data sampling and reporting procedures.

BRIEF DESCRIPTION OF THE DRAWINGS

A preferred exemplary embodiment of the present invention will hereinafter be described in conjunction with the appended drawing wherein like numerals denote like elements, and:

FIG. 1 is a block diagram of a remote unit for a meter sensing system in accordance with the present invention;

FIG. 2 is a block diagram of a central control and processing chip in accordance with the present invention;

FIG. 3 is a block diagram of the data input and byte decoder of FIG. 2;

FIG. 3a is a schematic illustration of a callback transmission sequence;

FIG. 4 is a block diagram of the input data registers of FIG. 2;

FIG. 5 is a block diagram of the A index and status input of FIG. 2;

FIG. 7 is a block diagram of the B index and Q register of FIG. 2;

FIG. 9 is a block diagram of the error code circuitry of FIG. 2;

FIG. 10a is a schematic illustration of a dialing sequence;

FIG. 10b is a schematic illustration of a data transmission sequence;

FIG. 12 is a schematic block diagram of a suitable hardwire memory;

FIG. 18 is a block diagram of a suitable analog-to-digital converter and billing printer.

Referring now to FIG. 1 of the drawing, there is shown a remote unit 110, cooperating with a suitable sensor device 112. Remote unit 110 is operatively connected into a telephone system through telephone lines 114. The telephone system selectively couples remote unit 110 to a central complex 100.

Figure 6:
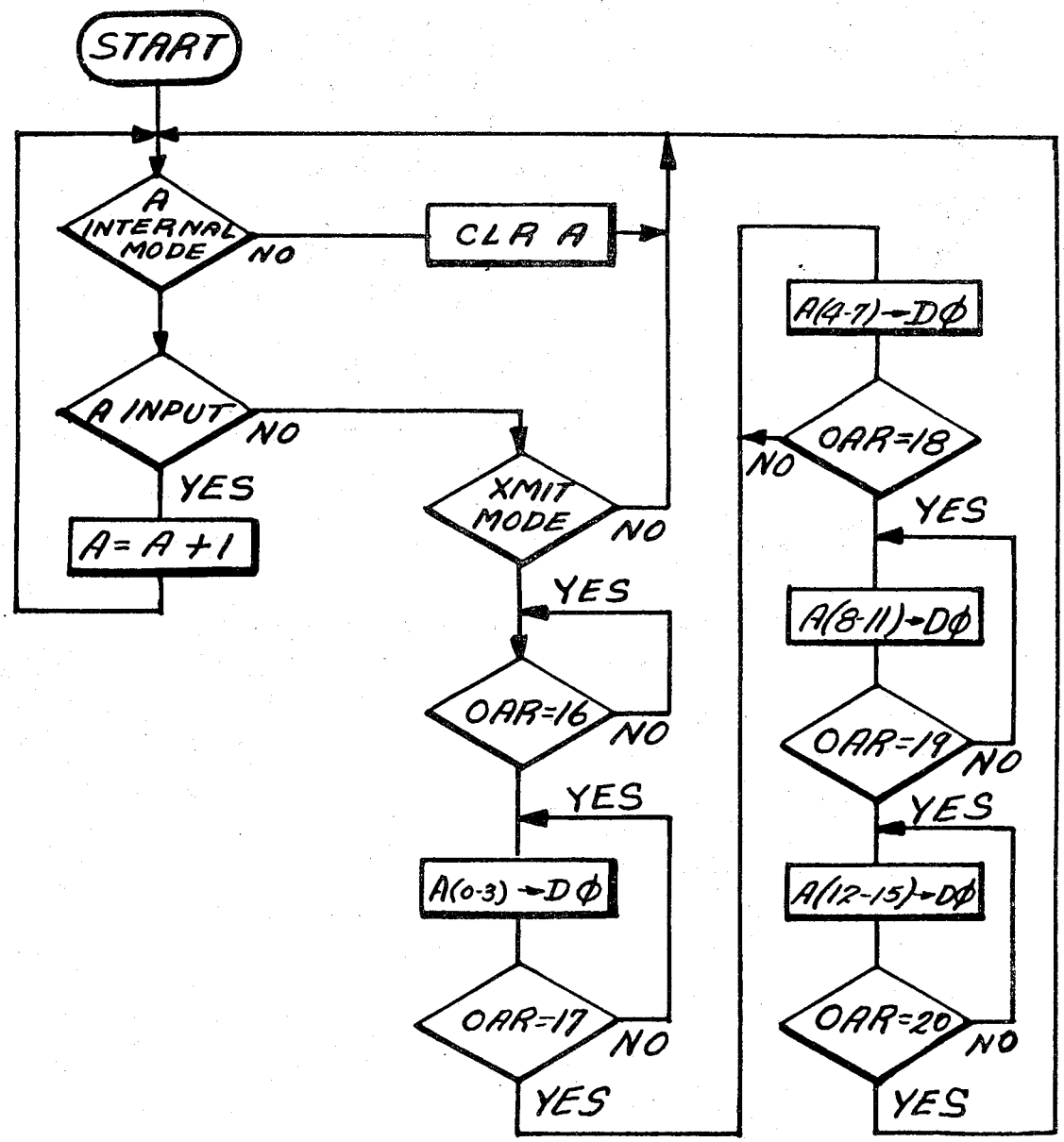
FIG. 6 is a logic flow diagram of the operation of the A index of FIG. 5.

Sensor 112 is suitably a device for metering the power usage in a building. A conventional dual or single index power meter 115 is coupled to the incoming power line 116. Index transducers 118 and 120 generate electrical pulses in accordance with units of consumption. For example, where power meter 115 includes rotating indicator discs, one or more magnets attached to the least significant index indicator disc can be utilized to open and close a read switch to generate the pulses. Suitable debouncing circuitry can be included in remote unit 110 to allow for simple transducer mechanisms.

It should be appreciated that any suitable sensor device 112 can be utilized. For example, Hall effect sensors, or electro-optical devices can be utilized in conjunction with a conventional meter to generate electrical pulses. An electro-optical transducer is particularly suited to conventional meters having existing calibration or anti-creep holes on the meter indicator disc. A light emitting diode and a photoelectric device can thus be disposed on either side of the disc. The light from the LED thus reaches the photoelectric device only upon passage of the calibration or anti-creep holes of the meter disc. Alternatively, the conventional power meter and cooperating transducers 118 and 120 can be replaced by a solid state meter. For example, a current pickup coil disposed about one of the power line conductors, cooperating with a voltage sensor and an analog-to-digital converter can be utilized. Consumed wattage can then be calculated by remote unit 110 by periodically multiplying the voltage and current measurements. A suitable solid state meter and an analog-to-digital converter will be described in more detail (together with a billing printer and display) in conjunction with FIG. 18.

Additional sensor units 112 can be coupled to remote unit 110. For example, a second sensor can be coupled to a gas meter within the house. Similarly, transducers 118 and 120 may cooperate with different conventional meters rather than with different indexes of a single meter. Second transducer 120 can also be used as a telltale demand indicator to provide indicia of demand accumulation.

The pulses from transducers 118 and 120 are applied to remote unit 110. Remote unit 110 includes a central control and processing unit (CCPU) 200, which controls the operation of remote unit 110. CCPU 200 is suitably formed of an integrated circuit and will be described in detail in conjunction with FIGS. 2-13. Communicating with CCPU 200 is a memory 1200 suitably comprising a dynamic memory chip 1206 such as a RAM and a hardwired memory section 1208. Memory 1200 will be described in detail in conjunction with FIG. 12. Also communicating with CCPU 200 is a suitable telephone interface 1400. Interface 1400 effectively interfaces remote unit 110 with telephone lines 114. A suitable telephone interface 1400 will be described in conjunction with FIG. 14.

If desired, remote unit 110 can also include suitable alarm sensor and control circuitry 1500. Alarm sensor circuitry 1500 includes various additional sensors and controls the activation of alarm sirens or other indicia. Suitable alarm sensor and control circuitry will be described in conjunction with FIG. 15.

Remote unit 110 can also include, if necessary, suitable appliance control circuitry 134 and suitable customer test and over-ride circuitry (CTOC) 136. Appliance control circuitry 134 provides for selective disconnecting of various appliances under the control of remote unit 110, and includes suitable connect or disconnect circuitry such as relays, variacs, triacs, etc. Customer tests and over-ride circuitry (CTOC) 136 is provided to enable the user to reactivate an appliance disconnected through appliance control circuitry 134. The power consumption by the appliance would then be registered on the second index (peak time rate index) and the user charged accordingly. In addition, CTOC 136 provides switching circuitry through which the user can initiate a test transmission to the utility (central complex) regardless of the time of day. Suitable appliance control circuitry 134 will be described along with various other components of the system in conjunction with FIG. 17.

A harmonic transceiver 138 can also be included within remote unit 110 to provide a communication link between CCPU 200 and power line 116. Harmonic transceiver 138 receives communications from the utility central complex transmitted over the power line 116. Thus, the utility can initiate control of specified user appliances to prevent overload or brown-outs, etc., or effect a switching between first and second indexes. Harmonics transceiver 138 also serves to translate and transmit carrier signals over the house electrical wiring 140 to provide communication to various auxiliary units plugged into power outlets (142) throughout the house. For example, a customer warning indicator (CWI) 144 may be utilized. CWI 144 suitably comprises a receiver tuned to the carrier which translates the received signals to provide an audio visual indicia. An audio visual warning indicative of, for example, a change over to the second index (indicating a higher rate charge) can thus be provided. A green light can be utilized to indicate a normal condition and a red light with buzzer to indicate a change over to the second index. A switch can be provided to silence the buzzer. Harmonics transceiver 138 and consumer warning indicator 144 will be described in more detail in conjunction with FIG. 17.

It should be appreciated that the same results can be achieved through, for example, radio transmissions. In such an instance, remote unit 110 would include a radio transceiver 146 tuned to receive specific frequencies transmitted by a radio transmitter at utility central complex 100. Communications to the auxiliary devices can similarly be effected by harmonics transmissions through the power lines.

Since meter reading is effected automatically, the remote unit can be located within the house. Accordingly, real time displays 148 and 150 indicating the instantaneous accumulation in the first and second indexes can be provided.

It should also be appreciated that interior disposition of remote unit 110 insulates the remote unit from harsh environmental conditions and vandalism and the like. In addition, the user can connect his own security system to the meter, through, for example, alarm sensors and control circuit 1500. Similarly, a poling or opinion statistic keyboard or switch 152 can be provided. Poling keyboard 152 can activate the system immediately upon depression of a button or can effect storage of information for transmission during regular periodic reports.

A further display or printer 154 can be included for providing billing information, operating directly from the accumulated data in the indexes, or activated in response to transmissions from utility central complex 100.

An input jack 156 can also be coupled to telephone interface 1400 to facilitate local application of instructions to remote unit 110. Where a telephone system is not available, CCPU 122 can be programmed through input jack 156 in such a way that the real time clock never reaches the predetermined callback time. The accumulated data can be displayed or printed out on displays 148 and 150 or printer 154. A call bace can be affected upon insertion of a read-out unit into jack 156.

Figure 16:
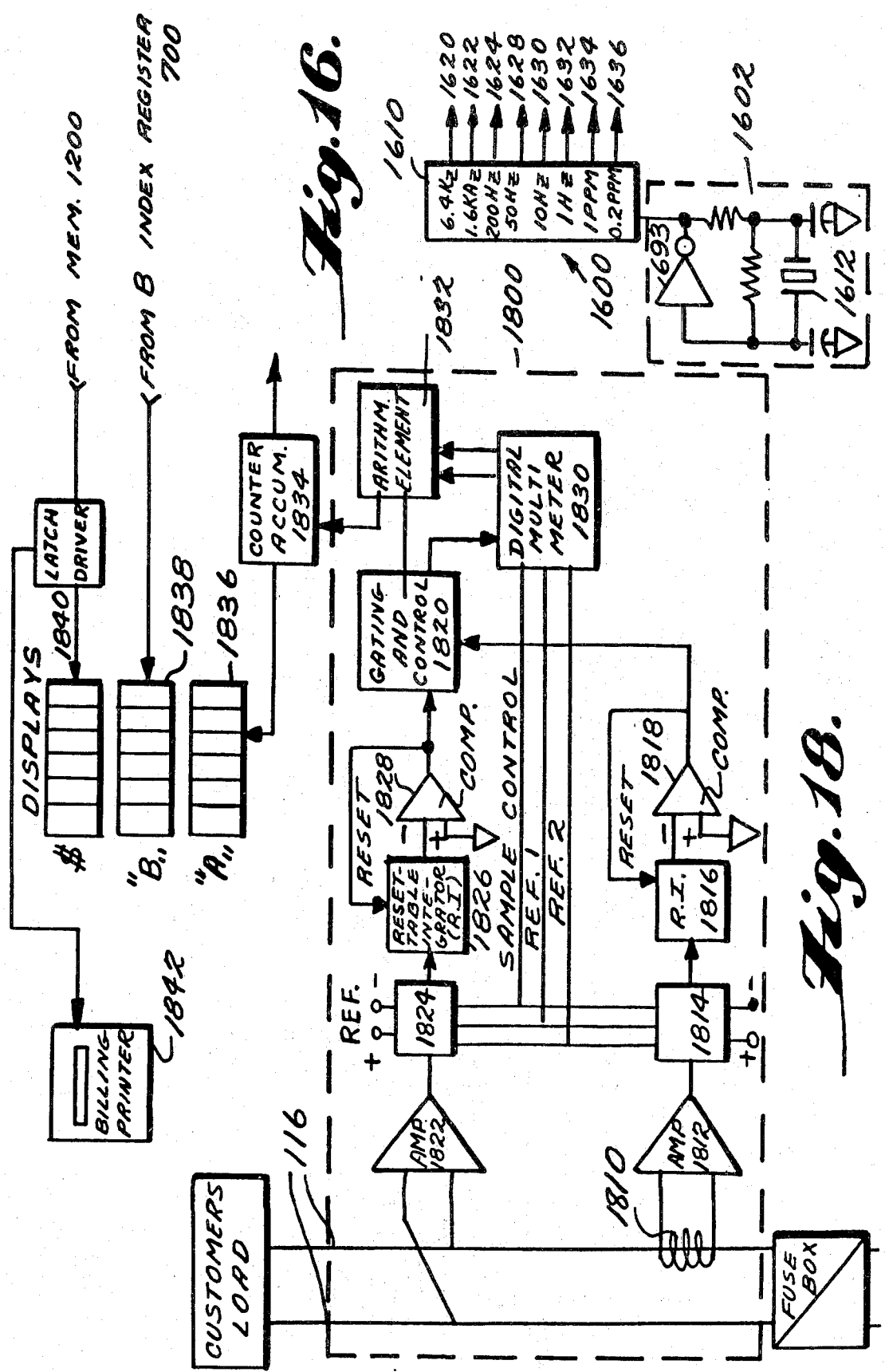
FIG. 16 shows a suitable timing network such as shown in FIG. 1.

CCPU 200, memory unit 1200 and telephone interface 1400 are all suitably powered by a single cell power supply 158. Power supply 158 is suitably a lithium battery, or any other power source. If desired, power supply 158 can be adapted to power various of the other components of remote unit 110, as is well known in the art. Timing pulses are supplied to CCPU 200 by a conventional timing network 1600, suitably comprising an crystal oscillator 1602, and countdown chain 1610 such as shown in FIG. 16.

In general, the operation of the system is as follows. CCPU 200 is preloaded (at the time of the just previous callback) with various operational parameters, including an indication of the desired callback time. Pulses from transducers 118 and 120 are accumulated in registers within CCPU 200. In the meantime, clock pulses from timing network 1600 increment real time clock logic within CCPU 200. When the real time indication matches the preset desired callback time, remote unit 110 initiates a telephone call to central complex 100.

In executing the call to the central complex, CCPU 200 extracts the central complex telephone number from memory for application to telephone interface 1400. The signals to telephone interface 1400 suitably include a local/long distance call flag byte, followed by three decimal bytes (hexadecimal digits) indicative of the area code (if long distance), then seven hexadecimal digits representative of the telephone number of the central complex. Telephone interface 1400 applies appropriate dialing signals to the telephone lines 114.

The central complex, addressed by the telephone system, in effect, answers the call and responds by transmitting back to the remote unit an acknowledgement signal. The acknowledgement signal is in the form of a synchronization pulse sequence. The sync sequence is, for example, thirty-one (31) successive tone burst pulses.

Upon detection of the synchronization signal, CCPU 200 effects data transmission to the central complex through telephone interface 1400 and telephone lines 114. The data transmission suitably comprises a leading synchronization signal, followed by a five (5) hexadecimal digit code indicative of the identification of the remote unit 110, e.g., the account number of the customer. After the remote unit identify code is transmitted, codes representative of the contents of the respective index registers are transmitted (suitably four hexadecimal digits each). The data transmission also includes, if desired, a status alarm (one or more hexadecimal digits) portion representative of various alarm systems, and a pulse status byte. The end of the transmission is signified by transmission of an error code signal, derived from the previous data of the transmission.

Central complex 100 receives the transmission from remote unit 110 and analyzes the transmission with respect to the error code. If the error code is found proper, the central complex replies with an instruction transmission to the remote unit 110. The instruction transmission suitably comprises a leading sync signal, a code indicative of the next desired callback time, (suitably four hexadecimal digits), a code indicative of the instantaneous real time for resetting the real time register in CCPU 200. Both the callback time and real time clock are suitably in the form of day, hour and minute. Updating the real time clock register with each report, minimizes accumulated error and eliminates the need for highly accurate timing mechanisms. The instruction transmission suitably further includes load demand control instructions, relating to peak time index periods, and demand control (appliance control). The transmission is terminated with an error code such as utilized in the data transmission to the central complex.

Upon reception of the completed instruction transmission, remote unit 110 will analyze the instruction transmission error code. If the error code is proper, remote unit 110 will release the telephone lines and begin the cycle anew. However, if an improper error code is indicated, the callback sequence will be repeated after a predetermined delay (e.g., four minutes).

It should be appreciated that remote unit 110 has none of the limitations inherent in prior art meter reading systems. Since the remote unit initiates the call to the central complex, no modifications are required of the telephone exchange. Remote unit 110, through proper sensors 112, can monitor a plurality of functions. For example, two individual indexes (gas, electric, water or other meters), of four hexadecimal digits each can be accommodated. The second index (through proper instructions from the central complex) can also be used as a peak load consumption indicator. For example, energy consumption can be recorded in terms of a plurality of time intervals (e.g., 12) of predetermined duration (e.g., two hours). Various intervals can be designated as peak load periods during which consumed energy registers in both indexes.

In addition, remote unit 110 can operate as a so called demand meter. In the demand meter mode, remote unit 110 samples power consumption at various predetermined intervals of time, e.g., five minute intervals. The highest power consumption sampled and, if desired, the time at which the sample was taken is registered in the second index for statistic keeping purposes. The remote unit 110 is particularly advantageous in this regard in that the sampling intervals can be changed by central complex 100 without requiring any manual modification of the remote unit.

Similarly, remote unit 110 can be instructed to register all power consumed beyond a predetermined amount, for example, a predetermined number of kilowatt hours, be registered in the second index to facilitate consumption related charges. Provisions can also be made through appliance control 134 for deactivating various appliances for a period of time when the user power consumption reaches a predetermined threshold level or rate of consumption. The user can reactivate the appliance through over-ride switch 136 but thereafter power will be registered in the second index.

As noted above, central control and processing unit (CCPU) 200 controls the overall operation of remote unit 110. CCPU 200 is suitably in integrated circuit form. Referring now to FIG. 2, CCPU 200 includes a data input byte decoder circuit 300, an input data register circuit 400, an "A" index register circuit 500, a "B" index register circuit 700, an error code processing circuit 900, an output control circuit 1000, an off-hook and receive mode control circuit 1100 and a timing circuit 1600. "A" index register 500, "B" index register 700, error code processor 900, and output control circuit 1000 are interconnected by a conventional output data bus 226. Similarly, a conventional input data bus 228 interconnects data input byte decoder 300, input data register 400, "B" index register 700 and error code processor 900.

Data input byte decoder 300 receives transmissions from the central complex in serial form through telephone interface 1400 and derives a parallel code word. The respective bytes of the code word are selectively applied to various of the other functional circuits of CCPU 200 through input data bus 228. Referring now to FIG. 3, the serial instruction data from the computer complex (generated after a data transmission is initiated by remote unit 110) is applied through telephone interface 1400 to a demodulator 310. The data is in the form of serial tone bursts. The tone bursts are suitably pulses of a 1.6 KHz signal, on the order of 2.5 milliseconds in duration. Hexadecimal digits of data are represented by the number of bursts between successive sequences of a predetermined number of spaces (e.g., 4). An exemplary data transmission and decoded signals are illustrated in FIG. 10b. Demodulator 310 provides a serial pulse train indicative of the data.

A parallel code byte is derived from the demodulated pulse train. The demodulated pulse train is applied to an end-of-byte detector 312. End-of-byte detector 312 is, in effect, a missing pulse detector. End-of-byte detector 312, in effect, counts spaces (missing pulses) and generates first ($T_1$) and second ($T_2$) CLR signals upon detection of four successive spaces (signifying end-of-byte). Signal $T_2$ is slightly delayed relative to signal $T_1$. The demodulated pulse train is also applied to a conventional 5-bit counter 314. Counter 314 accumulates the serial pulses of the demodulated signal. The $T_2$ output signal (CLR) of end-of-byte detector 312 is applied as a reset signal to counter 314, to clear the counter in preparation for reception of the next successive data byte. Counter 314 thus provides a parallel representation of the instruction word byte. The parallel instruction word byte is applied to bus 228 for selective application to input data register 400, "B" index register 700, error code processor 900 and to a sync detector 332 (as will be explained).

Control of the extraction of data bytes from bus 228 is effected through the generation of byte control signals indicative of the particular byte represented in counter 314. The $T_2$ end-of-byte signal from detector 312 is applied as a clock signal to increment a conventional binary counter 316. Counter 316 is coupled to a conventional decoder 318. Decoder 318 samples the contents of counter 316 in response to strobe signals from end-of-byte detector 312. Counter 316 is cleared when remote unit 110 first enters a reception mode operation after a successful data transmission to the central complex. The clearing is effected by a receive mode control signal generated on control line conductor 1112 by offhook control and receive mode control circuit 1100 (as will be explained). Thus, counter 316 provides a counter indicative of the particular byte provided on bus 228. Decoder 318 therefore provides a high level signal on the particular control line 320 associated with the instantaneous instruction word byte represented in counter 314.

The preferred exemplary embodiment of the instruction word format is shown schematically in FIG. 3a. The instruction word comprises, in sequence, a leading sync byte (byte 0), four bytes representing a desired callback time (bytes 1-4), four bytes representative of the instantaneous real time (bytes 8-11), three bytes relating to load management timing (bytes 8-11), a "B" index control byte (byte 12), two "Q" register control bytes (bytes 13, 14), a demand load management interval control byte (byte 15) and a two byte error code (bytes 16, 17). Other instruction word formats, can of course be used. Similarly, further instructions such as a one byte billing instruction can be interjected into the instruction word prior to the error code. It must be stressed that the instruction word transmission is generated only in response to a data transmission initiated by the remote unit 110.

Sync detector 332 detects reception of a proper acknowledgement (synchronization) signal from the central complex in response to a data transmission by remote unit 110. Sync detector 332 is formed of state of the art logic circuitry. In the present example, the synchronization signal comprises a signal having at least twenty-four successive marks (signal bursts). Normal data bytes are hexadecimal and therefore have a maximum value of 16. Normal data bytes are therefore represented in the first four bits of counter 314. Only when a count of twenty-four or greater is attained, is a count registered in the fourth and fifth bits of counter 314. Sync detector 322 monitors the fourth and fifth bits of counter 314, and generates, upon detection of data byte counts of twenty-four or greater, a "good sync-in" signal indicative of proper acknowledgement. Sync detector 332 is enabled by the byte 0 control signal from decoder 318, (indicating that the first byte (byte 0) is contained in counter 314). Thus, a "good sync-in" signal is generated only when the first instruction word byte (byte 0) received after entry into the reception mode, is a proper acknowledgement signal. The "good sync-in" signal is generated over line 324 to output control circuit 1000.

When instruction word byte 0 does not contain a proper acknowledgement (synchronization) signal, sync detector 332 generates a "CLR callback" control signal over line 326 to input data register circuit 400. The CLR callback control signal initiates a delayed callback procedure as will be explained.

Input register circuit 400 stores the timing and demand load management parameters from the input instruction code word. The respective data bytes are loaded into the respective components of data input register 400 from data bus 228. Instruction word data bytes 1-4 represent the time at which the next data transmission to the central complex is to be initiated. Referring to FIG. 4, data input register circuit 400 includes a callback time register 410. Register 410 suitably comprises a four 4-bit state, respectively corresponding to bytes 1-4. Instruction word bytes 1-4 are loaded (in response to the byte control signals from decoder 318) into the respective 4-bit register stages of callback time register 410.

Input data register 400 also includes presettable real time clock logic 412. Presettable logic 412 suitably comprises successive stages 412a, 412b, 412c and 412d. 412a and 412b are suitably 4-bit counters, stage 412c a 3-bit counter and a fourth stage 412d, a 5-bit counter. Instruction word bytes 5-7 are representative of the actual real time minutes and hours. Instruction bytes 5-7 are loaded into stages 412a, 412b and 412c, respectively. Fourth stage 412d is reset to zero upon successful reception of an instruction word. Presettable counter 412a is incremented in response to a one pulse per minute signal from timing circuit 1600. Presettable counter 412a, 412b, 412c and 412d are interconnected (and reset) by state of the art logic circuitry (not shown) such that presettable counters 412a, 412b and 412c provide an indication of the real time minutes and hours, and counter 412d provides an indication of the days lapsed since receipt of the last successful instruction word. Real time minutes are represented in counter 412a and the first two bits of counter 412b. Real time hours are represented in the last two bits of counter 412b and counter 412c.

The respective contents of real time clock logic 412 and callback time register 410 are applied to a 16-bit comparator 414. Comparator 414 generates a callback initiation signal which is applied to offhook and receive mode control circuit 222 to initiate a data transmission to central complex 100.

It should be appreciated that by updating presettable real time clock logic 412 upon each transmission sequence, cumulative error is avoided. Thus, a highly accurate timing circuit 1600 is not required.

Input data register 400 also provides control signals for effecting load management functions. The load management timing parameters are represented in bytes 8-11. Byte 8 is representative of the actual (present) day of the week and bytes 9-11 are representative of the designated hours of those days during which the load management functions are to be performed. Instruction byte 8 is loaded into a conventional 3-bit counter 416. Counter 416 is incremented by signals from real time clock logic 412 indicative of the passage of a day. The contents of counter 416 are applied to state of the art decoder gating logic 418. Decoder gating logic 418 generates a signal indicative of a count of 7 to reset counter 416 upon a count representative of a Sunday, to provide for tracking of the days of the week. Gating 418 also provides a high level output signal when the actual (present) day is a weekday.

Instruction bytes 9, 10 and 11 are loaded into respective 4-bit stages of a conventional 12-bit register 420. Each bit of register 420 is associated with a particular two hour time slot. The contents of register 420 are applied to state of the art decoder logic 422. Decoder logic 422 is also receptive of signals indicative of the real time hour from real time clock logic 412. The output signal of decoder 422 generated on line 424 indicates whether the particular real time hour is within one of the predesignated two hour load management slots.

Decoder logic 422 may, for example, comprise a conventional digital multiplexer (MUX). The MUX would generate an output signal indicative of the contents of the particular two hour slot bit of register 420 corresponding to the real time hour. Thus, a high or low value signal would be generated in accordance with whether or not the real time hour fell within one of the predesignated two hour slots. The output signals of decoder gating logic 418 and decoder gating 422 are in turn gated by suitable logic 446 to selectively provide an enable B index input signal (ENB B-IN) on line 448, for application to B index circuit 700.

As will be more fully described below, B index register 700 is capable of operating in a number of different modes. For example, B index register 700 may be used as an extension of A index register 500 for double precision metering. For double precision metering, B index register 700 is incremented in response to the most significant bit of A index register 500. Alternatively, B index register 700 may be utilized to accumulate consumption pulses generated by B index sensor 120. In this case, B index register 700 is selectively enabled during those periods defined by the ENB B-IN signal on line 448. B index 700 can be continuously enabled, to operate as an independent register (normal mode) or can be enabled only during predesignated time slots.

Byte 12 of the instruction word controls the operational mode of B index register 700. Byte 12 of the instruction word is loaded into a 4-bit register 450. The first two bits ($C_0$, $C_1$) of register 450 are coupled to gating 446 to provide control signals used in generating the ENB B-IN signal on line 448. The second two bits ($C_2$, $C_3$) of register 450 are applied to a conventional decoder for generating respective mode control signals for B index 700.

Gating 446 generates the ENB B-IN control signal on line 448 during periods in accordance with the content of the first two bits ($C_0$, $C_1$) of register 450. For example, when both bits are 0, the enable B-IN signal is continuously generated, irrespective of the day and time of day signals from decoder gating circuits 418 and 422. When the first two bits ($C_0$, $C_1$) contain a 1, 0 combination, ENB B-IN signal is generated only during time periods when high level signals are provided from both decoder gating 418 and decoder gating 422 (i.e., provided during the predesignated time-of-day slots on weekdays). When bits $C_0$, $C_1$ contain a 0, 1 combination, the ENB B-IN signal is generated in response to high level time-of-day signals irrespective of the day signal from gating 418 (i.e., generated during the predesignated time-of-day slots for seven days a week). When a 1, 1 content is loaded into the first two bits of register 450, gating circuit 446 is inhibited, and the ENB B-IN signal maintained at a low level. Other coding schemes can, of course, be used.

The content of the second two bits, $C_2$ and $C_3$, of register 450 control the operational mode of B index 700. For example, normal double precision, demand metering (DMD) and load management (L-M) operational modes are provided, as will be explained in conjunction with FIG. 7. When the contents of bits $C_2$ and $C_3$ are a first value, e.g., 0, 0, a normal mode operation results. Similarly, when the contents of bits $C_2$ and $C_3$ are, for example, 1, 0, an AMSB control signal is generated by decoder 452 (on line 452*b*) to effect a double precision mode of operation. In response to other values of bits $C_2$ and $C_3$, respective control signals are generated to effect DMD mode operation on line 452*c* and load L-M mode operation on line 452*d*. A signal indicative of generation of either of the DMD or L-M mode signals is also provided on line 452*e*.

Byte 15 of the instruction word is indicative of the sampling rate for demand or load management functions. Instruction word byte 15 is loaded into a 4-bit register 454. Counter 456 is decremented in response to a one pulse per five minute (1 pp 5 m) interval clock signal from timing circuit 1600. Counter 456 generates a sampling signal (sample T) on line 456*e* and is reloaded each time it counts down to zero (0). Sampling signals may thus be generated at intervals of any increment of five minutes between five and eighty minutes.

"A" index 500 receives and accumulates the power consumption pulses from first index sensor 118. Referring now to FIG. 5, the pulses from first index sensor 118 are applied to conventional debouncing and pulse shaping circuitry 510. Debouncing circuitry 510 is also responsive to a $5\theta$ Hz clock signal from timing circuit 1600. Debouncing circuitry 510, in effect, generates pulses indicative of the pulse from index sensor 118 which are suitable for application to conventional digital circuitry.

The debounced pulses (INC A) are applied to an accumulator 512 and are provided over a line 510*a* to B index register 700 (as will be explained). Accumulator 512 suitably comprises two 8-bit counters, 514 and 516. The debounced pulses increment counter 514. Counter 516 is incremented by the most significant bit of counter 514. Both counters 514 and 516 are reset by an externally applied signal over control line 560. The reset signal is suitably indicative of a completed communication (good EC). The contents of accumulator 512 are indicative of cumulative power consumption registered by the A index of meter 115.

Counter 516 may be readily tested by inclusion of a two input OR gate 518 interconnected between counters 514 and 516. The other input of OR gate 518 is receptive of a test signal which may be utilized to increment counter 516 for test purposes.

The contents of accumulator 512 are applied to conventional gated bus driver 520. In addition, the most significant bit of counter 516 is provided over line 540 as input to B index register 700 as will be explained.

Gated bus driver 520 operates under the control of suitable logic gating 522 which is responsive to the reset signal of line 560 and control signals (OAR 16–19) over lines 1072 from an output byte address decoder in output control circuitry 1000. As will be explained in conjunction with FIG. 10, output control signals (OAR) are utilized to provide timed application of data to output data bus 226 as the respective data transmission bytes. Control signals OAR 16, 17, 18 and 19 correspond to bytes 6, 7, 8 and 9, respectively, of the data transmission word. Logic gating 522 causes the contents of respective portions of accumulator 512 to be applied to output data bus 226, in accordance with the particular output byte control signal (OAR) applied to gating logic 522. The operation of A index register 500 is shown in flow chart form in FIG. 6.

"A" index register 500 also includes an alarm status register 524. Alarm status register 524 provides indicia of the operational status of various remote alarm sensors and initiates a call to the central complex upon detection of an alarm condition. Signals from respective alarm sensors in alarm and sensor control circuit 1500 are applied to conventional debouncing circuit 526. The alarm sensor signals are generated in response to predetermined alarm conditions. The alarm sensor signals, suitably shaped, are stored in respective latches 528. The stored signals are selectively applied to output data bus 226 through a bus driver 530. Bus driver 530 is activated by an appropriate control signal (OAR 24, on control line 1075) from the output byte address decoder of output control circuit 1000. The stored signal is also applied through gate 532 to generate an alarm control signal on line 534.

The alarm control signal is applied to offhook and receive mode control circuit, 1100 to initiate a data transmission to the central complex. The central complex telephone number is dialed and the data transmitted. The alarm status information stored in latches 528 is transmitted as byte 14 of the transmission word in response to the appropriate control signal from the output byte address decoder.

Alarm status register 524 is also responsive to control signals from error code processing circuit 900 indicative of good and bad error codes contained in the responsive instruction word from cental complex 100. As will be hereinafter more fully explained in conjunction with FIG. 9, a good error code signal (good EC) will be generated if the communication with central complex 100 is successful. However, if the communication with central complex 100 is unsuccessful, a bad error code (bad EC signal) will be generated. If the good EC signal is generated the latches 528 will be cleared. The bad error code control signal (bad EC FF) is utilized to set a further latch 536. The contents of the latch 536 are applied as an additional signal to gate 532 and to bus driver 530. Thus, upon successful transmission, an indication is provided in data byte 14 that a problem had previously occurred, and that adjustments to the system are perhaps necessary.

Referring to FIG. 7, B index register 700 will be described. Pulses from B index sensor 120 are applied to conventional debouncing circuit 710. Debouncing circuit 710 is similar to debouncing circuitry 510 of A index register 500. The shaped pulses from debouncing circuitry 710 are gated with the ENB B-IN signal generated on line 448 by input data register 400. The gated pulses are then applied through a conventional OR gate 714 to the clock input of a conventional 8-bit counter 716. The other input terminal of OR gate 714 is receptive of the output signals of a conventional two input AND gate 718. AND gate 718 gates the most significant bit of the A register (line 540) with the AMSB control signal generated on line 452*b* by decoder 452 of input data register 400. It should be recalled that the ENB B-IN signal on line 448 is maintained in a low state during the periods when B index 700 is utilized to count the most significant bit of the A index. OR gate 714 thus selectively applies as a clock signal to counter 716, either the debounced pulses indicative of signals from B index sensor 120 or the most significant bit (MSB) of A index register counter 516.

The most significant bit of counter 716 is coupled through suitable logic gating 732 (as will be explained) to a second 8-bit counter stage 717. Logic gating 732 is also responsive to the INC A signal (line 540a from A index register 500), the L-M mode control signal (line 452d from mode decoder 452 of input data register circuit 400) and to a customer over-ride signal applied on line 1712. Logic 732 selectively applies the INC A signal or the MSB of counter 716 to increment counter 717 or inhibits counter 717, in accordance with the operational mode of the system.

The contents of counter 716 are applied through suitable gating logic 722 to an 8-bit "Q" register 720. Gating logic 722, is responsive to the L-M mode control signal (line 452d) and selectively couples Q register 720 to counter 716 or to input data bus 228. "Q" register 720 is responsive to respective load and clear signals generated by suitable control logic gating 724. Control logic 724 is responsive to a B>Q signal generated by an 8-bit comparator 726, a timing signal generated by a pulse generator 730, the byte 13 and byte 14 data input control signals the DMD mode and the L-M control signals (line 452c and 452d from mode decoder 452 of input data register 400) and a 6.4 KHz system clock signal from timing circuit 1600.

Pulse generator 730 is responsive to the system clock signal from timing circuit 1600, the sample T signal (line 456a from counter 456 of input data register 400) and the "L-M or DMD mode" control signal (line 452e from data input register 400). Pulse generator 730 generates first ($T_1$) and second ($T_2$) shaped clock signals during DMD and L-M mode operation.

Comparator 726 is responsive to the respective contents of counter 716 and Q register 720. A B>Q signal is generated when the contents of counter 716 exceed the contents of Q register 720.

The contents of Q register 720 and counter 717 are selectively coupled to output data bus 226 through a bank of gated bus drivers 734. Bus drivers 734 are controlled by gating logic 736 and selectively provide the contents of Q register 720 and counter 717 as output data bytes 10-13.

As noted above, B index register 700 provides for a number of different operational modes. B index register 700 can operate, in effect, as an independent register from A index register 500, or can operate as as extension of A index register 500 to provide for double precision measuring. B index register 700 also provides for load management operation and for demand metering.

In the normal (independent) operational mode, B index register 700 accumulates a count indicative of the number of pulses produced by second index sensor 120. Normal mode operation is entered in response to, for example, a 0, 0, 0, 0, content in bits $C_0$–$C_3$ of instruction word byte 12. Gating 446 is made to provide a high level ENB B-IN signal on a continuous basis. Counter 716 accumulates a count indicative of consumption registered on the B index of meter 115. Gating 732 applies the MSB of counter 716 to the clock input of counter 717. Control gating 724 generates a load signal to Q register 720 in response to each system clock pulse (in effect, is continuously loaded). Q register 720 thus follows counter 716. Gated bus driver 734 therefore, in effect, provides the contents of counters 716 and 717 as data input bytes 10-13. B index register 700 thus operates in a manner analogous to A index register 500.

In the double precision mode, B index register 700 operates as an extension of A index register 500. In this mode, counter 716 is, in effect, incremented by the most significant bit of the A index register. Double precision mode operation is signified by generation of a high level AMSB control signal on line 452b from mode decoder 452 of input data register 400. The high level signal on line 452b enables AND gate 718 with respect to the MSB signals on line 540 from A index register 500. The ENB B-IN signal on line 448 is low, inhibits AND gate 712. Counter 716 is thus incremented in response to the MSB of counter 516 of A index register 500. As in normal mode operation, gating 732 applies the MSB of counter 716 to counter 717 and control gating 724 continuously loads Q register 720. The contents of counters 716 and 717 are thus an extension of the contents of counter 512 and are provided by bus drivers 734 as data output bytes 10-13.

Figure 8A:
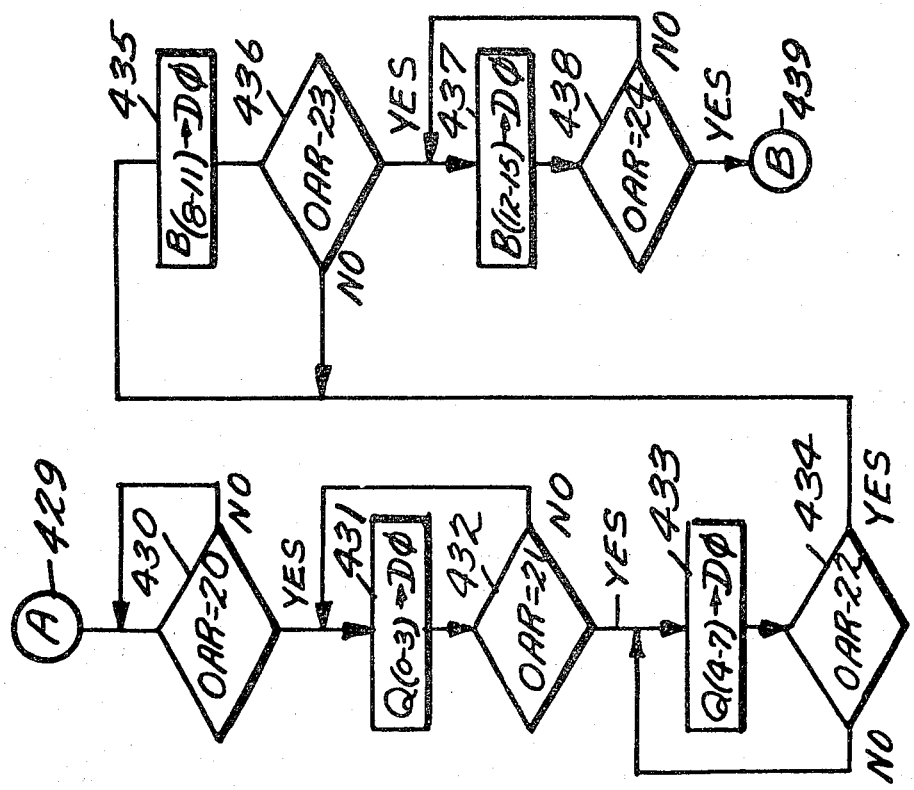
FIGS. 8a, 8b, 8c and 8 d are logic flow diagrams relating to the operation of the B index of FIG. 7.
Figure 8B:
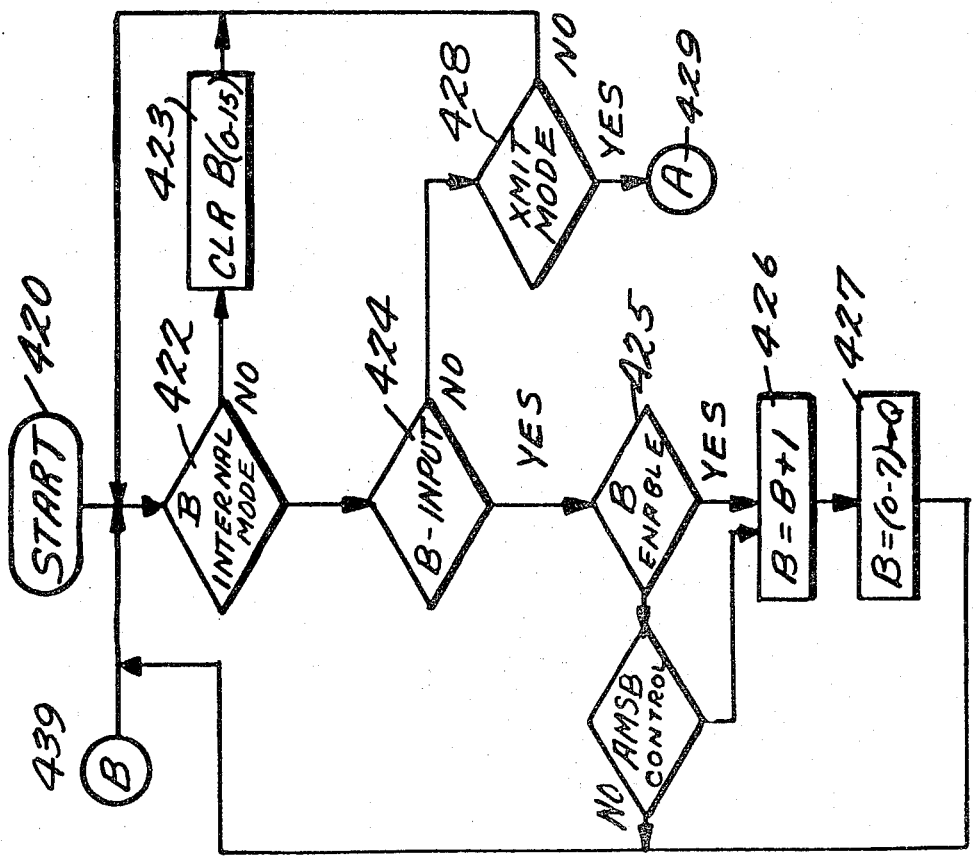
Figure 8D:
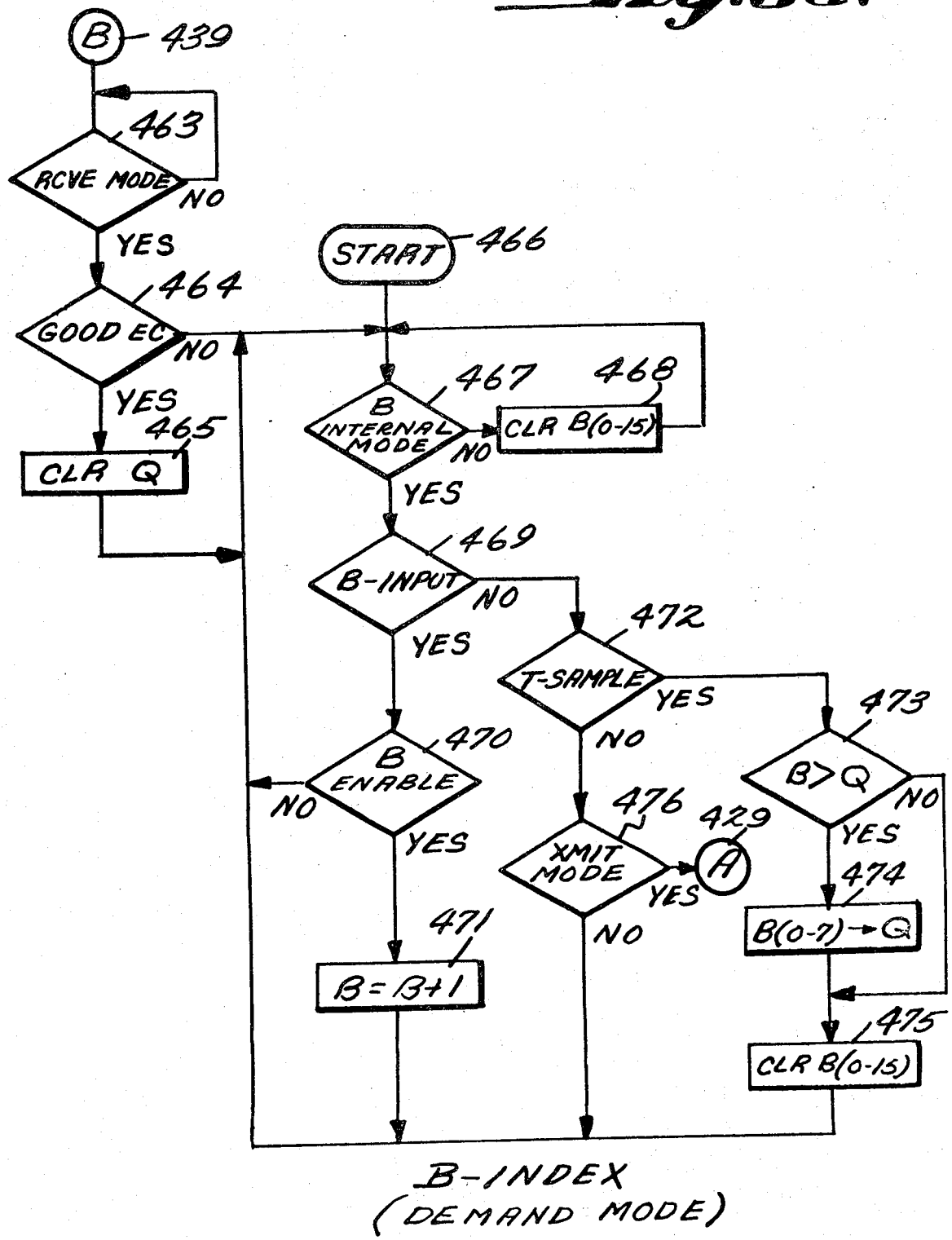

The accumulation of counts during the independent and double precision operational modes of B index register 700 and the transmission of the contents of Q register 720 and counter 717 as data bytes 10-13 are illustrated in flow chart form in FIGS. 8a and 8b, respectively. In the flow charts, b(0-15) represents counters 716 and 717, B(0-7) counter 716 and B(8-15) counter 717.

In the load management mode of operation, B index register 700, in effect, compares the count accumulation in the B index during given periods to a preset threshold value. Control signals are then generated in accordance with the result of the comparison to effect control of specified consumer appliances. As noted above, the operational mode of the B register is specified in byte 12 of the instruction code word. The load management mode is signified by a high level L-M mode control signal on line 452d from decoder 452.

Bytes 13 and 14 of the instruction word are indicative of desired load management threshold values. The instruction word bytes 13 and 14 are selectively loaded into 8-bit Q register 720 through logic gating 722, responsive to the L-M mode control signal generated on line 452d.

When the load management mode is first entered, Q register 720 is, in effect, coupled to data bus 228. Respective load commands are generated to Q register 720 by control logic 724 in response to the byte 13 and byte 14 control signals from decoder 318 (of data input and byte decoder 300). The instruction word bytes 13 and 14 are thus loaded into respective portions of Q register 720.

Comparator 726 generates a logic high output signal when the contents of counter 716 become greater than the contents of Q register 720. The output of comparator 726 is applied as an data input to a logic circuit 720 including a 2-bit shift register. Shift register logic 728 is enabled by the L-M mode control signal on line 452d.

The sampling periods are determined in accordance with the sample time control signal (sample T) generated on line 456a by counter 456 (of input data register 400). Pulse generator 730 is enabled during the demand and load management mode by the DMD or L-M mode control signal developed by input data register 500. A first pulse ($T_1$) is generated in response to each sample T pulse on line 456a from data input register 400. A second pulse ($T_2$) delayed by a predetermined amount with respect to the $T_1$ pulse is also generated. In the load management mode, the $T_1$ is applied as a clock signal to shift register logic 728. The $T_2$ pulse is applied to reset counter 716.

The contents of counter 716 and Q register 720 (i.e., the preloaded threshold level of instruction word bytes 13 and 14) are, in effect, continuously compared by comparator 726. The comparison result at each sampling time as determined by the sample T signal on line 456a is entered into shift register 728. Shift register 728 generates appropriate control signals to appliance control circuitry 134 (FIG. 17) to turn off a specified consumer appliance. Counter 716 is then cleared in preparation for the next sampling interval. If the count accumulated in counter 716 during the next sampling interval is again greater than the threshold value stored in Q register 720, the logic high output signal of comparator 726 is loaded into shift register 728 to turn off a further specified consumer appliance. If, during the next sampling interval, the accumulation in counter 716 does not reach the threshold level, a logic low input will be provided by comparator 726 to shift register 728 and one customer appliance will be reactivated. It should be appreciated that any number of appliances can be accommodated in this manner. Of course, more complicated schemes for determining which appliance will be deactivated or reactivated may be utilized.

It should be appreciated that the exchange of intelligence between the remote unit and central complex 100 provides a particularly advantageous remote control system. For example, B index register 700, operating in a load management mode, can effect operation of, for example, operating valves and switches. For example, the system can be used as a traffic monitor to control traffic light timing and lane direction control in accordance with traffic volume. Similarly, the device can be used as a sewage meter and control or as a fluid meter and control. For example, if a fluid parameter such as fluid level, pressure, or temperature becomes higher (or lower) than the level preset into the Q register 720, shift register 728 can provide signals to control an overflow valve. If, at the next sampling, the fluid parameter is still higher than the preinstructed level, a second overflow valve can be operated, and so forth. In other applications, the load control signals can be utilized to operate cooling fans in response to a detected over-heating, or to switch loads upon detection of an over-voltage. The system can also be modified to operate as a cash register/credit card monitor. A credit card check would be performed analogously to a consumer test. The credit card number would be transmitted as data to the central complex, along with the amount of purchase. The instruction word from the central complex would then check the account and transmit an approval/non-approval number to the remote unit. If desired, the approval/non-approval number can be printed out on the customers sale slip.

As previously noted, a customer over-ride 136 is provided to allow the customer to reactivate appliances deactivated by appliance control circuitry 134. However, power consumed during the over-ride period is registered in counter 717 for billing at premium rates. The over-ride is effected by closing a switch 1710 in customer test and over-ride circuit 136. The over-ride control signal is applied over control line 1712 to logic 732 causing the increment A signals on line 540 to increment counter 717. For example, the over-ride control signal can enable an AND gate (not shown) in gating 732. The AND gate would also be responsive to the L-M mode control signal and increment A signal and would have its output terminal coupled to the clock input of counter 717. If desired, the respective load command lines from shift register logic 728 may be applied as inputs to an OR gate to provide a further control signal to the AND gate to prevent accumulation by counter 717 during periods when no appliance is actually deactivated. The contents of counter 717 are transmitted as data word bytes 12 and 13, and are thereafter cleared upon acknowledgement of a good data transmission (generation of a good error code signal). Load management mode operation is illustrated in flow chart form in FIG. 8c.

In the demand metering mode of operation, consumption during respective sampling periods is registered and compared with the highest consumption during previous sampling periods to determine the highest consumption registered. Demand measurement mode operation is signified by generation of a high level signal (DMD mode) on control line 452c from decoder 452, (input data register 400). Counter 716 accumulates a count indicative of power consumption. Q register 720 is suitably cleared. Of course, if desired, Q register 720 can be preloaded with a threshold value contained in bytes 13 and 14 of the instruction word. The contents of counter 716 and Q register 720 are again compared by comparator 726. The comparison result is applied as a control signal to control logic gating 724. Pulse generator 730, as in the load management mode, generates respective timing pulses $T_1$ and $T_2$ in response to the sample T signals on line 456a from counter 456 (input data register 400). If, upon generation of the $T_1$ signal (signifying the end of a sampling period) the contents of counter 716 exceed the contents of Q register 720, gating logic 724 generates a load command to Q register 720. The contents of counter 716 are passed through select gating 722 and are entered into Q register 720. If the accumulated consumption count in counter 716 does not exceed the content of Q register 720, the count in Q register 720 is maintained. Counter 716 is then cleared by the delayed timing pulse $T_2$ in preparation for the next sampling period.

The counts accumulated during each designated successive sampling periods are compared to the instantaneous content of Q register 720. Thus, the content of Q register 720 indicates the highest level of consumption in the designated sampling periods. The utility can use such information to determine peak load demand. If desired, provisions (not shown) can be included to provide an indication of when the peak consumption interval occurs. The contents of Q register 720 would be outputted by bus driver 734 as data bytes 10 and 11. The time indication could be outputted as bytes 12 and 13 instead of the contents of counter 717. The demand metering operation is shown in flow chart form in FIG. 8d.

As noted above, various counts are retained until a good data transmission is achieved. A good data transmission is signified by generation of a good error code (good EC) signal. The good error code signal is generated by error code processor 900. The last two bytes of the instruction word from central complex 100 contains an error code. As the preceding instruction word bytes are received, they are analyzed by error code processor 900 and the correct error code for that data computed. The computed error code is then compared to the transmitted error code in bytes 15 and 16 of the instruction word. If a proper comparison results, a good error code signal is generated. If the computed error code does not match the error code in bytes 16 and 17, a bad error code signal is generated. Error code processing circuit 900 also analyzes the data transmission to the central complex and provides an error code for transmission as bytes 16 and 17 of the data transmission. A suitable error code processing circuit is shown in FIG. 9. In the preferred embodiment, a combination of two standard error coding techniques are utilized. Of course, any desired error code technique may be utilized.

The three most significant bits of the information bytes are analyzed in accordance with a conventional longitudinal redundancy check. In a longitudinal redundancy check, (LRC) the respective information bits are applied as one input to respective two input exclusive OR gates. The outputs of the exclusive OR gates are latched. The other input to the exclusive OR gates receives feedback signals from the corresponding latch. Thus, an LRC code is developed in the latch register.

The least significant bit of the error code, where most errors are most likely to occur, is analyzed in accordance with standard Bose-Chaudhuri-Hocquenghem (BCH) techniques. In brief, the respective least significant bits of the data bytes are utilized as the coefficients in respective binary polynomials (message polynomial $M(x)$ and generator polynomial $G(x)$). The message polynomial $M(x)$ is divided (mod 2) by the generator polynomial $G(x)$ to develop a remainder. The remainder is utilized as the BCH error code. The use of BCH is particularly advantageous in that it provides for detection of both random errors and bursts of errors often occurring due to noise in telephone transmissions. For a more detailed description of BCH error code techniques, reference is made to Bose and Ray-Chaudhuri, "On a Class of Error Correction, Binary Group Codes", *Information and Control*, Vol. 3, 1960. Reference is also made to Peterson and Wesley, *Error Detecting Codes*, MIT Press and John Wiley & Sons, 1961.

Referring to FIG. 9, input data bus 228 and output data bus 226 are coupled as inputs to the receive mode control signal generated by offhook control circuit 1100 on control line 1112. During the receive mode, the instruction word bytes on data input bus 228 are provided at the output terminals $E_0$–$E_3$ of multiplexer 910. During the transmit mode, however, the data bytes are provided by the multiplexer. The three most significant bits ($E_1$–$E_3$) of the output bytes of multiplexer 910 are applied to a three bit LRC code generator 912. LRC code generator 912 provides a 3-bit LRC code ($LRC_0$–$LRC_2$). The least significant bit ($E_0$) is applied to a BCH function generator 914. BCH function generator 914 generates a 5-bit BCH error code ($X_0$–$X_4$). The three LRC code bits and the least significant bit ($X_0$) of the BCH are applied to a gated bus driver 916. Bus driver 916 is responsive to the control signal OAR 25, corresponding to data byte 16 from the output byte address decoder in output control circuitry 1012. Similarly, the four most significant bits of the BCH code are applied to a bus driver 918. Driver 918 is responsive to the control signal OAR 26, corresponding to byte 17 of the data transmission word.

Thus, during the transmission mode the data bytes are sequentially applied through multiplexer 910 to LRC generator 912 and BCH function generator 914. An LRC code is developed with respect to the three most significant bits of the data transmission bytes and a BCH code developed with respect to the least significant bits of the bytes. The 3-bit LRC and 5-bit BCH codes are then transmitted as data transmission bytes 16 and 17.

During the receive mode, however, the instruction word bytes are sequentially applied to error code generators 912 and 914 by multiplexer 910. Thus, as the instruction work bytes are received, the corresponding error LRC and BCH codes are calculated. Identical calculations take place in the central complex to develop the error code for transmission as instruction work bytes 16 and 17. Accordingly, if the transmission is successful, the error codes calculated in LRC generator 912 and BCH function generator 914 from instruction word bytes 1–15 should be identical to the error code in bytes 16 and 17 of the instruction word.

Bytes $E_0$–$E_3$ of the multiplexer output and the respective error codes are applied to suitable comparator logic 920. Comparator logic 920 generates a good error code pulse when both byte 16 of the instruction word compares favorably with the LRC error code and the least significant bit of the BCH code and byte 17 of the instruction word compares favorably with the remaining more significant bits of the BCH code.

For example, the multiplexer output signals can be applied to first and second conventional comparators (not shown). The first comparator would also be receptive of the LRC code ($LRC_0$–$LRC_2$) and the least significant bit ($X_0$) of the BCH code. The comparator would generate a high level output signal when the multiplex output favorably compares with the LRC code and least significant bit of the BCH code. The comparator output signals would be applied as a data input to a D-type flip flop. The flip flop would be clocked by the byte 16 input byte control signal from decoder 318 of data input and byte decoder 300. A second conventional comparator would provide a high level signal when the output of multiplexer 910 is equal to the remaining four bits of the BCH code. The Q output of the flip flop and the second comparator output would be applied to a 3-input AND gate, along with the byte 17 input byte control signal. The output of the AND gate would thus be a pulse, occurring at byte 17 indicating reception of a good error code.

The good error code pulse is provided on control line 922, and is also applied as an input to a conventional latch 924 (suitably an RS flip flop). The $\overline{Q}$ output of latch 924 (provided on line 926) for application to flip flop 536 in alarm status register 524. As previously noted, the good error code pulse on line 922 is utilized to reset flip flop 536 and is applied to stage 412*d* of real time clock logic 412 to reset the day counter. The good error code pulse on line 922 is also applied to offhook and receive mode control circuit 1100. In addition, the good error code pulse is inverted to produce a bad error code pulse on line 928 for application to offhook and receive mode control circuit 1100, as will be explained.

The error code processing is effected only with respect to information bits (instruction word bytes 1–15 and data bytes 1–15). Control signals to effect enabling and clearing of the error code generators is provided by error code timing logic 930. A clear error code signal (CLEC) is generated to clear, and inhibit error code generators 912 and 914 during the respective sync bytes (instruction word byte 0, call acknowledgement, and data word byte 0). The error code generators are enabled during the information bits (instruction word bytes 1–15 and data word bytes 1–15). During the receive mode a load EC signal is generated to clock (load) the error code generators 912 and 914 in accordance with the end of byte timing signal ($T_1$) from end-of-byte detector 312. During the transmit mode, the load EC signal is generated in accordance with mark enable signals generated on line 1030a by dial and data output control circuit 1000, as will be explained.

Dial and data output control circuit 1000 is utilized to generate telephone compatible dialing and data signals. Dial and data output circuit 1000 is receptive of information from memory unit 1200, A index register 500, B index register 700, and error code processing circuit 900 through data bus 226. The information to be transmitted is sequentially (in bytes) applied to dial and data output control circuit 1000 over data output bus 226. The sequential application of the information on bus 226 is controlled by a 5-bit address/counter register (OAR) 1010 and decoder 1012, as will be explained. Data bus 226 is coupled to a suitable translating circuit 1014. Translating circuit 1014 translates 0's in the data to hexadecimal 10's for data transmission. Translating circuit 1014 also generates a hexadecimal thirty-one (31) byte in response to a sync generation command (A=11) generated over line 1016 by output byte address decoder 1012. The output bytes from translation circuit 1014 is applied over a 5-conductor bus to a 5-bit comparator 1018. Translation circuit 1014 is suitably a conventional decoder-type logic circuit which, responsive to 0 value butes on bus 226, effects application of a hexadecimal 10 byte to comparator 1018 and, responsive to the generate sync signal on line 1016, applies a hexadecimal 31 byte to comparator 1018.

A particular clock signal, chosen in accordance with the type of transmission (dialing or data), is provided by suitable selection logic 1020. Selection logic 1020 is receptive of a 10 Hz dial clock of 40% duty cycle, in accordance with telephone company specifications, a 200 Hz bit clock and a 6.4 KHz system clock signal. The respective clock signals are generated over lines 1630, 1624 and 1620, respectively, by a countdown chain 1610 of timing network 1600 (FIG. 16). Clock selection logic 1020 is responsive to the good sync-in control signal generated by sync detector 332 (FIG. 3) on line 324, and the receive mode and start (dial mode) control signals generated by offhook and receive mode control circuit 1100 on lines 1112 and 1114, respectively.

Clock selection gating 1020 provides sequential timing pulses (at the system clock rate) in response to the negative going transition of each pulse of the selected dial clock (10 Hz) or bit clock (200 Hz). For example, clock selection gating 1020 suitably comprises a dial mode sync flip flop, a data mode sync flip flop, a latching flip flop and a 3-bit shift register (not shown). The dial and data mode sync flip flops are associated with the dial and data modes, respectively, and synchronize the system with the 10 Hz dial clock or the 200 Hz bit clock. The dial mode sync flip flop is inhibited by the generate sync signal from offhook and receive mode control circuit 1100. The start (dial mode) signal from offhook and receive mode control 1100 is applied to the data input of the flip flop. The flip flop is clocked by the 10 Hz dial clock. Thus, assuming the flip flop enabled, the output of the dial sync flip flop goes high in response to the next successive positive going transition in the 10 Hz dial clock, after generation of a high level start (dial mode) signal. Similarly, the data mode sync flip flop is inhibited by the receive mode and wait signals from offhook and receive mode control circuit 1100. A high level signal is applied to the data input of the data sync flip flop when both the generate sync signal from offhook and receive mode control circuit 1100 and the good sync-in signal from data input byte decoder 300 are generated. The flip flop is clocked by the 200 Hz bit clock to generate a high level data sync signal at its output terminal in response to the positive going transition in the bit clock next succeeding the generation of the generate sync signal.

The dial sync and data sync signals are applied to suitable gating circuitry to alternatively enable the gating circuitry with respect to the 10 Hz dial clock or the 200 Hz bit clock. Negative going transitions in the selected clock signal are utilized to clock the latching flip flop, which in turn, provides an input signal to the 3-bit shift register. The shift register is clocked by the 6.4 KHz system clock signal. The first stage output signal is inverted to provide a signal $T_0$ which is utilized to clear the latching flip flop. The 3-bit shift register 1020 thus provides three successive timing pulses, $T_0$, $T_1$ and $T_2$ at the 6.4 KHz system clock state in response to each negative going transition in the selected bit clock or dial clock signal.

The $T_0$, and data and dial sync flip flop output signals are applied to mode control circuitry 1022. Mode control circuitry 1022 alternatively generates a dial enable or data enable signal, to in effect, render suitable gating logic 1024 responsive to one of the dial clock or bit clock signals.

Mode control circuitry 1022 suitably comprises respective flip flops (not shown), having the dial sync and data sync signals applied to the respective data inputs thereof. The flip flops are clocked by the $T_0$ signal from select logic 1020. The flip flops are respectively cleared and inhibited by the generate sync signal on line 1016 and the receive mode signal or a wait signal from offhook and receive mode control circuit 1100, respectively. The Q outputs of the flip flops provide the dial enable and data enable signals on lines 1022a and 1022b, respectively.

Gating logic 1024 comprises, for example, first and second multi-input AND gates. One AND gate, associated with dial mode operation, would be responsive to the dial enable signal, the 10 Hz dial clock signal and a mark enable signal generated by a latch 1030, as will be explained. Gating logic 1024 is also receptive of the offhook signal generated on line 1116a by offhook and receive mode control circuit 1100. The dial pulses are gated with the offhook signal to provide (on line 1024a) an offhook and dial pulse output signal for application to telephone interface 1400.

The second AND gate, associated with data mode operation, would be responsive to the data enable signal, the 200 Hz bit clock, a 1.6 KHz modulation clock signal, and the mark enable control signal from latch 1030.

The $T_0$ signal from select logic 1020 is applied to respective counters 1026 and 1028. Counters 1026 and 1028 (hereinafter referred to as mark counter 1026 and space counter 1028) are enabled by the enable (space) signal and a space enable (mark) signal, respectively, generated by latch 1030. The contents of mark counter 1026 are applied to comparator 1018. Latch 1030 samples the output signal of comparator 1018 in response to $T_2$ signals from select logic 1020. The information on data bus 226, as determined by the output byte decoder 1012, is applied to comparator 1018. The output of comparator 1018 provides a high level signal so long as the contents of the mark counter 1026 is less than the byte on the data bus (as translated by circuit 1014). The high level signal causes latch 1030 to provide the mark enable signal to mark counter 1026 and to gating 1024 to enable gating 1024 with respect to the selected clock signal and to inhibit space counter 1028. When latch 1030 samples a low level comparator output signal, respective signals from latch 1030, inhibit and clear mark counter 1026, enable space counter 1028 and inhibit gating logic 1024.

The timing pulses $T_0$, $T_1$ and $T_2$, generated by clock selection logic 1020, are used to effect various operations in a predetermined sequence. Mark counter 1026 (or space counter 1028) is incremented after each clock pulse in response to the $T_0$ timing signal from select logic 1020 (generated in response to the negative going transition of the pulse in the selected dial or bit clock). The second timing pulse, $T_1$, is applied to suitable decoder and gating logic 1032 which strobes space counter 1028 and generates appropriate control signals, as will be explained. Upon the third pulse, $T_2$, from select logic gating 1020, latch 1030, in effect, samples the output of comparator 1018, and assumes a corresponding state.

Further, sequencing control is provided by decoder and gating logic 1032. Decoder and gating logic 1032, strobes the contents of space counter 1028 after each time space counter 1028 is incremented, in response to the $T_1$ timing pulses. Decoder and gating logic 1032 selectively generates signals in accordance with the content of space counter 1028 to increment the output address register and to clear (set) latch 1030. The signal for incrementing the output address register in preparation for outputting the next byte is generated when the content of space counter 1028 is equal to two (2). A clear (set) signal is generated to latch 1030 when the contents of space counter 1028 is equivalent to six (6) during dial mode operation and when the contents of the space counter are equivalent to four (4) during data mode operation.

Figures 3A, 10A, 10B:
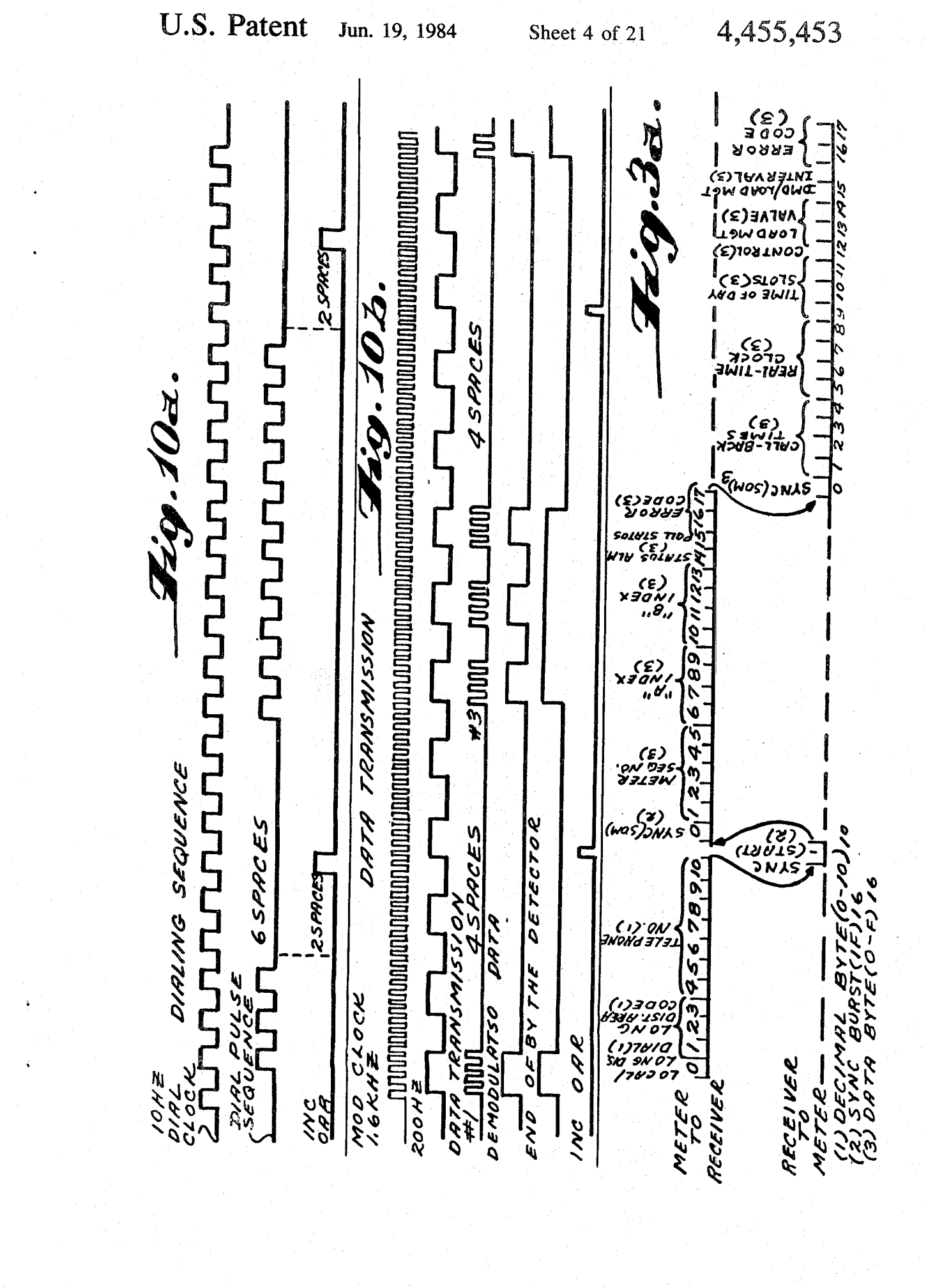
Figure 10:
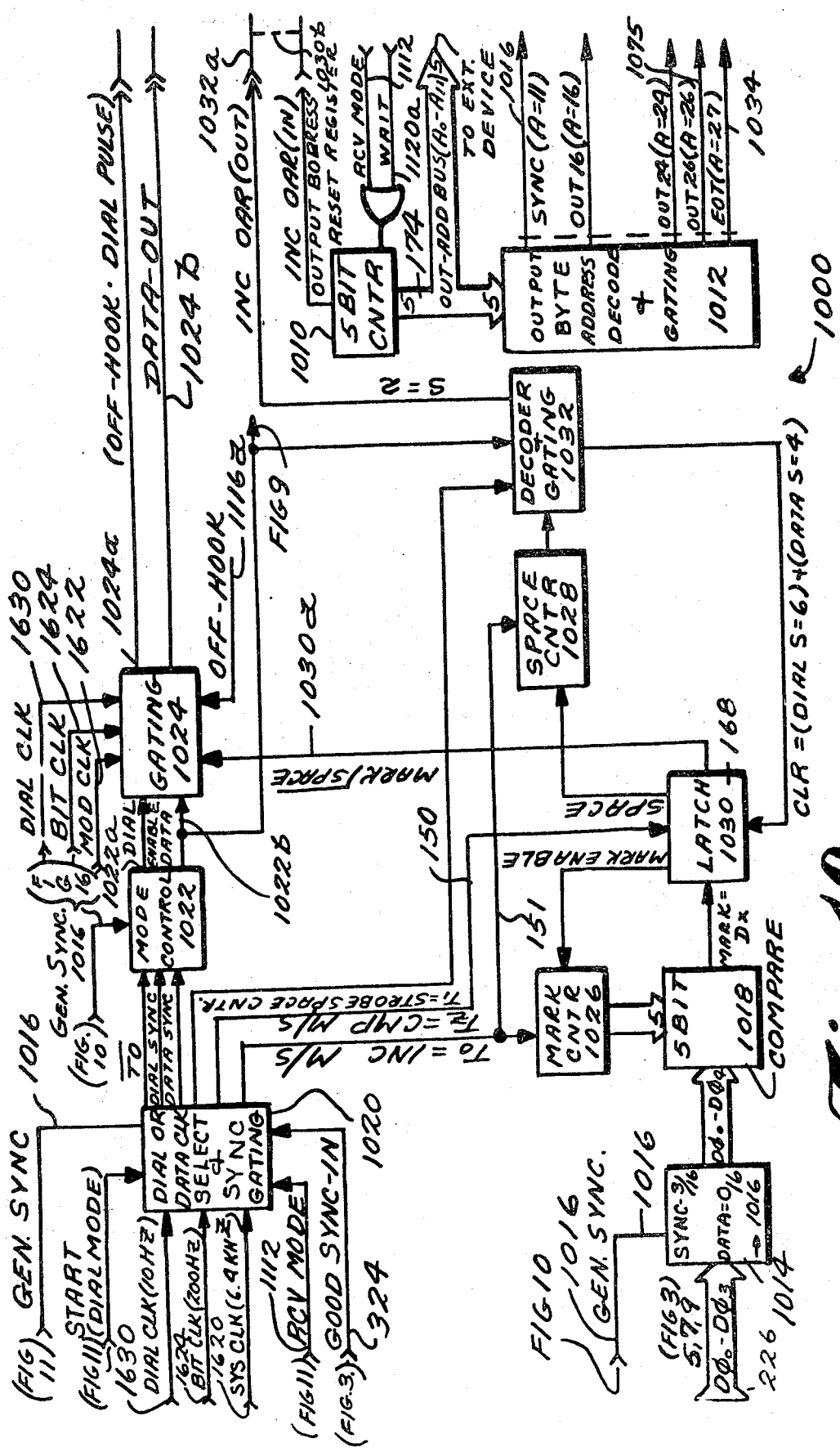
FIG. 10 is a block diagram of the dial and data out control circuit of FIG. 2.

With reference now to FIGS. 3a, 10, and 10a, the dialing sequence will be described. As is well known, telephone company convention requires that each dialed digit be represented by a corresponding number of 10 Hz pulses, with the exception that zero is represented by a sequence of ten pulses. Respective digits are separated by sequences of six successive spaces (i.e, the absence of pulses during six periods of the 10 Hz signal). For example, the number 30 would be represented by three periods of a 10 Hz signal, six spaces, 10 cycles of the 10 Hz signal and six spaces. The dialing sequence representation of the number 30 is illustrated schematically in FIG. 10a. The telephone number of central complex 100 is represented in memory 1200, and is sequentially applied to bus 226, as will be explained.

Upon application of the start dial mode signal, select logic 1020 syncs with the 10 Hz dial clock and begins to generate the successive timing signals $T_0$, $T_1$ and $T_2$ in response to each negative going transition in the dial clock. The dial sync signal causes mode control logic 1022 to generate the dial enable signal to gating logic 1024, making gating logic 1024 responsive to the 10 Hz dial clock signal. Latch 1030 is initially set. Mark counter 1026 and gating logic 1024 are therefore initially enabled. Accordingly, when the 10 Hz dial clock signal next goes high, gating logic 1024 provides a high level dial pulse signal until the negative transition of the dial clock pulse. The $T_0$ and $T_3$ timing signals from selection logic 1020 cause mark counter 1026 to be incremented, then comparator 1018 to be sampled by latch 1030. Latch 1030 assumes a state in accordance with the comparison to provide control with respect to the next dial clock pulse.

It should be recalled that 0's in the data are translated to hexadecimal 10's. The representation of any information byte therefore includes at least one pulse. Thus, an dial output pulse can properly be produced prior to an initial comparison of the transmission byte to contents of the counter.

The mark increment sequence continues until the number of dial pulses produced (as reflected by the content of the mark counter) is equal to the byte to be transmitted. Upon sampling a low level comparator output signal, latch 1030 inhibits mark counter 1026, enables space counter 1028, and ceases to generate a high level mark enable signal to gating circuit 1024. Accordingly, spaces (absence of pulses) are provided in the dialing sequence.

Space counter 1028 provides indicia of the number of successive spaces provided. Counter 1028 is incremented (when enabled) in response to each $T_0$ pulse (generated by data select logic 1020 in response to negative going transitions in the 10 Hz dial clock). After each time the space counter is incremented, the contents of the counter are strobed by decoder and gating logic 1032. Decoder and gating logic 1032 generates an increment OAR signal to output register 1010, when space counter 1028 accumulates a count of 2. The next byte (digit) of the telephone number in the memory 1200 is therefore applied to the data bus line 226, in preparation for transmission of the next byte. The output data bus, however, is not utilized, until latch 1030 is cleared (set) to enable mark counter 1026. During the dial mode, decoder gating logic 1032 generates a clear (set) signal to latch 1030 when space counter 1028 has accumulated a count of six (6), indicating that a sequence of six (6) successive spaces has been provided and the transmission of the digit (byte) has been completed.

By way of example, various waveforms associated with the dialing sequence to output successive digits 3, and 0 is illustrated in FIG. 10a. When latch 1030 enables mark counter 1026 after a count of 6 spaces from the preceding byte, mark counter 1026 is incremented in response to negative going transitions in the 10 Hz dial clock. After each increment, latch 1030 samples the output of comparator 1018 and generates a mark enable signal to enable gating 1024 with respect to the dial clock. Upon the negative going transition of the third successive pulse of the data clock, mark counter 1026 attains a count of 3. Accordingly, when latch 1030 thereafter samples the output of comparator 1018, mark counter 1026 and gating logic 1024 are inhibited, and space counter 1028 is enabled. Space counter 1028 then accumulates a count indicative of the number of dial clock pulses during which gating logic 1024 is inhibited. Upon a sampling count of two (2) in counter 1028, decoder and gating logic 1032 generates an increment OAR signal to counter 1010 to place the next byte (containing a 0) on data bus 226. Space counter 1028 continues to count up, however, and upon attaining a count of 6, decoder and gating logic 1032 generates a signal to clear latch 1030. Latch 1030 thus enables mark counter 1026 and inhibits and resets space counter 1020. Upon the next negative going transition of the 10 Hz dial clock, mark counter 1026 is incremented. Recalling that the 0 on data bus 226 is translated to hexadecimal 10 by circuit 1014, mark counter 1026 is incremented until a count of 10 is attained. When latch 1030 next samples the output of comparator 1018 after mark counter 1026 is incremented, latch 1030 inhibits mark counter 1026 and gating 1024 and enables space counter 1028. Space counter 1028 accordingly is incremented in response to the negative going transitions of the dial clock to provide a count indicative of the number of dial clock periods during which gating 1024 is inhibited. Decoder gating 1032 again generates an increment OAR signal upon space counter 1028 attaining a count of two (2) and a clear signal to latch 1030 when space counter 1028 attains a count of six (6).

As noted above, the representation of the central complex telephone number is maintained in memory 1200. The respective digits of the telephone number are extracted from memory and applied to bus 226 in accordance with the contents of output address register 1010. The contents of output address register 1010 are initially 0, having been reset by either the receive mode signal on line 1112 or the wait signal on line 1120a from off-hook and receive mode control circuit 1100. Output byte address decoder 1012 generates a corresponding control signal to access the indicated data byte. The respective digits of the telephone number are then sequentially accessed as OAR 1010 is incremented.

The dial output word format is shown diagrammatically in FIG. 3a. Location zero (0) corresponds to a local/long distance call flag. The next three bytes (locations 1-3) correspond to the long distance area code. Bytes 4-10 provide the telephone number of the utility. The dialing sequence continues until the telephone number is read out of memory 1200. Upon generation of the generate sync signal on line 1016 by output byte decoder and gating 1012, the dial sync flip flop and dial mode control flip flop in select gating 1020 and mode control circuit 1022, respectively, are inhibited. Thereafter, upon receipt of a good sync-in signal on line 324 from data input and byte decoder 300, the data mode is entered and the data clock applied to gating 1024.

The generate sync signal on line 1016 causes translation circuit 1014 to apply a hexadecimal thirty-one (31) word to comparator 1018. Clock selection logic 1020 syncs with the 200 Hz bit clock and applies a data sync signal to mode control 1022. Mode control circuit 1022 generates a data enable signal to gating 1024. Gating 1024, during periods defined by the mark enable signal from latch 1030 (during the data transmission), and the 200 Hz bit clock, passes a 1.6 KHz modulation clock signal onto the data output line 1024a to telephone interface 130.

In response to each negative going transition in the 200 Hz bit clock, select logic 1020 generates sequential timing signals $T_0$, $T_1$ and $T_2$. Mark counter 1026 and gating 1024 are initially enabled. The bit clock pulses enable gating 1024 with respect to the 1.6 KHz modulation clock signal. Upon the negative transition of the bit clock pulse, mark counter 1026 is incremented. The comparator 1018 output is then sampled by latch 1030 and the mark enable signal is generated (or not generated) to gating logic 1024 accordingly. The sequence is continued until the contents of mark counter 1026 equals the word (hexadecimal 31) applied to comparator 1018, whereupon mark counter 1026 and gating 1024 are inhibited and space counter 1028 enabled. Space counter 1028 is thereafter incremented in response to each negative going transition in the bit clock signal and the contents then strobed by decoder and gating logic 1032. Upon accumulation of a count of two (2), an increment OAR signal is generated to increment output address register 1010 and effect application of the next data byte to bus 226. Space counter 1028 continues incrementing until a count of four (4) is accumulated. At this point, decoder gating logic 1032 generates a clear (set) signal to latch 1030. Mark counter 1026 is then incremented and gating 1024 enabled in accordance with the information on the data bus 226.

The data transmission sequence is illustrated in FIG. 10b for two successive exemplary bytes of value one and value three. The 1.6 KHz modulation clock is chosen to be exactly eight times the 200 Hz bit clock. Accordingly, for each pulse of the bit clock, four modulation pulses are produced. During the periods when gating 1024 is enabled by the markenable signal from latch 1030, the bit clock pulses enable gating logic 1024 to pass the modulation clock signal to data output line 1024b. When latch 1030 is again set, after the value "1" byte has been placed on bus 226, the mark enable signal is generated to enable gating 1024. Accordingly, the modulation clock signal is applied to the data output line 1024a for the duration of the next successive bit clock pulse. Mark counter 1026 is incremented upon the negative going transition of that pulse. Latch 1030 thereafter samples the output of comparator 1018. The mark counter content of counter 1 matches the byte value 1. Accordingly, mark counter 1026 is disabled, and the mark enable signal removed from gating 1024, and space counter 1028 enabled. Gating 1024 is thus inhibited during the duration of the next bit clock pulse. Upon the negative going transition of that pulse, space counter 1028 is incremented, then strobed. A similar operation is effected in response to the next pulse of the 200 Hz bit clock. Decoder 1032 at this point, generates an increment OAR signal, and the next byte (value 3) is placed on data bus 226. Gating 1024 remains inhibited, for the duration of the next two bit clock pulses. Space counter 1028 is incremented and then strobed by decoder 1032 in response to the negative going transition of each.

Upon space counter 1028 achieving the count of 4, decoder and gating logic 1032 generates a clear (set) signal to latch 1030. Latch 1030 then enables mark counter 1026 and gating 1024. Again, it should be recalled that zero value bytes are translated to hexadecimal 10 and each transmission byte will therefore include at lest one pulse. Gating 1024 is thus enabled for the duration of the next bit clock pulse, and mark counter 1026 incremented in response to its negative going transition. Latch 1030 then samples the output of comparator 1018 and continues to enable gating 1024. The sequence is continued until the negative going transition of the third successive pulse of the bit clock signal, (mark counter 1026 attains a count of 3). Thereafter, when latch 1030 next samples the comparator output, mark counter 1026 is inhibited and cleared, gating 1024 inhibited and space counter 1028 enabled. The space counting sequence is then performed, OAR register 1010 incremented, and latch 1030 enabled with respect to the next byte.

As previously noted, after generation of the sync signal, the remote unit identification number (customer account number) is extracted from memory 1200 as data word bytes 1-5 (the sync signal is data word byte 0). It should be appreciated that various techniques can be utilized, if desired, to maximize the use of memory 1200. For example, use of a conventional 16 word memory is facilitated by generating the sync signal externally (through translation circuit 1014) rather than by storing the word in memory.

As illustrated in FIG. 3a, after transmitting the bytes corresponding to the remote unit ID number, counter 512 of A index register 500 is read out as bytes 6-9. Q register 720 and counter 717 of B index register 700 are then read out as bytes 10-13. The alarm status latches 528 and 536 are read out at byte 14. A poll status indication (as will be explained) is read out as byte 15, and the error code from error code generator 900 is read out as bytes 16 and 17.

Figure 11:
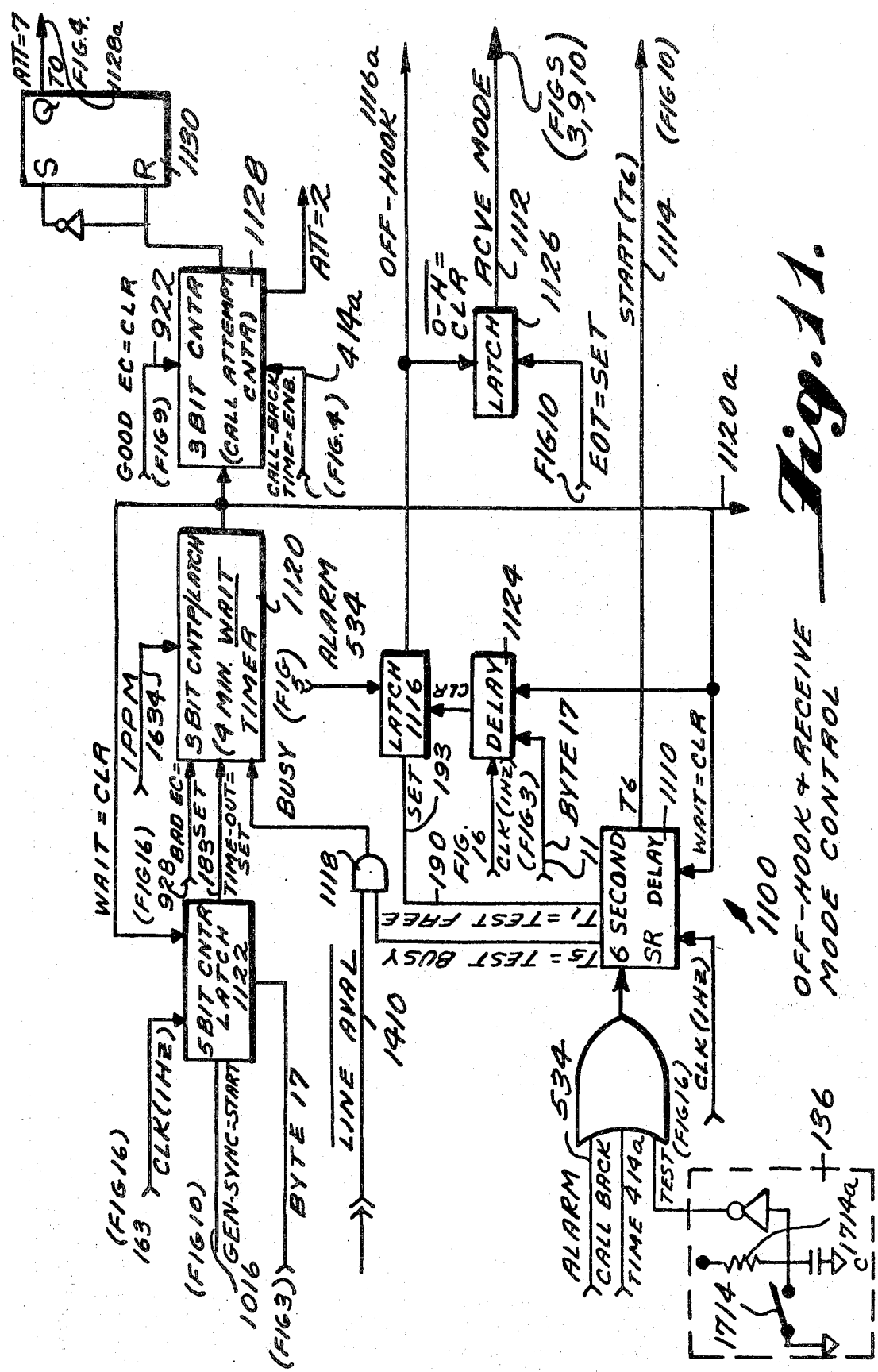
FIG. 11 is a block diagram of the off-hook control and received mode circuitry of FIG. 2.

When output address register 1010 is incremented during the space sequence following the last byte (byte 17) of the data transmission, output byte decoder 1012 generates an end of transmission signal (EOT) on line 1034. Referring briefly to FIG. 11, The end of transmission signal is applied to a latch 1126 in offhook and receive mode control circuit 1100. The EOT signal sets latch 1126 which, in response, generates a receive mode signal on line 1112. The receive mode signal inhibits select loic 1020 in dial and data output control circuit 1000, clears the input byte counter 316, enables the input byte decoder 318 (both of data input and byte decoder 300) and effects the coupling through multiplexer 910, of the data input bus 228 to error code generator 900. Remote unit 110 is thus readied to receive the instruction word from central complex 100.

As previously described, the data is demodulated in demodulator 310 of data input and byte decoder 300 (FIG. 3) and counter 314 accumulates a count indicative of the byte value. Sequences of four (4) spaces, delineating the bytes are detected by end-of-byte detector 312, which clears counter 314 and increments the input address register 316. The input word bytes are thus sequentially provided on input data bus 228. Sync detector 332 determines if the first byte (byte 0) of the input word is of a value greater than 24, and if so, generates the good sync-in signal on line 324. Assuming good sync-in, the instruction word bytes are stored in the appropriate portions of input data register 400 and the system set up for the next callback. The demodulation sequence is also illustrated in FIG. 10b.

As previously noted, the telephone number of central complex 100 and the remote unit identification number are maintained in memory unit 1200. The contents of output address register 1010 are applied in parallel to output byte decoder 1012 and to memory 1200 to access the memory. Alternatively, the increment OAR signal (S=2) produced by decoder gating logic 1032 on line 1032a is also applied to memory unit 1200 to increment self-contained accessory logic operating in parallel with OAR 1010 and decoder 1012. Further, if desired, memory unit 1200 or other accessing logic can be, in effect, interjected between decoder gating 1032 and output address register 1010 (as illustrated by jumper 1030b), to provide for an expanded data word transmission. Where the increment OAR signal is routed through an external device, e.g., an auxiliary memory, the hardwired telephone number and identification number bytes would be provided in sequence on the data bus, followed by auxiliary memory bytes. OAR 1010 would be isolated from the increment OAR signals during the read out of the auxiliary memory.

A more detailed description of memory unit 1200 will now be provided with reference to FIG. 12. In the preferred embodiment, memory unit 1200 comprises a 16 word (byte)×4-bit hardwired memory. More particularly, memory unit 1200 includes a memory chip 1206 programmed by hardwired interconnections 1208. Memory chip 1206 suitably includes a 4-bit binary counter 1210, a binary to hexadecimal decoder 1212, respective driving transistors 1214, a hexadecimal to 4-bit binary encoder 1218 and a bus driver 1220.

Counter 1210 (hereinafter referred to as memory address register (MAR) 1210) and decoder 1212 provide for selective (sequential) accessing of the respective memory locations. Memory address register (MAR) 1210 operates in parallel with the system output address register 1010, incremented by the increment OAR signal generated on line 1032a by decoder and gating logic 1032. MAR 1210 is initialized (cleared) in response to the concurrence of the offhook signal on line 1116a (generated, as will be explained, by latch 1016 of offhook and receive mode control circuit 1100) and the most significant bit (A4) of output address counter (OAR) 1010.

The contents of counter 1210 are applied to binary to hexadecimal decoder 1212. Each of the output lines (0-15) of decoder 1212 selectively drives a respective transistor 1214 corresponding to a location in memory unit 1200.

Each location in the memory unit 1200 provides indicia of a 4-bit byte of data. Location zero (0) contains the local/long distance flag, locations 1, 2 and 3 contain respective bytes indicative of the long distance area code, locations 4-10 contain respective bytes indicative of the digits of the telephone number of the utility, and locations 11-15 contain respective bytes indicative of the digits of the remote unit identification number. Each byte is represented by a hardwire connection from the output terminals ($A_0$-$A_{15}$) of a respective associated driving transistor 1214 and an appropriate one of the input lines ($D_1$-$D_{15}$) of a hexadecimal to 4-bit binary encoder 1218. The respective four output bits of encoder 1218 are applied through drivers 1220 to output data bus 226.

In operation, memory address register 1210 accumulates a count (in parallel with the system OAR 1010) indicative of the particular location (byte) to be accessed. One of the output lines of decoder 1212 is activated in accordance with the content of memory address register 1210. The output line is hardwired to the input terminal ($D_1$-$D_{15}$) of encoder 1218 corresponding to the desired hexadecimal value of the particular byte. Hexadecimal to binary encoder 1218 converts the hexadecimal input to a 4-bit binary word for application to dial and data output control circuit 1000.

For example, assume the utility telephone number is long distance, having area code 305, and base number 725-0650, and the remote unit identification number is represented by the hexadecimal figure ABCDE. In this instance, the hardwire programming would couple the $A_0$ output line of decoder 1212 to the $D_1$ input terminal of encoder 1218, the $A_1$ output line to input $D_3$, the $A_3$ output line to terminal $D_5$, the $A_4$ output line to terminal $D_7$, the $A_5$ output line to terminal $D_2$, the $A_6$ output line to terminal $D_5$, the $A_8$ output line to terminal $D_6$, the $A_9$ output line to terminal $D_5$, the $A_{11}$ output line to terminal $D_{11}$, the $A_{12}$ output line to terminal $D_{12}$, the $A_{13}$ output line to terminal $D_{13}$, the $A_{14}$ output line to terminal $D_{14}$, and the $A_{15}$ output line to terminal $D_{15}$.

As the data bytes are transmitted, and the increment OAR signal generated by decoder engating logic 1032, memory address register 1210 is sequenced through each memory location (0-15), and then is reset when the system output register 1010 achieves a count of 16 to initialize the memory.

It should be appreciated that other means of addressing memory 1200 may be utilized. For example, the memory could be directly addressed through output byte decoder 1012. However, use of a separate 4-bit address register operating in parallel with output address register 1010 provides for a particularly advantageous manner of resetting the memory addressing mechanism, and further, facilitates addition of auxiliary memory portions. More specifically, during a data transmission when the offhook mode signal is generated, counter 1210 is reset upon output address register 1010 accumulating a count of 16. Thus, memory unit 1200 is re-initialized immediately after its entire 16-byte content has been read out. Also, memory unit 1200 can comprise a conventional random accessory memory (RAM) integrated circuit or other storage means.

Offhook and receive mode control circuit 1100 controls the waiting times, and test time functions relating to telephone communications, and generates control signals to effect telephone transmissions. Offhook and receive mode control circuit 1100 provides for generation of the aforementioned start dial signal on line 1114. When a callback is initiated, the telephone line is made to go offhook and is tested to ensure it is free. If the line is free, the start dial mode signal is generated a predetermined time (6 seconds) after the line goes offhook. If a proper communication is not effected, for example, because the line is busy, an improper error code is received or the instruction word is not fully received within a prescribed period (32 seconds), the six second shift register is cleared and inhibited and the callback re-executed after a predetermined waiting period (4 minutes). After a predetermined number (7) of unsuccessful callbacks, at the 4 minute interval, the callback sequence is executed again after an interval of 24 hours.

Referring now to FIG. 11, generation of the alarm signal on line 534 (by alarm status register 524), the callback time control signal on line 414a (by comparator 414 of input data register 1000) or a consumer test signal from CTOC 136 initiates the operation of a 6 second shift register delay 1110. If not cleared during the interum, delay 1110 generates a start dial mode signal on line 1114 at the end of 6 seconds. Delay 1110 is suitably a 6-bit shift register clocked by a 1 Hz signal. The first stage of shift register 1110 generates a $T_1$ signal to set a offhook latch 1116. Latch 1116 generates an offhook signal on line 1116a to telephone interface 1400. In response, telephone interface 1400 generates a line not available (busy) signal on line 1410 as will be explained. At a predetermined time, e.g., 5 seconds, after the shift register operation is initiated, a $T_5$ signal is generated. The $T_5$ signal is applied to a 2-input NAND gate 1118. The other input of NAND gate 1118 is responsive to the line not available signal on line 1410 from telephone interface 1400. If the line is presently in use, as indicated by the line not available signal, NAND gate 1118 presets a 3-bit down counter and latch circuit 1120.

Counter latch 1120 provides for a callback after a 4 minute interval in the event of an unsuccessful communication attempt. Counter 1120 is clocked by a one pulse per minute clock signal generated on line 1634 by timing network 1600 (FIG. 16). Counter/latch circuit 1120, when set immediately generates a high level signal. The signal is applied to reset and inhibit shift register 1110, until a four minute count has been achieved. At the end of the four minute interval, the shift register 1110 sequence is repeated. The output signal of counter/latch 1120 is also applied through a two second delay to effect clearing offhook latch 1116. Counter/latch 1120 is also set in response to the generation of a bad error code pulse on line 928 by error code processing circuit 900 and in response to the timing out of a 5-bit counter latch 1122.

Counter latch 1122 provides for a further callback if a communication is not completed within a predetermined time period. Counter/latch 1122 is, in effect, a 32 second delay line. The counter is clocked by a 1 Hz signal generated on line 1632 by clock circuit 1600. The count is initiated upon reception of the generate sync signal on line 1016 from dial and data output control circuit 1000. Counter/latch 1122 is cleared, and inhibited upon reception of the byte 17 instruction word control signal from input byte decoder 300 (indicative of reception of the complete instruction word).

In operation, the callback sequence is initiated by generation of either the alarm signal on line 534 by alarm status register 524, by generation of the callback time signal on line 414a by comparator 414 of input data register 400 or the consumer test signal by CTOC 136. Upon generation of an initiating control signal, latch 1116 is set to generate an offhook control signal to seize a telephone line. At 5 seconds, the line is tested to determine if the line is already occupied (as will be described in conjunction with FIG. 14). If the line is busy, the system goes back on hook and the 4 minute timer 1120 is set, to effect a second callback after a 4 minute wait. If the line is not busy, the start dial mode signal is generated on line 1114 at the end of 6 seconds. If the line is busy, the line is released and callback is tried again at the end of 4 minutes. When the line is free, and the dial sequence completed, the complete data transmission must be performed within 32 seconds, or the line is released, and callback effected 4 minutes later. Similarly, if a bad error code is detected in the instruction word, callback is effected after a 4 minute wait.

A 3-bit counter 1128 incremented in response to each wait signal from counter/latch 1120 limits the number of attempts at callback be made during the period of a day to seven. The counter is enabled by generation of the callback time control signal on line 414a, and is reset by the good error code pulse on line 922. Counter 1128 is not operative during alarm or test situations. At the end of seven (7) callback attempts during a day, a latch 1130 is reset, inhibiting an AND gate 412e in real time clock logic 412 (FIG. 4). The inhibiting of AND gate 412e effectively isolates the day counter 412d of the real time clock logic. The minutes and hours of the real time clock logic 412, however, continue to increment. Accordingly, when the real time hours and minutes favorably compare with the callback time hours and minutes (register 410) on the next day, a callback signal is again generated and the callback sequence repeated. Call attempt counter 1128 is cleared (reset) by a "good EC" pulse generated on line 922 by error code generator 900.

As previously noted, offhook and receive mode control circuit 1100 also generates the receive mode control signal on line 1112. The end of transmission signal from output address decoder 1012, signifying a complete transmission sets a latch 1126. The output of latch 1126 provides the receive mode control signal. Latch 1126 is cleared in response to negative going transitions in the offhook control signal on line 1116a.

Figure 13J:
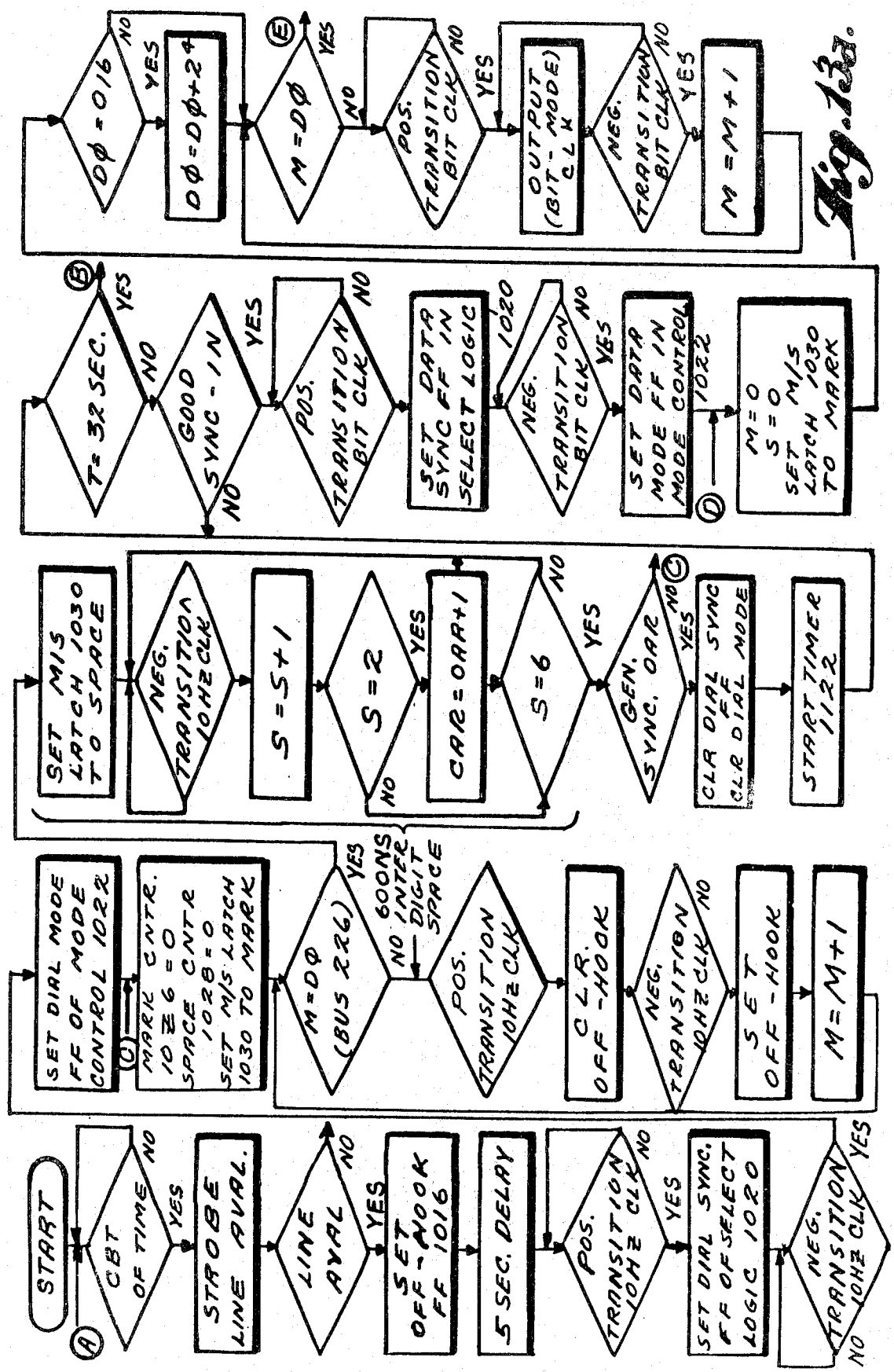
FIGS. 13a and 13b are logic flow diagrams of the communications operation of the remote unit.
Figure 13B:
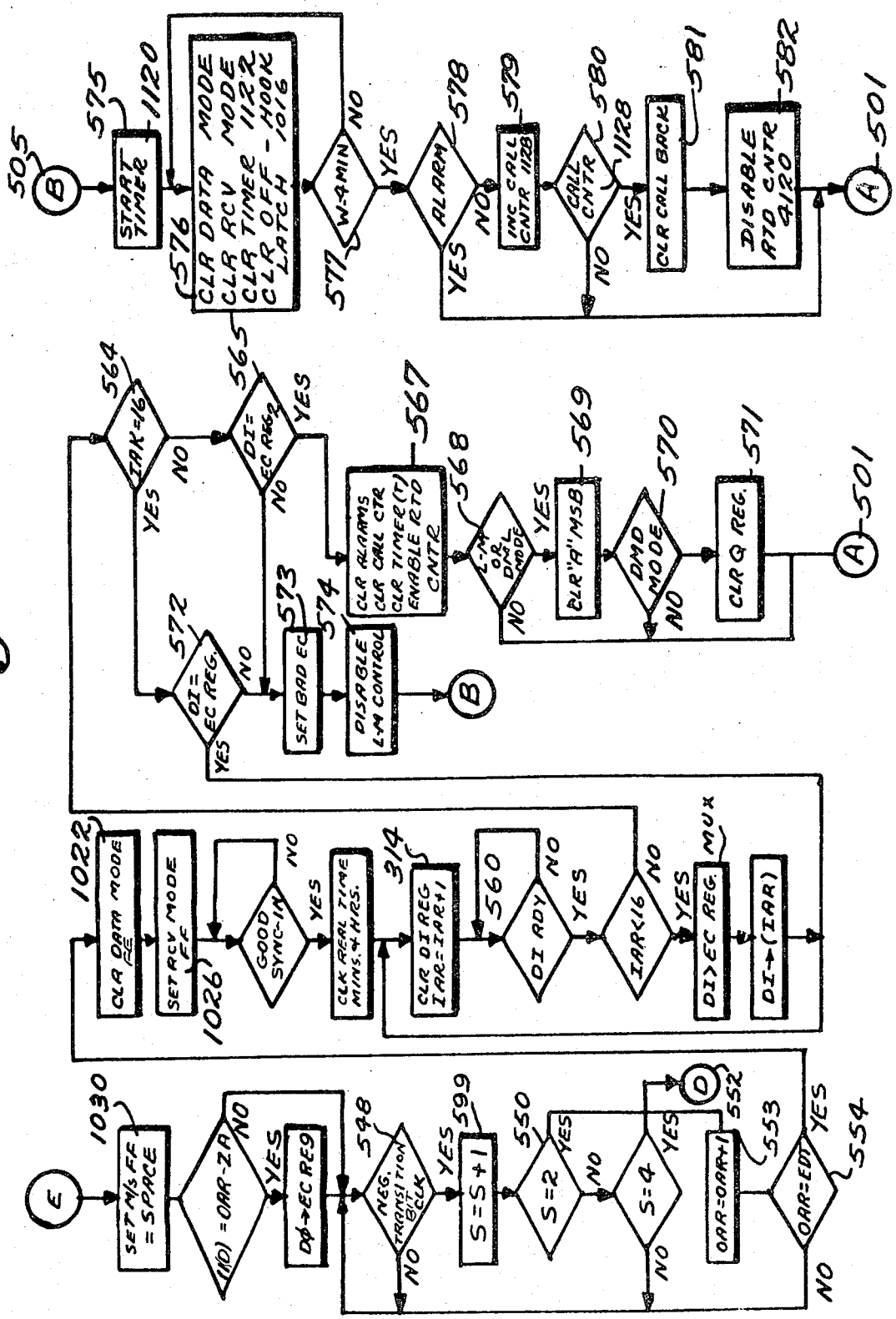
Figure 14:
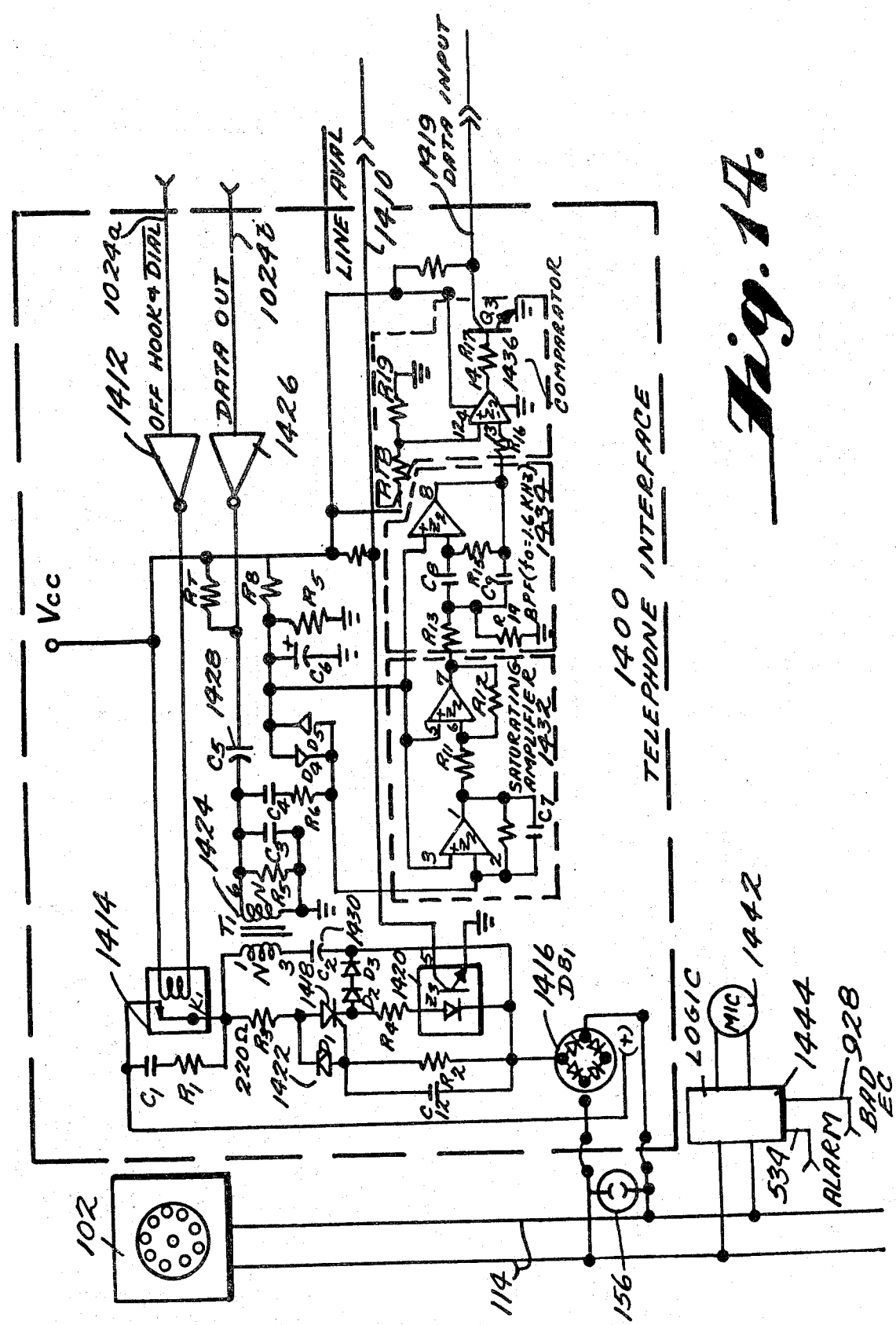
FIG. 14 is a schematic diagram of suitable telephone interface circuitry such as shown in FIG. 1.

The overall communications operation of remote unit 110 is illustrated in flow chart form in FIGS. 13a and 13b. In the flow chart, the letter M represents the contents of mark counter 1026, the letter S represents the contents of space counter 1028, D represents the value of the byte on bus 226, OAR represents the contents of output address register 1010, IAR represents the contents of input address register 316, and DI represents the value of the instruction word byte on bus 228.

Telephone interface 1400 interfaces remote unit 110 to telephone lines 114. Telephone interface 1400 makes or breaks connections to the telephone lines in accordance with the offhook and $\overline{\text{dial}}$ signal on line 1024a, provides the line not available signal on line 1410, applies the data output signals from line 1024b to the telephone lines and extracts the instruction word signals from the telephone lines for application over line 1419 to data input and byte decoder 300.

A normally open relay 1414 selectively completes a DC current loop across the telephone conductors 114. A rectifier 1416 has input terminals coupled across telephone lines 114. One contact terminal of relay 1414 is coupled to the positive output terminal of rectifier 1416. The other contact terminal of relay 1414 is coupled through a power resistor (e.g., 200 ohm, 2 W) to the anode of an SCR 1418. The cathode of SCR 1418 is coupled through a resistor to the anode of the LED of a conventional opto-coupler 1420. The cathode of the LED is coupled to the negative output terminal of rectifier 1416. The phototransistor of opto-coupler 1420 is utilized to provide the line not available signal on line 1410. When conductive, the transistor, in effect, couples line 1410 to ground potential. Conversely, when the phototransistor non-conductive line 1410 is isolated from ground and provides a high level signal.

The line testing function is effected through control of the current in the loop by SCR 1418. SCR 1418 is, in turn, controlled by a 33 V Zener diode 1422. The cathode of Zener diode 1422 is coupled to the anode of SCR 1418. The anode of Zener diode 1422 is coupled to the gate electrode of SCR 1418 and, through a parallel RC circuit, to the negative output terminal of rectifier 1416. The offhook and $\overline{\text{dial}}$ pulse signal generated on line 1024a is applied through an inverting amplifier 1412 to relay 1414. When the offhook signal is first generated on line 1116a (prior to the generation of any dialing pulse) the offhook and $\overline{\text{dial}}$ pulse signal goes high, and activates relay 1414. The closing of the relay 1414 contacts, in effect, applies the telephone line voltage across Zener diode 1422. The magnitude DC component of signal on telephone line 1414, when the lines are available, is on the order of 50 V. Accordingly, when telephone line 114 is free when remote unit 110 goes offhook, the high amplitude telephone line voltage is applied across Zener diode 1422. SCR 1418 is therefore rendered conductive. When SCR 1418 is rendered conductive, current flows through the LED of opto-coupler 1420, effectively coupling line 1410 to ground. Thus, a low level line not available signal is provided on line 1410, indicating that the line is free. SCR 1418 will then remain conductive until the contacts of relay 1414 are again open.

However, if telephone lines 114 are busy when remote unit 110 goes offhook, the magnitude of the telephone line DC voltage is considerably less than the 33 V threshold voltage of Zener diode 1422. Accordingly, SCR 1418 and, thus, phototransistor opto-coupler 1420 are rendered non-conductive. Line 1410 is therefore effectively isolated from ground and coupled to a high (logic) level source. The line not available signal on line 1410 is, accordingly, high.

Assuming the line to be available, dial and data output control circuit 1000 will enter a dial mode operation. The offhook and $\overline{\text{dial}}$ pulse signal will pulse on and off in accordance with the telephone number stored in memory 1200. The contacts of relay 1414 will be controlled accordingly. Relay 1414 will thus be selectively activated in accordance with the preprogrammed telephone sequence, making and breaking contact with telephone lines 114 in simulation of 10 Hz dialing pulses from telephone set 102.

An RC spark suppression network can be provided, if desired, across the contacts of relay 1414. Similarly, a pair of voltage limiting diodes can be coupled across the LED of optocoupler 1420.

The data information pulses are coupled to and the instruction word pulses coupled from telephone lines 114 through an impedance matching transformer 1424 having a frequency response from 0.3 to 3 KHz. The primary coil of transformer 1424 is coupled through the contacts of relay 1414 to the positive terminal of rectifier 1416 and, through a blocking capacitor 1430 to the negative terminal of rectifier 1416. The output data pulses generated on line 1024b by dial and data output control circuit 1000 are applied through an inverting amplifier 1426 and a blocking capacitor 1428 to the secondary coil of transformer 1424. Similarly, the instruction word data signals are extracted from telelphone lines 114 at the secondary of transformer 1424. The signals from transformer 1424 are applied to a saturating amplifier (limiter) 1432. Saturating amplifier 1432 is coupled to an active bandpass filter 1434 having a narrow response centered at the 1.6 KHz data modulation frequency. Bandpass filter 1434, in effect, filters out signals not at the 1.6 KHz modulation frequency. The output of bandpass filter 1434 is applied to one input of a comparator, the other input thereof being receptive of a reference voltage. The output of comparator 1436 is provided as the instruction word output on line 1419. Comparator 1436, in effect, provides an output signal of proper amplitude and pulse duration.

A "listen-in" mode of operation can be utilized in conjunction with alarm monitoring usage of the system. A "listen-in" microphone 1442 can be coupled to telephone lines 114 through suitable gating and control circuitry 1444. Gating and control circuitry 1444 is responsive to the alarm signal generated by alarm status register 524 on line 534, and to the bad error code signal generated on line 928 by error code processing circuit 900. Upon reception of a data word indicating an alarm condition, central complex 100 would purposefully generate an instruction word containing a bad error code. In response to the bad error code signal, gating and control circuit 1444 would connect microphone 1442 to line 114 providing a "listen-in" connection whereby sounds from the premises where the microphone is located are provided to an operator at central complex 100. For this mode of operation, the offhook latch 1116 in offhook and receive mode control circuit 1100 would be maintained in a set condition, by, for example, a 2-input AND gate (not shown) interjected between delay 1124 and latch 1116 (FIG. 11). The mode can be selectively entered by detecting a particular bad error code (by a suitable decoder, not shown) operating upon the error code bytes (bytes 16 and bytes 17) of the instruction word. The AND gate would be inhibited when the particular bad error code was detected. The bad error code would be chosen to be outside the normal range of error codes generally expected. The generation of the bad error code will cause the 4 minute wait timer 1120 to be set and remote unit 110 returned to a waiting status, with the exception of offhook latch 1116.

If the operator at the central complex 100 is satisfied of the sounds from the premises provided by the "listen-in" microphone 1442, central complex 100 will send a good error code in response to the next dialing attempt and the entire system will enter into the standby mode, until the next alarm or test condition or callback time.

Figure 15:
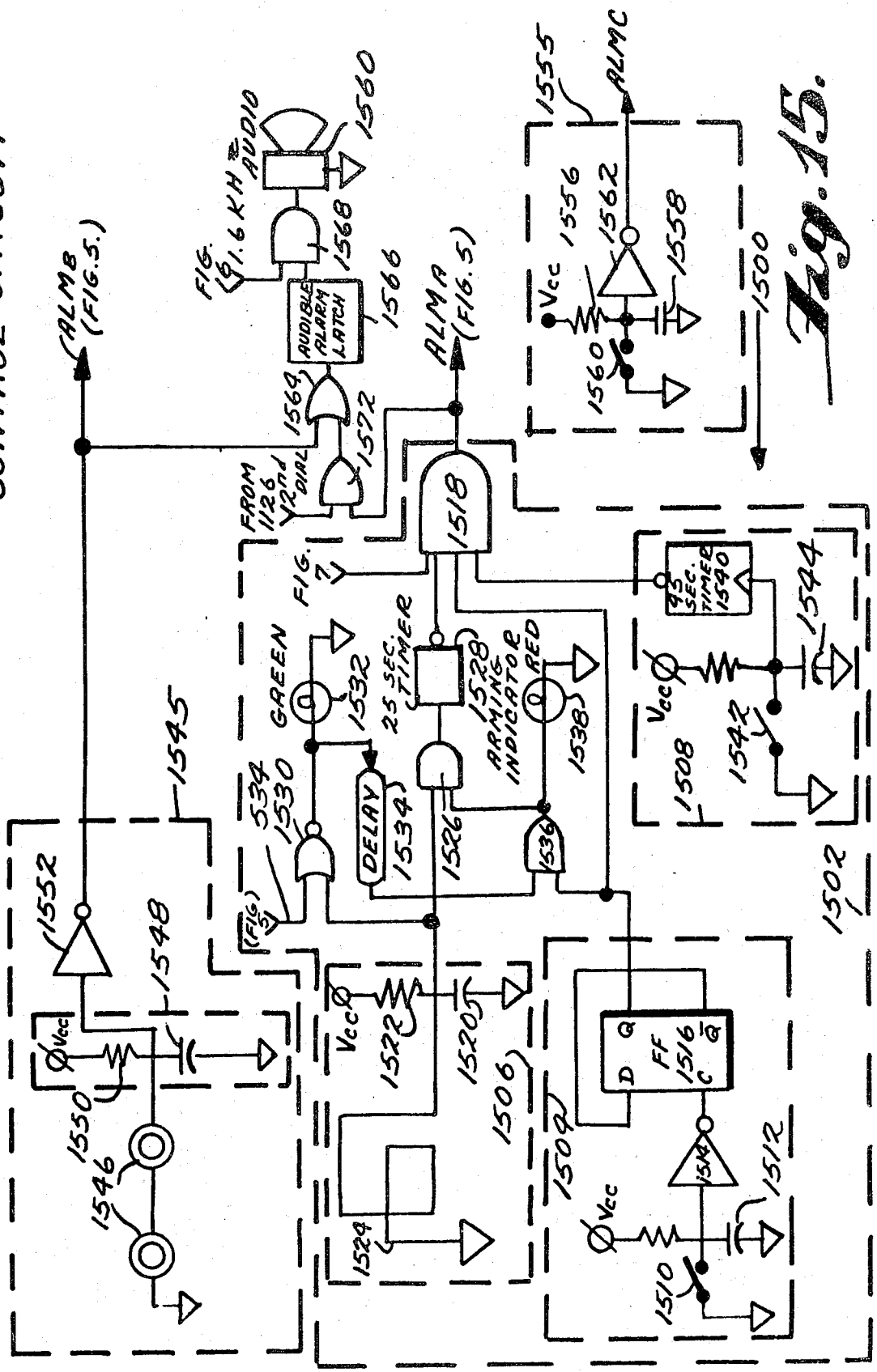
FIG. 15 is a schematic diagram of suitable alarm sensor and control unit such as shown in FIG. 1.

Alarm sensor and control unit 1500 senses prescribed alarm conditions and generates appropriate signals to alarm status register 524. In the exemplary embodiment, respective signals ALMa, ALMb and ALMc are generated, respectively, indicative of unauthorized entry, excessive heat, and holdup alarm conditions. Referring now to FIG. 15, alarm sensor and control circuit 1500 includes an unauthorized entry (burglar) alarm portion 1502. Burglar alarm 1502 suitably comprises an arming circuit 1504, an entry sensor 1506, a delayed arming circuit 1508 and appropriate gating and indicators.

Arming circuit 1504 comprises a momentary contact switch 1510, a capacitor 1512 which is serially connected with a resistor between positive voltage source and ground potential, an inverter 1516 and a D-type flip flop 1516. Switch 1510 is connected across capacitor 1512. Capacitor 1512 is coupled through inverter 1514 to the clock input of D-type flip flop 1516. Flip flop 1516 is interconnected in a toggle mode (with Q output fed back to data input). The Q output of flip flop 1516 is connected to one input of a plural input AND gate 1518, to selectively enable the gate. Thus, when switch 1510 is closed, capacitor 1512 is shorted to ground. Accordingly, a positive going pulse is applied to the clock input of flip flop 1516, causing the flip flop to change state. Thus, AND gate 1518 is alternately selectively enabled or inhibited by depressing switch 1510.

Entry sensor 1506 suitably includes a further capacitor 1520 in series connection with a resistor 1522 between a positive voltage source and ground. A burglar loop conductor 1524 is coupled across capacitor 1520. Capacitor 1520 is also coupled through a 2-input AND gate 1526 and (an inverting 25 second timer 1528) to one input terminal of AND gate 1518. Capacitor 1520 is also coupled to one input of a 2-input NOR gate 1530. The other input of NOR gate 1530 is receptive of the alarm signal generated on line 534 by alarm status register 524. The output of NOR gate 1530 is utilized to drive a loop intact indicator light 1532 and is also applied through a delay 1534 to one input of a 2-input AND gate 1536. The other input of AND gate 1536 is coupled to the Q output of flip flop 1516. The output of AND gate 1536 is utilized to drive an arming indicator lamp 1538 and, further, is coupled to the second input of AND gate 1526.

In operation, so long as burglar loop 1524 remains intact (unbroken), capacitor 1520 is maintained in a discharged state. Accordingly, low level signals are applied to respective inputs of AND gate 1526 and NOR gate 1530. Assuming no previous alarm condition to be reflected in the alarm signal on line 534 (i.e., that signal is low) NOR gate 1530 generates a high level signal. Accordingly, the loop intact indicator lamp 1532 is illuminated, and AND gate 1536 enabled (assuming the Q output of flip flop 1516 to be high). Thus, a high level input is applied to the second input of AND gate 1526, and arming indicator lamp 1538 is also illuminated. However, if burglar loop 1524 is broken, capacitor 1520 charges. Accordingly, a high level signal is applied to the first input of AND gate 1526. The output of AND gate 1526 goes high, triggering 25 second timer 1528. The high level signal produced by capacitor 1520 also forces the output of NOR gate 1530 to go low, deactivating the loop intact indicator lamp 1530 and, after a predetermined delay as provided by delay 1534, forces the output of AND gate 1536 to go low. The arming indicator lamp 1538 is thus disabled and AND gate 1536 inhibited. At the end of the 25 second time interval, timer 1528 generates a high level signal to enable AND gate 1518 to generate the alarm A signal. The 25 second delay causes delayed operation of the alarm sensor to allow an occupant to enter or exit the premises without triggering the alarm. Similarly, delayed arming circuit 1508 includes a 45 second inverting timer 1540. Timer 1540 is activated by a switch 1542 in cooperation with a resistor-capacitor network 1544, and selectively provides additional delay input to AND gate 1518, to allow an occupant a longer (45 second) period to exit or enter the premises without triggering the alarm. If a delayed operation is not desired, timer 1528 and delayed arming circuit 1508 would be eliminated.

Alarm sensor and control circuit 1500 also includes an excessive heat sensor (fire alarm) portion 1545. A resistor 1550 and a capacitor 1548 are coupled in series between a positive potential VCC and ground potential. One or more heat sensors 1546 are coupled to the juncture between capacitor 1548 and resistor 1550. The juncture between the resistor and capacitor is also coupled to an inverting amplifier 1552. The output of inverter 1552 provides the alarm signal ALMb.

In operation, so long as the heat sensors remain non-conductive, capacitor 1548 is charged and a low level ALMb signal is provided by inverter 1552. However, when excessive heat renders sensors 1546 conductive, capacitor 1548 is discharged to ground and a high level alarm signal B is provided by inverter 1552.

Alternatively, if fuse-type heat sensors are used which become non-conductive in the presence of excessive heat, inverter 1552 can be eliminated.

A directly switched holdup alarm portion 1555 is also provided. A resistor 1556 and capacitor 1558 are connected in series between a positive source and ground potential. A switch 1560 is connected across capacitor 1558. The juncture of resistor 1556 and capacitor 1558 is connected to the input of an inverter 1562. The output of inverter 1562 is utilized as the alarm C signal. The holdup alarm is generally analogous to the consumer test operation.

An audible alarm is also provided, for example, for the excessive heat and burglar alarms. The ALMb signal is applied to one input of a 2-input OR gate 1564. The output of OR gate 1564 is utilized to set an audible alarm latch 1566. Audible alarm latch 1566, in turn, selectively enables a 2-input AND gate 1568. The other input of AND gate 1568 is receptive of the 1.6 KHz signal from timing network 1600. The output of AND gate 1568 is applied to drive an audio speaker 1570. Thus, when audible alarm latch 1566 is set, speaker 1518 is driven by the 1.6 KHz signal to produce an audible alarm.

An audible alarm is preferably not produced immediately upon generation of a burglar entry signal, (ALMa) but rather only if the initial callback is not completed. Accordingly, the ALMa signal is coupled to one input of a 2-input AND gate 1572. The second input of AND gate 1572 is responsive to a signal from call attempt counter 1126, indicative of the second dialing attempt.

The output of AND gate 1572 is applied through OR gate 1564 to set alarm latch 1566 and initiate the audible alarm.

It should be appreciated that the present invention provides an extremely versatile remote control and monitoring system. Through use of alarm sensor circuitry 1500, or analogous sensors and alarm status register 524, various alarm conditions can be monitored, depending upon the use of the system. For example, in an automatic meter reading system, the alarm conditions may include meter seal broken, meter tampering, low battery, vandalism, gas leakage, excessive heat accumulation, absence of regular monthly reading or performance of a manual testing, etc. Similarly, where the system is adapted for monitoring copying machine operation, (generating in the A index register, an indication of usage of the machine) alarm sensors corresponding to machine malfunction, operator needs assistance, meter tampering, over-heating, or the like may be provided. The system can also be used as a vending machine monitor. The A index suitably would, for example, develop an indication of inventory of goods in the vending machine. Alarm sensors could be provided associated with vandalism, out of change, over accumulation of money, refrigeration failure conditions, etc.

Figure 17:
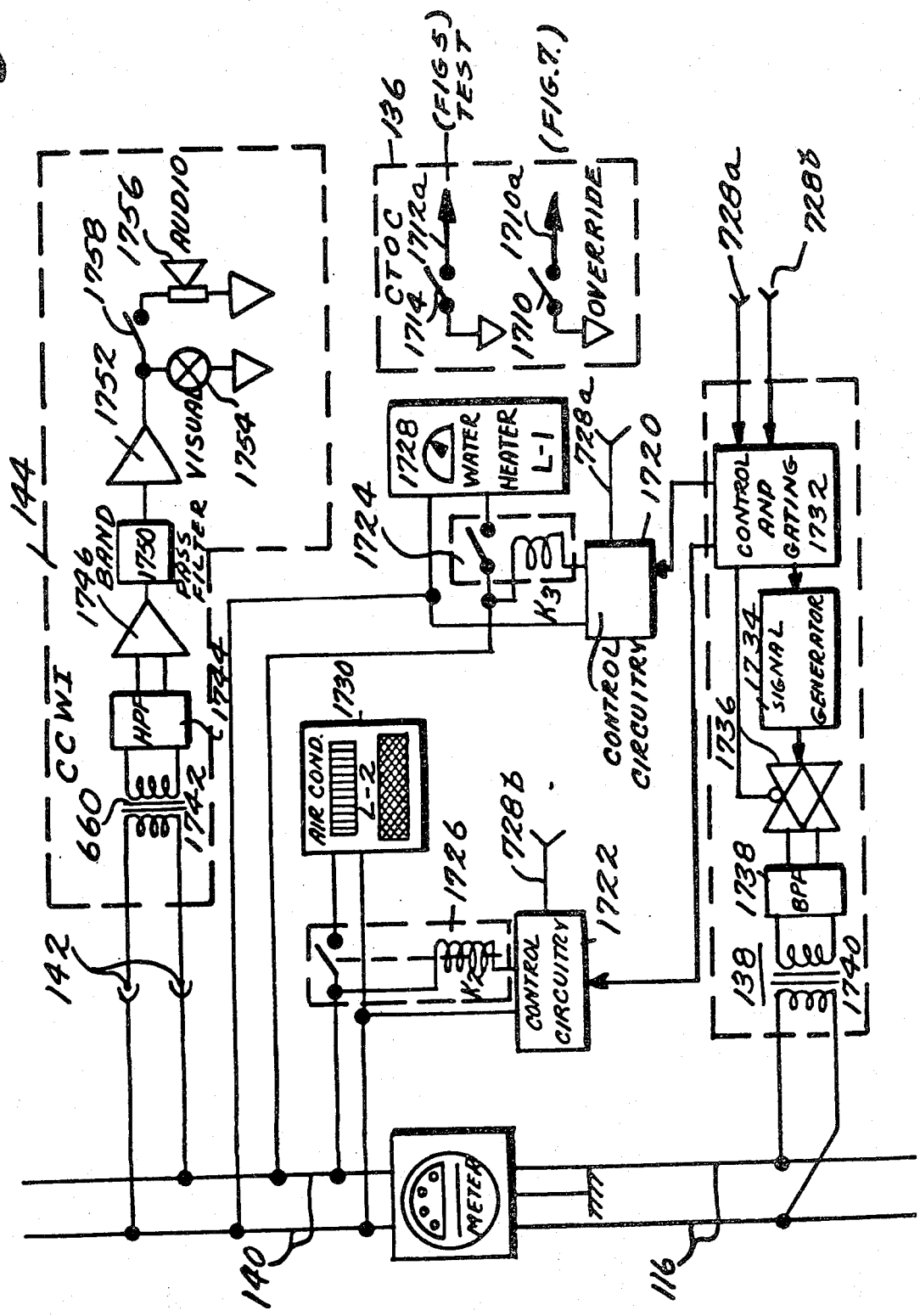
FIG. 17 is a schematic block diagram of a suitable harmonic transceiver, customer consumption warning indicator and appliance control over-ride circuitry such as shown in FIG. 1.

As previously noted in conjunction with FIGS. 1 and 7, during the load management mode of operation, control signals are generated (on lines 728a and 728b) to selectively control the operation of designated consuming appliances. It is desirable to provide an indication to the consumer that control of the applicances is being effected, to facilitate effective use of the customer over-ride provisions of the system. Referring now to FIG. 17, the respective control lines 728a and 728b are coupled to conventional control circuits 1720 and 1722, respectively. Control circuits 1720 and 1722 control the operation of respective relays 1724 and 1726. The contacts of relays 1724 and 1726 are respectively interjected into the power connections to the designated appliances, e.g., water heater 1728 and air conditioner 1730. The control circuitry and relays would suitably be disposed at a central location, such as at a circuit breaker or fuse box. It should be appreciated that control of these appliances can, in the alternative, be effected in the thermostat section, rather than the power section of the appliances to avoid use of heavy duty contact relays or triacs. The control signals on lines 728a and 728b are also applied to appropriate control logic 1732 in harmonics transceiver 138. Control logic 1732 activates a suitable signal generator 1734 and renders conductive a bidirectional gate 1736. The signals from signal generator 1734 are applied through gate 1736 and a bandpass filter 1738. Bandpass filter 1738 is, in turn, coupled to an isolating transformer 1740, which applies the signals to power line 116. The harmonic signals produced on power line 116 by transceiver 138 are detected by consumer consumption warning indicator 144.

Consumer warning indicator (CCWI) 144 is plugged into the house wiring 140 at electrical outlet 142. The electrical signals are applied through an isolating transformer 1742 to a highpass filter 1744. Highpass filter 1744, in effect, filters out the 60 cycle components of the signal extracted from the house wiring. The filtered signal is applied through an amplifier 1746 and a bandpass filter 1750 to a driver 1752. Driver 1752 provides a driving signal for a visual indicia such as a light 1754 and to a speaker 1756. Speaker 1756 can be selectively disconnected by a switch 1758. Thus, when control of the designated appliances is effected by the utility, the consumer is provided an indication of the control by CCWI 144. Accordingly, the consumer may exercise his option to over-ride control circuit 136 (switch 1710) as previously described.

As well known in the art, the utility can also exercise direct control of the designated appliances through harmonics transceiver 138. A harmonics signal would be generated on power line 116 by central complex 100. The harmonic signal would be detected by transceiver 138 and appropriate control signals to circuitry 1720 and 1722 generated by control gating logic 1732.

As noted above in conjunction with FIG. 1, a remote read out system in accordance with the present invention, facilitates the use of solid state metering devices. A suitable solid state meter 1800 is shown in FIG. 18. A current metering coil 1810 is disposed about one of the power lines 116. Coil 1810 is coupled through an amplifier 1812 to suitable reference circuitry 1814. Output signals from reference circuit 1814 are applied through an integrator 1816 to a comparator 1818. The output of the comparator 1818 is applied to gating and control logic 1820.

The voltage across the consumers load is sampled by an amplifier 1822. The output signal from amplifier 1822 is applied to a reference circuit 1824. The output signal from reference circuit 1824 is applied through an integrator 1826 to a comparator 1828. The output of comparator 1828 is applied to gating and control logic 1820. Reference circuits 1814 and 1824, in effect, normalize the voltage and current samples. Integrator 1816, comparator 1818 and integrator 1826 and comparator 1828, respectively cooperate as analog-to-digital converters. The output signals of comparators 1818 and 1826 are pulses representing increments of "consumed" current and voltage. Gating and control circuitry 1820 selectively applies the output signals of comparators 1818 and 1828 to a conventional digital multi-meter integrated circuit 1830.

The voltage and current pulses are thus, in effect, time multiplexed to multimeter 1830. Multimeter 1830 provides measurements of the voltage and current. The voltage and current measurements are applied to an arithmetic unit 1832. At predetermined time intervals, arithmetic unit 1832 multiplies the voltage and current measurements along with a conversion factor, to develop indicia of energy consumed. The product is registered in an accumulator 1834. Accumulator 1834 is analogous to A index register counter 512. The contents of accumulator 1834 can be displayed by an LED display 1836, if desired. Similar display (1838) can be provided for the B index register. A display (1840) or print out (1842) of the consumers bill can also be provided. The amount due information can be provided by the instruction word, and stored in a dedicated register (not shown) or in an auxiliary portion (not shown) of memory 1200.

Remote unit 110 can also be utilized in statistical poling applications. Information can be entered through keyboard 152 and stored, for example, in an auxiliary portion of memory 1200 (not shown), or in B index register 700. The information can be reported during the regular monthly meter reading or a call can be immediately initiated to central complex 100.

It will be understood that while various of the conductors are shown in the drawings as single lines, they are not shown in a limiting sense and plural connections may be made as understood in the art. Further, the above description is of an illustrative embodiment of the present invention, and the invention is not limited to the specific form shown. Various modifications can be made in the design and arrangement of the elements as will be apparent to those skilled in the art without departing from the scope of the invention as expressed in the appended claims.

What is claimed is:

1. A method for monitoring anc controlling a remote unit adapted for communicating data to a central complex through a non-dedicated telephone line, said central complex having a telephone number assigned thereto, said method comprising the steps of:
   deriving and storing information within said remote unit;
   selectively controlling, responsive to signals indicative of real time occurrence, at least a portion of said remote unit so as to selectively seize said telephone line at a predetermined real time;
   generating signals onto said telephone line representative of said central complex telephone number at said predetermined real time to thereby address said central complex and effect a communication connection therewith;
   generating at the remote unit onto said telephone line, responsive to acknowledgement signals received from said central complex, coded signals indicating the identity of said remote unit and said stored information; and
   receiving and storing at the remote unit subsequent signals from said central complex including indicia of the current real time and of the next predetermined real time at which the foregoing steps are to be repeated.

2. A method for remotely monitoring a plurality of parameters input to a remote unit adapted to automatically communicate with a central complex through a non-dedicated telephone line, said central complex having a telephone number assigned thereto, said method comprising the steps of:
   selectively generating in said remote unit respective numerical indicia of said parameters having values determined as a function of parameter control signals;
   selectively seizing said telephone line at a predetermined real time and generating signals onto said telephone line representative of said central complex telephone number to address said central complex;
   generating, responsive to acknowledgement signals from said central complex, coded signals indicative of the identity of said remote unit and said respective parameter indicia; and
   receiving and storing at the remote unit from said central complex said parameter control signals.

3. The method of claim 1 wherein said parameter control signals received from the central complex include indicia of the next desired callback time.

4. The method of claim 3 wherein said parameter control signals further include indicia of real time at the time of receiving the parameter control signals, and said generating said callback signal step includes:
   generating, responsive to said stored indicia of real time, a signal indicative of instantaneous real time;
   comparing said instantaneous real time signal to indicia of said desired callback time; and
   generating said callback signal upon a favorable comparison.

5. A method for remote monitoring of a parameter wherein a remote unit communicates with a central complex through a telephone line comprising the steps of:
   generating, responsive to and as a function of parameter control signals, indicia of said parameter;
   generating, from stored representations of instruction signals transmitted by telephone from said central complex in response to the last previous communications from the remote unit, a callback signal indicative of the occurance of a desired callback time;
   generating, responsive to said callback signal, line selection signals on said telephone line to effect a telephone connection between said remote unit and said central complex;
   effecting, responsive to a signal from said central complex indicative of a completed telephone connection, a data transmission including indicia of the identity of said remote unit and a representation of said indicia of said parameter; and
   receiving and storing instruction signals from said central complex in response to said data transmission, said instruction signals including indicia of said parameter control signals.

6. The method of claim 5 wherein said instruction signals further include indicia of real time at the time of receiving the instruction signals, and said generating said callback signal step includes:
   generating, responsive to said stored indicia of real time, a signal indicative of instantaneous real time;
   comparing said instantaneous real time signal to indicia of said desired callback time; and
   generating said callback signal upon a favorable comparison.

7. In a system for remotely monitoring consumption of the type comprising a remote unit cooperating with a consumption meter and a central complex, said central complex and said remote unit being adapted for selective interconnection by a telephone system, the improvement wherein said remote unit comprises:
   register means, responsive to signals indicative of consumption and register control signals applied thereto, for selectively generating indicia of cumulative consumption;
   instruction input means, responsive to instruction signals applied thereto and a clock signal, for storing representations of said instruction signals and generating respective control signals in accordance therewith;
   said control signals including a callback control signal indicative of the occurrence of a desired callback time and said register control signals;
   means, responsive to said callback control signal, for generating selection signals to said telephone system to effect a telephone call from said remote unit to said central complex;
   sync detector means, responsive to said instruction signals, for generating a local sync signal indicative of reception of a proper sync signal transmitted from said central complex in acknowledgement of a completed telephone connection;
   means, responsive to said local sync signal, for effecting a data transmission to said central complex, said data transmission including signals indicative of said indicia of cumulative consumption;

said central complex generating said instruction signals to said remote unit in response to reception of said data transmission.

8. In a system for monitoring respective parameters of a remote unit wherein communications between said remote unit and a central computer are effected through a telephone system, a remote unit comprising:

means, responsive to parameter control signals applied thereto, for deriving indicia of at least one of said parameters;

means for storing an instruction word from said central computer;

means for generating said parameter control signals from said stored instruction words;

means for generating a representation of real time and generating a callback control signal at a desired callback time;

means, responsive to said callback control signal, for establishing a telephone call from said remote monitoring unit to said central computer at said desired callback time, said central computer acknowledging a completed telephone connection by transmitting a first synchronization signal to said remote monitoring unit through said telephone system; and means, responsive to said first synchronization signal, for transmitting a data word to said central computer, said data word including a portion representative of the identity of the remote unit and a portion representative of said indicia of said parameter.

9. The system of claim 8 wherein said means for generating a representative of real time and generating a callback signal comprises:

presettable counter means, receptive of indicia in said instruction word of real time at the time of reception, and responsive to a clock signal applied thereto, for generating a signal indicative of instantaneous real time;

storage means, for strong indicia in said instruction word of the next desired callback time; and comparitor means, cooperating with said counter means and said storage means, for generating said callback signal when said real time signal equals said stored callback time indicia.

10. The system of claim 8 wherein
said instruction word includes an error code portion derived in a predetermined manner from the other portions of said instruction word,
said means for storing includes means for storing indicia of said error code, and
said remote unit further comprises:
　error code computation means for independently deriving said error code in said predetermined manner from the other portions of said instruction word;
　means for comparing said stored indicia of said error code with said independently derived error code and responsively selectively generating an error control signal and
　means, responsive to said error coded signal for retransmitting said data transmission.

11. The apparatus of claim 8, or 10 further including:
input means, for generating signals indicative of additional data; and means, responsive to signals indicative of said additional data for storing indicia of additional data;
signals representative of said stored additional data being transmitted with said data word.

12. In a system for monitoring a remote unit having apparatus associated therewith wherein communications between said remote unit and a central computer are effected through a telephone system, said remote monitoring unit comprising:

at least one sensor;

means, coupled to said sensor, for storing indicia of the status of said sensor;

means for storing an instruction word including indicia of at least one predetermined time period;

means for generating a representation of real time;

means for storing indicia of a desired callback time;

means, responsive to said representation of real time and time period indicia, for generating a control signal indicative of the occurrence of said predetermined time period;

means, responsive to said control signal, for selectively effecting control of said associated apparatus during said time period;

means, responsive to said representation of real time and said indicia of desired callback time, for generating a call back control signal at the desired callback time;

means, responsive to said callback control signal, for establishing a telephone connection from said remote monitoring unit to said central computer at said desired callback time, said central computer acknowledging a completed telephone connection by transmitting a first synchronization signal to said remote monitoring unit through said telephone system; and means, responsive to said first synchronization signal, for transmitting a data word to said central computer, said data word including a portion representative of the identity of the remote unit and a portion representative of said stored indicia of the status of said sensor.

13. Apparatus, adapted for operative connection into a telephone system and for automatic communication to a central complex through said telephone system, said central complex having a predetermined telephone number assigned thereto, said apparatus comprising:

means for deriving information concerning the operation of said apparatus;

memory means for storing indicia of said information;

means for receiving and storing instruction signals from said central complex, said instruction signals including indicia of a desired callback time and indicia of at least one predetermined period;

clock means for providing a clock signal indicative of real time;

means, responsive to said clock signal and said stored indicia of said predetermined time period for generating signals indicative of real time occurrence of said predetermined period;

means, responsive to said signals indicative of real time occurrence of said predetermined period, for selectively controlling operation of at least a portion of said apparatus;

means for storing indicia of central complex telephone number and indicia of the identity of said apparatus;

means, responsive to said clock signal and desired callback time indica, for generating a callback control signal upon real time occurrence of said desired callback time;

means, responsive to said callback control signal and said stored indicia of said central complex telephone number, for selectively seizing a telephone line in said telephone system and generating signals onto said telephone line representative of said central complex telephone number to address said central complex;

means, responsive to said stored indicia of said identity and said stored indicia of said information and to signals received from said central complex indicative of a completed connection to said central complex, for transmitting signals representative of said identity indicia and information indicia over said telephone lines to said central complex.

14. In a system for remote monitoring of a parameter associated with an apparatus, said apparatus being adapted for operative connection into a telephone system and for automatic communication to a central complex through said telephone system, said central complex having a predetermined telephone number assigned thereto, said apparatus comprising:

means for storing said central complex telephone number and indicia of the identity of said apparatus;

means, responsive to parameter control signals applied thereto, for deriving indicia of said parameter;

clock means for providing a clock signal indicative of real time;

means, responsive to said clock signal for generating a callback control signal at a real time corresponding to said desired callback time;

means, responsive to said callback signal, for selectively seizing a telephone line in said telephone system and generating signals onto said telephone line representative of said central complex telephone number to address said central complex;

means, coupled to both of said means for storing and responsive to signals indicative of a completed connection to said central complex, for transmitting signals representative of said identity indicia and parameter indicia over said telephone lines to said central complex;

means, receptive of instruction signals transmitted from said central complex in response to said parameter indicia transmission by said apparatus, for generating said parameter control signals.

15. A system for remote monitoring of a parameter associated with a remote unit, said monitoring system being of the type including said remote unit and a central computer, said remote unit and central computer both being adapted for connection into a telephone system, said monitoring system comprising:

means, in said remote unit, for deriving indicia of said parameter in accordance with parameter control signals applied thereto;

means, in said remote unit, connected to receive and to store an instruction word transmitted from said central computer including a representation of said parameter control signals;

means, in said remote unit, for generating a representation of real time and generating a callback control signal at a desired callback time;

means, in said remote unit and responsive to said callback control signal, for establishing a telephone call from said remote unit to said central computer; and means, in said remote unit and responsive to a first synchronization signal from said central computer indicative of a completed connection, for transmitting through said telephone system to said central computer a data word, said data word including a portion indicative of the identity of said remote unit and a portion representative of said indicia of the derived parameter;

said central computer, in response to successful reception of said data word, transmitting to said remote unit said instruction word through said telephone system.

16. Apparatus adapted for selective operative connection through a telephone system to a central complex, said apparatus comprising:

input storage means for receiving and storing an instruction word from said central complex, said instruction word including indicia of real time at the time of transmission of said instruction word, and indicia of desired operational status for each successive period of predetermined duration in a day, said input storage means including:
presettable counter means, responsive to a clock signal applied thereto and to said instruction word indicia of real time for generating a signal indicative of instantaneous real time; and register means, including a respective portion corresponding to each said period of predetermined duration, for storing indicia of said desired operational status for each of said periods;

means, responsive to said instantaneous real time signal and said stored indicia of operational status, for selectively controlling at least a portion of said apparatus; and means, responsive to said instantaneous real time signal, for selectively seizing said telephone line at a predetermined real time, and effecting a telephone connection to said central complex, said central complex transmitting said instruction word through said telephone connection.

17. A method for remote monitoring of sensors adapted for automatic communication with a central complex through a telephone line, said central complex having a telephone number assigned thereto, comprising the steps of:

maintaining, in said unit, indicia of real time;

responsive to said indicia of real time, selectively seizing said telephone line at a predetermined real time;

generating signals onto said telephone line representative of said central complex telephone number to address said central complex;

generating, responsive to acknowledgement signals from said central complex, coded signals indicative of the identity of said sensors and data indicative of the status of said sensors; and responsive to subsequent signals from said central complex indicative of real time, updating said indicia of real time.

18. The method of claim 17 wherein said subsequent signals from the central complex include signals indicative of the real time of the next scheduled seizure of said telephone line and further including the step of:

receiving and storing said signals from said central complex indicative of the time of the next scheduled seizure of said telephone line.

19. The method of claim 1, 17, or 18 wherein said selectively seizing step includes:

testing said telephone line at said predetermined real time and responsively generating a line availability signal;

responsive to indicia of line non-availability, waiting a first predetermined delay period, then retesting said telephone line and responsively generating said line availability signal; and responsive to indicia of line availability, seizing said telephone line.

20. The method of claim 19 wherein said selectively seizing step further includes the steps of:

counting the number of retests of said telephone lines; and after a predetermined number of said retests, waiting a second predetermined delay period, then repeating said retest step, said second predetermined delay period being longer than said first predetermined delay period.

21. The method of claim 1, or 18 wherein said subsequent signals from said central complex indicative of real time include an error code portion in accordance with the other portions thereof and said receiving and storing step includes receiving and storing said error code portion, said method further including the steps of:

independently deriving said error code from said other portions of said subsequent transmission;

comparing said derived error code to the received error code portion, and responsively generating indicia of said error code comparison; and responsive to indicia of an unfavorable error code comparison, releasing said telephone line, then after a first predetermined period of time, repeating in sequence at least said selectively seizing step, said generating signal steps, and said receiving and storing step.

22. The method of claim 21 further comprising the step of detecting if said error code portion of said subsequent transmission is not received within a second predetermined time period after said generating coded signals step is initiated and responsively releasing said telephone line and repeating in sequence at least said selectively seizing step, said generating steps, and said receiving and storing step.

23. A method for remote monitoring of a parameter wherein a remote unit communicates with a central complex through a telephone line comprising the steps of:

generating, in said remote unit, indicia of said parameter;

generating, from stored representations of instruction signals transmitted by telephone from said central complex in response to the last previous communication from the remote unit, a callback signal indicative of the occurrence of a desired callback time;

generating in said remote unit, responsive to said callback signal, signals on said telephone line to effect a telephone connection between said remote unit and said central complex;

effecting, responsive to a signal from said central complex indicative of a completed telephone connection, a data transmission including indicia of the identity of said remote unit and a representation of said indicia of said parameter; and receiving and storing instruction signals from said central complex in response to said data transmission, said instruction signals including indicia of the current real time, for facilitating the next generation of said callback signal.

24. The method of claim 23 wherein said instruction signals further include indicia of a next desired callback time.

25. In a system for remotely monitoring consumption of the type comprising a remote unit cooperating with a consumption meter and a central complex, said central complex and said remote unit being adapted for selective interconnection by a telephone system, the improvement wherein said remote unit comprises;

first register means, responsive to signals indicative of consumption, for generating indicia of cumulative consumption;

instruction input means, responsive to instruction signals applied thereto and a clock signal, for storing representations of said instruction signals and generating respective control signals in accordance therewith;

said instruction input means, including presettable real time counter means, for generating real time signals indicative of real time, said real time counter means being preset in accordance with said instruction signals;

said instruction input means further including means, responsive to said real time signals, for generating a callback control signal indicative of the occurrence of a desired callback time;

signal generating means, responsive to said callback control signal for generating dial signals to said telephone system to effect a telephone call from said remote unit to said central complex and for thereafter effecting a data transmission to said central complex, said data transmission including a portion indicative of said indicia of cumulative consumption; and said central complex generating said instruction signals to said remote unit in response to reception of said data transmission.

26. The system of claim 25 wherein said signal generating means includes:

sync detector means responsive to said instruction signals for generating an in-sync signal indicative of reception of a proper sync signal transmission from said central complex in acknowledgement of a completed telephone connection;

means, responsive to said in-sync signal, for effecting said data transmission.

27. The remote unit of claim 7, 25, or 26 wherein said instruction input means comprises:

input byte decoder means, responsive to serial instruction signals applied thereto, for generating sequential parallel instruction bytes and instruction byte control signals indicative thereof, said instruction bytes including representations of said desired callback time; and instruction data register means, responsive to said instruction bytes and instruction byte control signals, and a clock signal applied thereto, for storing said instruction bytes and generating said respective control signals in accordance with said instruction bytes.

28. The remote unit of claim 25 or 26 wherein said instruction signals include respective portions representative of a consumption threshold value, and sampling period and said remote unit further includes:

first counter means, responsive to signals indicative of power consumption, for selectively accumulating a count indicative of consumption during said sampling periods; and comparator means, for comparing said count to said consumption threshold value and upon an unfavorable comparison signal to effect control of a predetermined consuming appliance.

29. The remote unit of claim 28 further including:
consumer over-ride means, for generating an over-ride signal to effect release of control of said predetermined consuming appliance; and
second counter means, receptive to signals indicative of power consumption, said over-ride signal and said comparison signal, for selectively accumulating a premium count indicative of consumption during periods when a disabling of said predetermined consuming appliance is over-ridden, said data transmission including portion representative of said premium count.

30. The remote unit of claim 28 further including:
means, responsive to said comparison signal, for selectively controlling in predetermined sequence further consuming appliances, upon successive unfavorable comparisons, and for releasing control of said consuming appliances in predetermined sequence upon subsequent favorable comparisons.

31. The remote unit of claim 25 or 26 wherein said instruction signals include portions representative of a sampling period and said remote unit further includes:
counter means, responsive to signals indicative of consumption and reset signals applied thereto, for selectively accumulating counts indicative of consumption during said sampling periods;
a storage register, coupled to said counter means, and responsive to load signals applied thereto for selectively storing the instantaneous count in said counter means; and
comparator means, for comparing the instantaneous count in said counter means and the contents of said storage register and upon an unfavorble comparison, generating a comparison signal to effect loading of said storage register with said instantaneous count.

32. The system of claim 25 wherein said instruction input means further includes presettable period register means, responsive to said instruction word for storing indicia in said instruction word of a desired operational status of at least a portion of said remote unit; and
said remote unit further comprises:
means, responsive to said real time signals and cooperating with said period register means, for selectively controlling operation of at least said portion of said remote unit.

33. The system of claims 7, 25 or 26 wherein said instruction signal include an error code portion derived in a predetermined manner from the other portions of said instruction signals, and said instruction input means includes means for storing indicia of said instruction signal error code; and
said remote unit further comprises:
error code computation means for independently deriving said error code in said predetermined manner from the other portions of said instruction signals,
means for comparing said stored indicia and said independently derived error codes, and generating an error control signal, in response to an unfavorable comparison; and
means responsive to said error control signal, for reeffecting said data transmission to said control complex.

34. In a system for remote monitoring of a sensor wherein communications between said sensor and a central computer are effected through a telephone system, a remote monitoring unit comprising:
means, coupled to said sensor, for storing indicia of the status of said sensor;
means for storing an instruction word including a representation of current real time, and including means for generating a real time count;
means responsive to said real time count for generating a callback control signal at a desired callback time;
means, responsive to said callback control signal, for establishing a telephone call from said remote monitoring unit to said central computer at said desired callback time, said central computer acknowledging a completed telephone connection by transmitting a first synchronization signal to said remote monitoring unit through said telephone system; and
means, responsive to said first synchronization signal, for transmitting a data word to said central computer, said data word including a portion representative of the identity of the remote unit and a portion representative of said stored indicia of the status of said sensor.

35. The system of claim 8 or 34 wherein said instruction word further includes a representation of said desired callback time.

36. Apparatus for remote monitoring of a sensor, said apparatus being adapted for operative connection into a telephone system and for automatic communication to a central complex through said telephone system, said central complex having a predetermined telephone number assigned thereto, said apparatus comprising:
means for storing said central complex telephone number and indicia of the identity of said sensor;
means, coupled to said sensor, for storing indicia of the state of said sensor;
clock means, responsive to real time update signals from said central complex, for providing a clock signal indicative of real time;
means, responsive to said clock signal and a signal representative of a desired callback time, for generating a callback control signal at said desired callbeck time;
means, responsive to said callback control signals thereto, for selectively seizing a telephone line in said telephone system and generating signals into said telephone line representative of said central complex telephone number to address said central complex;
means coupled to both of said means for storing, responsive to signals indicative of a completed connection to said central complex, for transmitting signals representative of said identity indicia and state indicia over said telephone lines to said central complex; and
means for generating said signal representative of said desired callback time.

37. The apparatus of claim 36 wherein said means for generating said signal representative of said desired callback time comprises means for storing a representative of said desired callback time transmitted from said central complex.

38. The apparatus of claim 36 or 37 further including:
input means for generating signals indicative of additional data; and means, responsive to signals indicative of said additional data for storing indicia of additional data;

signals representative of said stored additional data being transmitted with said signals representative of said identity indicia and status indicia to said central complex.

39. The remote unit of claim 36 further including:

error code processing means, for generating an error code from sequential signals applied thereto, said sequential data signals being applied to said error code generator means to develop a data word error code, signals representative of said data word error code being applied to said data output means for communicating to said central complex;

said instruction word including indicia of an instruction word error code;

said sequential instruction signals also being applied to error code processor means to produce a derived error code for said instruction word; and said error code processor means including second comparator means, responsive to signals indicative of said instruction word error code and signals indicative of said derived error code, for generating a bad error code signal when said instruction word error code and said derived error code compare unfavorably, to effect a further callback to said central complex after a predetermined time period.

40. The remote unit of claim 39 wherein said sequential data signals and said sequential instruction signals comprise sequential bytes of predetermined bit length, and said error code processor means comprises:

a longitudinal redundance code (LRC) generator;

a Bose-Chaudhuri-Hocquenghem (BCH) code generator;

means for selectively applying the last significant bits of said sequential bytes to said BCH code generator and the remaining bits to said LRC generator; and said LRC and said BCH code generator being selectively coupled to said second comparator means.

41. A system for remote monitoring of a sensor, said monitoring system being of the type including a remote unit coupled to said sensor and a central computer, said remote unit and central computer both being adapted for connection into a telephone system, said monitoring system comprising:

means in said remote unit for storing indicia of the status of said sensor;

means, in said remote unit, for receiving and storing an instruction word transmitted from said central computer including a representation of a desired callback time and a real time update;

means, in said remote unit and responsive to said real time update and said representation of a desired real time, for generating a callback control signal at said desired callback time;

means, in said remote unit and responsive to said callback control signal, for establishing a telephone call from said remote unit to said central computer at said desired callback time; and means, in said remote unit and responsive to a first synchronization signal from said central computer indicative of a completed connection, for transmitting through said telephone system to said central computer a data word, said data word including a portion indicative of the identity of said remote unit and a portion representative of said stored indicia of the status of said sensor;

said central computer, in response to successful reception of said data word, transmitting to said remote unit said instruction word through said telephone system.

42. The system of claim 41 adapted for monitoring electrical power consumed over a power line wherein said sensor comprises a solid state meter including:

means, for generating a signal indicative of current passing through the power line;

means, for generating a signal indicative of voltage across the power line; and means, responsive to said signals indicative of current voltages, for generating a signal indicative of the product of said voltage and current to thereby provide indicia of power consumed.

43. In a system for remotely monitoring a parameter, said system being of the type comprising a remote unit cooperating with a sensor for providing signals indicative of said parameter and a central complex, said central complex and said remote unit being adapted for selectively interconnection through a telephone system, the improvement wherein said remote unit comprises:

first index register means, responsive to signals indiactive of said parameter, for generating cumulative indicia of said parameter;

instruction input means, responsive to instruction signals applied thereto and a clock signal, for storing representations of said instruction signals and generating respective control signals in accordance therewith;

said instruction input means including means, responsive to respective update signals from said central complex, for generating a callback contrl signal indicative of the occurrence of a desired callback time;

means, responsive to said callback control signal for generating dial signals to said telephone system to effect a telephone call from said remote unit to said central complex;

sync detector means, responsive to said instruction signals for generating a local sync signal indicative of reception of a predetermined synchronization signal transmitted from said central complex in acknowledgement of a completed telephone connection; and means, responsive to said local sync signal, and coupled to said first index register for effecting a data transmission to said central complex, said data transmission being synchronized with said predetermined synchronization signal and including a portion indicative of said cumulative indicia of said parameter;

said central complex generating said instruction signals to said remote unit in response to reception of said data transmission.

44. The remote unit of claim 43 wherein said instruction input means comprises:

input byte decoder means, responsive to serial instruction signals applied thereto, for generating sequential parallel instruction bytes and instruction byte control signals indicative thereof, said instruction bytes including representations of said desired callback time; and instruction data register means, responsive to said instruction bytes, said instruction byte control signals and a clock signal applied thereto, for storing said instruction bytes and generating said respective control signals in accordance with said instruction bytes.

45. The remote unit of claim 43 wherein said instruction signals include respective portions representative of a parameter threshold value and a sampling period, and said remote unit further includes;

first counter means, responsive to signals indicative of said parameter for selectively accumulating a count indicative of said parameter during said sampling periods; and comparator means, for comparing said count to said parameter threshold value and upon an unfavorable comparison generating a comparison signal to effect a control of a predetermined device.

46. The remote unit of claim 45 further including:

consumer over-ride means, for generating an over-ride signal to decontrol said predetermined device; and second counter means, receptive of signals indicative of said parameter, said over-ride signal and said comparison signal, for selectively accumulating a premium count indicative of said parameter during periods when control of said predetermined consuming appliance is over-ridden, said data transmission including portion representative of said premium count.

47. The remote unit of claims 45 or 46 further including:

means, responsive to said comparison signal for selectively controlling in predetermined sequence further devices upon successive unfavorable comparisons, and for decontrolling said consuming appliances in predetermined sequence upon subsequent favorable comparisons.

48. The remote unit of claim 43 wherein said instruction signals include portions representative of a sampling period and said remote unit further includes:

counter means, responsive to signals indicative of said parameter and reset signals applied thereto, for selectively accumulating a count indicative of consumption during said sampling periods;

a storage register, coupled to said counter means and responsive to load signals applied thereto, for selectively storing said count; and comparator means for comparing said count and the contents of said storage register, and upon an unfavorable comparison generating a comparison signal to effect loading of said storage register with said count.

49. The apparatus of claim 7, 25, 43, 44, 45, 46 or 48 further including:

input means, for generating signals indicative of additional data; and means, responsive to signals indicative of said additional data, for storing indicia of said additional data;

signals representative of said stored additional data being transmitted in said data transmission to said central complex.

50. In a system wherein a remote unit periodically communicates information relating to a given parameter to a central complex, said communications being effected through a telephone system, the remote unit comprising:

index register means, responsive to signals indicative of said parameter, for accumulating said information relating to said parameter;

memory means, for storing indicia of the telephone number of said central complex and indicia of said remote unit identity;

means, responsive to a callback command signal applied thereto for generating a start dial mode signal;

output means for generating signals through said telephone system to said central complex, said output means including dialing means, coupled to said memory means and responsive to said start dial mode signal, for sequentially generating signals indicative of the respective digits of said stored telephone number digits to said telephone system to effect a telephone connection between said remote unit and said central complex;

said output means further including data output means responsive to a signal indicative of a completed telephone connection to said central complex, for sequentially generating sequential data signals indicative of said stored indicia of remote unit identity and said accumulated information, and communicating said stored indicia and said accumulated information to said central complex through said telephone system;

instruction input means, receptive of sequential instruction signals indicative of an instruction word through said telephone system from said central complex for storing indicia of said instruction word and generating respective control signals in accordance with said instruction word, said instruction word including indicia of a desired callback time; and said instruction input means including real time clock means, responsive to said instruction word, for providing an indicia of real time, and first comparator means, responsive to signals indicative of said desired callback time and the instantaneous real time, for generating said callback command signals upon occurrence of said desired callback time.

51. The remote unit of claim 50 wherein said instruction word contains indicia of a desired operational mode indicia of a threshold value, and indicia of designated time periods during which said desired operational mode is to be effected; and said instruction input means includes means responsive to signals indicative of said indicia of a desired operation mode, for generating respective DMD mode, L-M mode, and sample command signals, means responsive to signals indicative of said indicia of said designated time periods for generating an ENB signal during said designated time periods; and said index register means includes first gating means, responsive to signals indicative of said metered parameter and said ENB signal, for providing output signals indicative of said parameter during said time periods;

first counter means, responsive to said first gating means output signal and a reset signal applied thereto, for accumulating a count indicative of said first gating means output signal;

pulse generator means, responsive to said sample command signal, for generating sequences of timing pulses of sampling intervals in accordance with said sample command signal;

Q register means, cooperating with said first counter and said instruction input means and responsive to said L-M mode control signal, a first one of said pulse generator timing pulses, and a comparison signal applied thereto, for controllably storing indicia of said threshold value, or said first counter means count in accordance with said L-M mode control signal;

third comparator means, for comparing the indicia stored in said Q register means with said first counter means count at said sampling intervals and generating said comparison signal upon an unfavorable comparison;

said Q register means including means, responsive to said DMD signal and said comparison signal, for effecting storing of said first counter means count in response to said comparison signal;

said index register means further comprising load control means, responsive to said L-M signal and said comparison signal and a consumer over-ride signal for selectively effecting control of designated apparatus in response to unfavorable comparisons;

said load control means releasing control of said designated apparatus in response to said consumer over-ride signal;

second gating means, responsive to signals indicative of said metered parameter, said L-M control signal, and a consumer over-ride signal, for selectively generating an output signal indicative of said metered parameter during load management over-ride time periods in accordance with said consumer over-ride signal;

second counter means, for generating a count indicative of said second gating means output signal; and means for controllably providing output signals indicative of the indicia stored in said Q register means and said second register count.

52. The remote unit of claim 50 wherein said output means comprises:

means for providing first, second, third and fourth clock signals, each of said clock signals comprising a train of pulses having leading and lagging edges and recurring at respective predetermined frequencies;

means for selectively generating sequential information byte signals, said information byte signals including a predetermined number of bytes representative of the respective digits of said stored telephone number, and a predetermined number of data bytes representative of said stored indicia of identity and said information accumulated by said index register means;

means, responsive to said information byte signals, for generating translated information byte signals whereby each information byte is represented by a translated information byte having a value at least equal to one;

clock selection logic means responsive to said first, second and third clock signals, said start dial mode signal and said signal indicative of a completed telephone connection, for selectively generating mode control signals and generating a sequence of pulses at said third clock signal frequency, in timed relation with the lagging edge of each pulse of a chosen one of said first and second clock signals, said chosen one of said first and second clock signals and said mode control signals being in accordance with said start dial mode signal and said signal indicative of a completed telephone connection;

output gating means, responsive to said first, second and fourth clock signals and mode control signals and a mark enable signal applied thereto, for selectively providing, in accordance with said mode control signals, first or second output signals respectively indicative of said telephone number digits and said data bytes, said telephone number digits being represented by a number of pulses of said first clock signal, delineated by an absence of pulses during a predetermined period corresponding to a predetermined number of cycles of said first clock signal, and said data bytes being represented by bursts of said fourth clock signal during periods defined by a number of pulses of said second clock signal, delineated by an absence of pulses during a predetermined period corresponding to a predetermined number of cycles of said second clock signal;

mark counter means, responsive to a first of said timing pulses and to a signal indicative of said mark enable signal for selectively accumulating a mark count indicative of the number of pulses provided by said output gating means;

mark comparator means, cooperating with said mark counter means and responsive to said translated information bytes and a second timing pulse subsequent to said first timing pulse, for comparing said accumulated mark count and said translated information byte after each time said first counter means is incremented, and generating said mark enable signal during periods when said accumulated mark count is less than the value of said translated information byte and a space enable signal when said accumualted mark count is equal to said translated information byte value, said mark counter means being reset in response to generation of said space enable signal;

space counter means, responsive to said space enable signal, a signal indicative of said mode control signals and said first timing pulse for generating respective control signals to said mark comparator means to effect regeneration of said mark enable signal after a predetermined time period corresponding to said predetermined number of cycles of said chosen one of said first and second clock signals;

said mark enable signal enabling the generation of said first or second output signals by said output gating means, whereby said telephone number digits are represented by a number of said first clock signal pulses corresponding to the value of the associated translated information byte and said bytes are represented by a number of bursts of said fourth clock signal corresponding to the value of the associated translated information byte.

53. The remote unit of claim 50 wherein said index register means comprises a counter responsive to signals indicative of said metered parameter and means for controllably providing output signals indicative of the contents of said counter and wherein said remote unit further comprises auxiliary index register means, responsive to control signals applied thereto, and selectively responsive to signals indicative of said metered parameter, and signals indicative of the most significant bit of said first index register means counter register means, for selectively accumulating information relating to said metered parameter, and second index register means comprising:

first gating means, for selectively providing output signals indicative of said signals indicative of said parameter or said signals indicative of said most significant bit of said first register means counter, in accordance with control signals thereto;

second counter means, responsive to said first gating means output signal and a reset signal applied thereto, for accumulating a count indicative of said first gating means output signal;

second gating means, responsive to control signals applied thereto, for selectively providing an output signal alternatively indicative of said metered parameter or indicative of the most significant bit of said second counter means;

third counter means, responsive to said second gating means output signal for accumulating a count indicative of said second gating means output signal;

Q register means, cooperating with said second counter means and responsive to signals indicative of said instruction word and control signals applied thereto, for controllably storing indicia of a chosen one of a predetermined portion of said instruction word or indicia of the contents of said second counter means, in accordance with the control signals applied thereto;

pulse generator means, responsive to a sample command signal, and control signals applied thereto, for controllably generating first and second sequential timing pulses in response to each sample command signal;

control logic means, selectively responsive to said first timing pulse or a comparison signal in accordance with control signals applied thereto, for controllably generating load command control signals to said Q register means;

third comparator means for comparing the contents of said second counter means and Q register means, and generating said comparison signal upon an unfavorable comparison;

means, responsive to said comparison signal, for selectively effecting control of designated apparatus; and means for controllably providing output signals indicative of the contents of said Q register means and the contents of said third counter means;

said second timing pulse being applied as said reset signal to said second counter means.

54. The remote unit of claim 51, 52 or 53 further including:

means, for generating additional information signals representative of additional information;

means, for storing indicia of said additional information; and means, for selectively applying signals indicative of said stored additional data, to effect generation of sequential data signals indicative of said additional information.

55. The system of claim 54 wherein said instruction word further includes indicia of respective operational time periods, and said remote unit further comprises means, responsive to said indicia of respective operational time periods, for selectively controlling operation of at least a portion of said remote unit.

56. In a system wherein a remote unit periodically communicates information relating to a given parameter to a central complex, said communications being effected through a telephone system, the remote unit comprising:

index register means, responsive to signals indicative of said parameter, for accumulating said information relating to said parameter;

memory means, for storing indicia of the telephone number of said central complex and indicia of said remote unit identity;

means, responsive to a callback command signal applied thereto for generating a start dial mode signal;

output means for generating signals through said telephone system to said central complex, said output means including dialing means, coupled to said memory means and responsive to said start dial mode signal, for sequentially generating signals indicative of the respective digits of said stored telephone number digits to said telephone system to effect a telephone connection between said remote unit and said central complex;

said output means further including data output means responsive to a signal indicative of a completed telephone connection to said central complex, for sequentially generating sequential data signals indicative of said stored indicia of remote unit identity and said accumulated information, and communicating said stored indicia and said accumulated information to said central complex through said telephone system;

instruction input means, receptive of sequential instruction signals indicative of an instruction word through said telephone system from said central complex for storing indicia of said instruction word and generating respective control signals in accordance with said instruction word, said instruction word including indicia of a desired callback time; and said instruction input means including real time clock means, responsive to said instruction word, for providing an indicia of real time, and first comparator means, responsive to signals indicative of said desired callback time and the instantaneous real time, for generating said callback command signals upon concurrence of said desired callback time;

wherein said sequential instruction signals comprise respective sequential groupings of bursts of a predetermined modulation frequency signal, said signal bursts being of a duration and spacing in accordance with a predetermined data frequency signal, said grouping being representative of respective bytes of said instruction word and separated by an absence of said bursts for a period corresponding to predetermined number of cycles of said data frequency signals, and said instruction input means further comprising:

demodulating means, responsive to said signal bursts, for generating demodulation signals indicative of the corresponding pulses of said data frequency signal;

pulse counter means, responsive to said demodulated signals and a reset signal applied thereto, for accumulating an instruction byte count indicative of the number of pulses in the respective sequential grouping;

end-of-byte detector means, responsive to said demodulated signal, for detecting an absence of pulses over said predetermined number of cycles of said data frequency signal, and generating sequential end-of-byte timing signals indicative of said detected absence;

instruction byte control means, responsive to a first one of said sequential end-of-byte timing signals, for generating an instruction byte control signal indicative of the relative placement of the instruction word byte represented by said instruction byte count within said instruction word;

a subsequent one of said end-of-timing signals being applied as said reset signal to said instruction byte counter means, to facilitate accumulation of the instruction byte count indicative of the next successive sequential grouping; and instruction byte storage means, associated with respective instruction word bytes and responsive to said instruction word byte control signals, for storing counts corresponding to the associated respective instruction word bytes.

57. The remote unit of claim 56 wherein said instruction word includes bytes representative of the real time minutes and hours at which the instruction word is generated, and said real time clock means comprises:

presettable counter logic, preset with said instruction word bytes representative of said real time minutes and hours and incremented by a clock signal applied thereto; and said instruction byte storage means includes a callback time register for storing said bytes representative of said desired callback time;

said presettable counter logic and said callback time register providing input signals to said comparator means.

58. The remote unit of claims 39, 56 or 57 futher including:

means for generating additional information signals representative of additional information;

means for storing indicia of said additional information; and means for selectively applying signals indicative of said stored additional data, to effect generation of sequential data signals indicative of said additional information.

59. The system of claim 58 wherein said instruction word further includes indicia of respective operational time periods, and said remote unit further comprises means, responsive to said indicia of respective operational time periods, for selectively controlling operation of at least a portion of said remote unit.

60. The system of claims 39, 56 or 57 wherein said instruction word further includes indicia of respective operational time periods, and said remote unit further comprises means, responsive to said indicia of respective operational time periods, for selectively controlling operation of at least a portion of said remote unit.

61. Apparatus for remote digital data reading via telephone lines including an automatic telephone dialing apparatus and data transceiving means for communicating via standard telephone line connections with a central station having data processing capabilities, real time measuring means for maintaining data representing the current real time, telephone line seizure means for seizing control of a connected telephone line at a preset real time and effecting a telephone line connection to said central station including means for exchanging signals with said central station to confirm establishment of that connection, and an output data register for maintaining digital data for transmission to said central station upon establishment of that connection, said apparatus being characterized by:

an input data register for receiving data during said connection from said central station used to preset a call back register which records the preset real time at which the next operation of the telephone line seizure means to effect another digital data reading operation is to occur.

62. Apparatus for remote digital data reading as in claim 61 further characterized by:

said input data register including means for receiving data from said central station representative of the then current real time which data is used to update the real time measuring means so as to more accurately maintain data representing the current real time.

63. Apparatus for remote digital data reading as in claim 62 further characterized by:

said input data register including means for receiving control data from said central station representative of a desired one of plural possible operational modes for the apparatus which thereafter operates in accordance with the thus selected mode of operation.

64. Apparatus for remote digital data reading as in claim 63 further characterized by:

said output data register comprising at least two separate stage which may be used separately to meter different parameters or together to provide increased precision or capacity for the metering of a single parameter in corresponding different modes of operation.

65. Apparatus for remote digital data reading as in claim 64 further characterized by:

load management means for controlling the local usage of quantity being metered in accordance with data received from said central station.

66. Apparatus for remote digital data reading as in claim 65 further characterized by:

said telephone line seizure means including means for repetitively attempting to seize the telephone line if initially unsuccessful for a predetermined number of attempts and, if still unsuccessful, the attempted line seizure cycles are repeated the following day at the same relative time.

67. Apparatus for remote digital data reading as in claim 65 further characterized by:

display or printer means for recording billing data at the remote location of said apparatus.

68. Method for remote digital data reading via telephone lines when an automatic telephone dialing apparatus and data transceiving means communicates via standard telephone line connections with a central station having data processing capabilities, maintaining data representing the current real time seizing control of a connected telephone line at a preset real time and effecting a telephone line connection to said central station and exchanging signals with said central station to confirm establishment of that connection maintaining output digital data for transmission to said central station said method being characterized by:

receiving data from said central station used to preset a call back register which records the preset real time at which the next operation of the telephone line seizure means is to occur.

69. Method for remote digital data reading as in claim 68 further characterized by:

receiving data from said central station representative of the then current real time which data is used to update the real time measuring means so as to more accurately maintain data representing the current real time.

70. Method for remote digital data reading as in claim 69 further characterized by:
receiving control data from said central station representative of a desired one of plural possible operational mode for the apparatus which thereafter operates in accordance with the thus selected mode of operation.

71. Method for remote digital data reading as in claim 70 further characterized by:
separately metering different parameters in separate registers.

72. Method for remote digital data reading as in claim 71 further characterized by:
controlling the local usage of the quantity being metered in accordance with data received from said central station.

73. Method for remote digital data reading as in claim 72 further characterized by:
repetitively attempting to seize the telephone line if initially unsuccessful for a predetermined number of attempts and, if still unsuccessful, repeating the attempted line seizure cycles the following day at the same relative time.

74. Method for remote digital data reading as in claim 73 further characterized by:
recording billing data at the remote location of said apparatus.

75. A method for remote monitoring of sensors adapted for automatic communication with a central complex through a telephone line, said central complex having a telephone number assigned thereto, comprising the steps of:
receiving and storing real time update signals from said central complex;
generating, from said real time update signals, indicia of instantaneous real time;
comparing said instantaneous real time indicia to indicia of a predetermined seizing time, and responsively generating a callback signal;
responsive to said callback signal, seizing said telephone line;
generating signals onto said telephone line representative of said central complex telephone number to address said central complex;
generating, responsive to acknowledgement signals from said central complex, coded signals indicative of the identity of said sensors, and data indicative of the states of said sensors; and
receiving and storing subsequent signals from said central complex indicative of the time of the next scheduled seizure of said telephone line.

76. The method of claim 75 further including the step or receiving and storing signals from said central complex indicative of said predetermined seizing time and generating therefrom said indicia of said seizing time.

77. A method for remote monitoring of sensors adapted for automatic communication with a central complex through a telephone line, said central complex having a telephone number assigned thereto, comprising the steps of:
maintaining, in said unit, indicia of real time;
testing said telephone line at said predetermined real time and responsively generating a line availability signal;
responsive to indicia of line non-availability, waiting a first predetermined delay period, then retesting said telephone line and responsively generating said line availability signal;
responsive to indicia of line availability, seizing said telephone line;
counting the number of retests of said telephone lines;
after a predetermined number of said retests, waiting a second predetermined delay period, then repeating said retest step, said second predetermined delay period being longer than said first predetermined delay period;
generating signals onto said telephne line representative of said central complex telephone number to address said central complex; and
generating, responsive to acknowledgement signals from said central complex, coded signals indicative of the identity of said sensors and data indicative of the status of said sensors.

78. In a system for remotely monitoring consumption of the type comprising a remote unit cooperating with a consumption meter and a central complex, said central complex and said remote unit being adapted for selective interconnection by a telephone system, the improvement wherein said remote unit comprises:
register means, responsive to signals indicative of consumption and register control signals applied thereto, for selectively generating indicia of cumulative consumption;
input bytes decoder means, responsive to serial instruction signals applied thereto, for generating sequential parallel instruction bytes and instruction byte control signals indicative thereof, said instruction bytes including representations of a desired callback time;
instruction data register means, responsive to said instruction bytes and instruction byte control signals, and a clock signal applied thereto, for storing said instruction bytes and generating said respective control signals in accordance with said instruction bytes;
said control signals including said callback control signal indicative of the occurrence of a desired callback time and said register control signals;
means, responsive to said callback control signal, for generating selection signals to said telephone system to effect a telephone call from said remote unit to said central complex;
means, responsive to an acknowledgement signal from said central complex, for effecting a data transmission to said central complex, said data transmission including signals indicative of said indicia of cumulative consumption;
said central complex generating said instruction signals to said remote unit in response to reception of said data transmission; and
instruction input means, responsive to instruction signals applied thereto and a clock signal, for storing respresentations of said instruction signals and generating respective control signals in accordance therewith.

79. In a system for remotely monitoring consumption of the type comprising a remote unit cooperating with a consumption meter and a central complex, said central complex and said remote unit being adapted to selective interconnection by a telephone system, the improvement wherein said remote unit comprises:
instruction input means, responsive to instruction signals applied thereto and a clock signal, for storing representations of said instruction signals and generating respective control signals in accordance therewith;

instruction signals including respective portions representative of a consumption threshold value, and a sampling period;

means for generating real time signals indicative of real time;

said instruction input means including means, responsive to said real time signals, for generating a callback control signal indicative of the occurrence of a desired callback time;

signal generating means, responsive to said callback control signal for generating dial signals to said telephone system to effect a telephone call from said remote unit to said central complex and for thereafter effecting a data transmission to said central complex, said central complex generating said instruction signals to said remote unit in response to reception of said data transmission;

first counter means, responsive to signals indicative of power consumption, for selectively accumulating a count indicative of consumption during said sampling periods; and comparator means, for comparing said count to said consumption threshold value and, upon an unfavorable comparison signal for effecting control of a predetermined consuming appliance.

80. The remote unit of claim 179 further including:

means, responsive to said comparison signal, for selectively controlling in predetermined sequence further consuming appliances, upon successive unfavorable comparisons, and for releasing control of said consuming appliances in predetermined sequence upon subsequent favorable comparisons.

81. In a system for remotely monitoring consumption of the type comprising a remote unit cooperating with a consumption meter and a central complex, said central complex and said remote unit being adapted for selective interconnection by a telephone system, the improvement wherein said remote unit comprises:

instruction input means, responsive to instruction signals applied thereto and a clock signal, for storing representations of said instruction signals and generating respective control signals in accordance therewith, said instruction signals including portions representative of a sampling period;

means for generating real time signals indicative of real time;

said instruction input means including means, responsive to said real time signals, for generating a callback control signal indicative of the occurrence of a desired callback time;

signal generating means, responsive to said callback control signal for generating dial signals to said telephone system to effect a telephone call from said remote unit to said central complex and for thereafter effecting a data transmission to said central complex, said central complex generating said instruction signals to said remote unit in response to reception of said data transmission;

counter means, responsive to signals indicative of consumption and reset signals applied thereto, for selectively accumulating counts indicative of consumption during said sampling periods;

a storage register, coupled to said counter means, and responsive to load signals applied thereto for selectively storing the instantaneous count in said counter means; and comparator means, for comparing the instantaneous count in said counter means and the contents of said storage register and upon an unfavorable comparison, generating a comparison signal to effect loading of said storage register with said instantaneous count.

82. In a system for remotely monitoring a parameter, said system being of the type comprising a remote unit cooperating with a sensor for providing signals indicative of said parameter and a central complex, said central complex and said remote unit being adapted for selective interconnection through a telephone system, the improvement wherein said remote unit comprises:

first index register means, responsive to signals indicative of said parameter, for generating cumulative indicia of said parameter;

input byte decoder means, responsive to serial instruction signals applied thereto, for generating sequential parallel instruction bytes and instruction byte control signals indicative thereof, said instruction bytes including representations of a desired callback time;

instruction data register means, responsive to said instruction bytes, said instruction byte control signals and a clock signal applied thereto, for storing said instruction bytes and said generating respective control signals in accordance with said instruction bytes;

said instruction input means including means for generating a callback control signal indicative of the occurrence of said desired callback time;

means, responsive to said callback control signal for generating dial signals to said telephone system to effect a telephone call from said remote unit to said central complex;

means, responsive to an acknowledgement signal from said central complex, and coupled means, responsive to said local sync signal, and coupled to said first index register for effecting a data transmission to said central complex; and said central complex generating said instruction signals to said remote unit in response to reception of said data transmission.

83. The remote unit of claim 82 wherein said instruction signals include respective portions representative of a parameter threshold value and a sampling period, and said remote unit further includes:

first counter means, for selectively accumulating a count indicative of said parameter during said sampling periods; and comparator means, for comparing said count to said parameter threshold value and upon an unfavorable comparison generating a comparison signal to effect a control of a predetermined device.

84. The remote unit of claim 83 further including:

consumer over-ride means, for generating an override signal to decontrol said predetermined device; and second counter means, receptive of signals indicative of said parameter, said over-ride signal and said comparison signal, for selectively accumulating a premium count indicative of said parameter during periods when control of said predetermined consuming appliance is over-ridden, said data transmission including portion representative of said premium count.

85. In a system for remotely monitoring a parameter, said system being of the type comprising a remote unit cooperating with a sensor for providing signals indicative of said parameter and a central complex, said central complex and said remote unit being adapted for selective interconnection through a telephone system, the improvement wherein said remote unit comprises:

first index register means, responsive to signals indicative of said parameter, for generating cumulative indicia of said parameter;

instruction input means, responsive to instruction signals applied thereto and a clock signal, for storing representations of said instruction signals and generating respective control signals in accordance therewith, said instruction signals include portions representative of a sampling period;

means, responsive to said callback control signal for generating dial signals to said telephone system to effect a telephone call from said remote unit to said central complex;

means for generating a callback control signal indicative of the occurrence of a desired callback time;

means, responsive to an acknowledgement signal from said central complex and coupled to said first index register for effecting a data transmission to said central complex;

said central complex generating said instruction signals to said remote unit in response to reception of said data transmission;

counter means, responsive to signals indicative of said parameter and reset signals applied thereto, for selectively accumulating a count indicative of consumption during said sampling periods;

a storage register, coupled to said counter means and responsive to load signals applied thereto, for selectively storing said count; and comparator means for comparing said count and the contents of said storage register, and upon an unfavorable comparison generating a comparison signal to effect loading of said storage register with said count.

86. In a system for remotely monitoring consumption of the type comprising a remote unit cooperating with a consumption meter and a central complex, said central complex and said remote unit being adapted for selective interconnection by a telephone system, the improvement wherein said remote unit comprises:

instruction input means, responsive to instruction signals applied thereto and a clock signal, for storing representations of said instruction signals and generating respective control signals in accordance therewith;

said instruction input means including presettable period register means, responsive to said instruction signals for storing indicia in said instruction input of a desired operational status of at least a portion of said remote unit;

means for generating real time signals indicative of real time;

said instruction input means further including means, responsive to said real time signals, for generating a callback control signal indicative of the occurrence of a desired callback time;

signal generating means, responsive to said callback control signal for generating dial signals to said telephone system to effect a telephone call from said remote unit to said central complex and for thereafter effecting a data transmission to said central complex, said central complex generating said instruction signals to said remote unit in response to reception of said data transmission; and means, responsive to said real time signals and cooperating with said period register means, for selectively controlling operation of at least said portion of said remote unit.

87. In a system for remotely monitoring consumption of the type comprising a remote unit cooperating with a consumption meter and a central complex, said central complex and said remote unit being adapted for selective interconnection by a telephone system, the improvement wherein said remote unit comprises:

instruction input means, responsive to instruction signals applied thereto and a clock signal, for storing representations of said instruction signals and generating respective control signals in accordance therewith, said instruction signals including an error code portion derived in a predetermined manner from the other portions of said instruction signals, and said instruction input means including means for storing indicia of said instruction signal error code;

means for generating a callback control signal;

signal generating means, responsive to said callback control signal for generating dial signals to said telephone system to effect a telephone call from said remote unit to said central complex and for thereafter effecting a data transmission to said central complex, said central complex generating said instruction signals to said remote unit in response to reception of said data transmission;

error code computation means for independently deriving said error code in said predetermined manner from the other portions of said instruction signals;

means for comparing said stored indica and said independently derived error code, and generating an error control signal, in response to an unfavorable comparison; and means responsive to said error control signal, for reeffecting said data transmission of said control complex.

88. In a system wherein a remote unit periodically communicates information relating to a given parameter to a central complex, said communications being effected through a telephone system, the remote unit comprising:

index register means, responsive to signals indicative of said parameter, for accumulating said information relating to said parameter;

memory means, for storing indicia of the telephone number of said central complex and indicia of said remote unit indentity;

means for generating a callback command signal;

means, responsive to said callback command signal applied thereto for generating a start dial mode signal;

output means for generating signals through said telephone system to said central complex, said output means including dialing means, coupled to said memory means and responsive to said start dial mode signal, for sequentially generating signals indicative of the respective digits of said stored telephone number digits of said telephone system to effect a telephone connection between said remote unit and said central complex;

said output means further including data output means responsive to a signal indicative of a completed telephone connection to said central complex, for sequentially generating sequential data signals indicative of said stored indicia of remote unit identity and said accumulated information, and communicating said stored indicia and said accumulated information to said central complex through said telephone system;

instruction input means, receptive of sequential instruction signals indicative of an instruction word through said telephone system from said central complex, for storing indicia of said instruction word and generating respective control signals in accordance with said instruction word;

said instruction word contains indicia of a desired operational mode indicia of a threshold value, and indicia of designated time periods during which said desired operational mode is to be effected; and said instruction input means includes means responsive to signals indicative of said indicia of a desired operation mode, for generating respective DMD mode, L-M mode, and sample command signals, means responsive to signals indicative of said indicia of said designated time periods for generating an ENB signal during said designated time periods; and said index register means includes first gating means, responsive to signals indicative of said metered parameter and said ENB signal, for providing output signals indicative of said parameter during said time periods;

first counter means, responsive to said first gating means output signal and a reset signal applied thereto, for accumulating a count indicative of said first gating means output signal;

pulse generator means, responsive to said sample command signal, for generating sequences of timing pulses of sampling intervals in accordance with said sample command signal;

Q register means, cooperating with said first counter and said instruction input means and responsive to said L-M mode control signal, a first one of said pulse generator timing pulses, and a comparison signal applied thereto, for controllably storing indicia of said threshold value, or said first counter means count in accordance with said L-M mode control signal;

third comparator means, for comparing the indicia stored in said Q register means with said first counter means count at said sampling intervals and generating said comparison signal upon an unfavorable comparison;

said Q register means including means, responsive to said DMD signal and said comparison signal, for effecting storing of said first counter means count in response to said comparison signal;

said index register means further comprising load control means, responsive to said L-M signal and said comparison signal and a consumer over-ride signal for selectively effecting control of designated apparatus in response to unfavorable comparisons;

said load control means releasing control of said designated apparatus in response to said consumer over-ride signal;

second gating means, responsive to signals indicative of said metered parameter, said L-M control signal, and a consumer over-ride signal, for selectively generating an output signal indicative of said metered parameter during load management over-ride time periods in accordance with said consumer over-ride signal;

second counter means, for generating a count indicative of said second gating means output signal; and means for controllably providing output signals indicative of the indicia stored in said Q register means and said second register count.

89. In a system of the type including a central complex and a remote unit, said central complex and said remote unit being adapted for selective communication by a telephone system at selected real times, the improvement wherein said remote unit comprises:

means, responsive to communications received from said central complex, for updating and storing indicia of real time and of at least one selected real time for call back to the central complex;

means, responsive to said real time indicia, for generating a control signal indicative of the occurrence of said selected real time;

means, responsive to said control signal, for selectively effecting a telephone connection to said central complex, said complex transmitting further communications to said remote unit in response to said connection for updating and storing said indicia of real time.

* * * * *